(12) United States Patent
Boateng et al.

(10) Patent No.: US 12,521,168 B2
(45) Date of Patent: Jan. 13, 2026

(54) TISSUE RESECTION CONTROL SYSTEMS AND METHODS

(71) Applicant: Prana Thoracic, Inc., Houston, TX (US)

(72) Inventors: Kelvin Boateng, Houston, TX (US); William Cohn, Houston, TX (US); Terry Daglow, Houston, TX (US); Matthew Kuhn, Houston, TX (US); Steven Nguyen, Houston, TX (US); Ravi Patel, Houston, TX (US); Tushar Sharma, Houston, TX (US); Jorge Salazar, Houston, TX (US)

(73) Assignee: Prana Thoracic, Inc., Houston, TX (US)

( * ) Notice: Subject to any disclaimer, the term of this patent is extended or adjusted under 35 U.S.C. 154(b) by 1060 days.

(21) Appl. No.: 17/319,773

(22) Filed: May 13, 2021

(65) Prior Publication Data

US 2021/0378731 A1 Dec. 9, 2021

Related U.S. Application Data

(60) Provisional application No. 63/042,124, filed on Jun. 22, 2020, provisional application No. 63/035,913, filed on Jun. 8, 2020.

(51) Int. Cl.
*A61B 17/32* (2006.01)
*A61B 17/3205* (2006.01)
(Continued)

(52) U.S. Cl.
CPC .. *A61B 18/1445* (2013.01); *A61B 17/320092* (2013.01); *A61B 17/32053* (2013.01);
(Continued)

(58) Field of Classification Search
CPC ........ A61B 18/1445; A61B 17/320092; A61B 17/32053; A61B 17/3209; A61B 18/1206;
(Continued)

(56) References Cited

U.S. PATENT DOCUMENTS

| 4,007,732 A | 2/1977 | Kvavle et al. |
| 4,735,194 A | 4/1988 | Stiegmann |

(Continued)

FOREIGN PATENT DOCUMENTS

| CN | 1221603 A | 7/1999 |
| CN | 102656171 A | 9/2012 |

(Continued)

OTHER PUBLICATIONS

Bhamidipati et al., "BioGlue in 2011: What is its Role in Cardiac Surgery?" Mar. 2012 (Year: 2012), 7 pages.
(Continued)

*Primary Examiner* — Joanne M Rodden
*Assistant Examiner* — Dana Stumpfoll
(74) *Attorney, Agent, or Firm* — COOLEY LLP

(57) ABSTRACT

A method for removing tissues may comprise disposing a tissue resection device at a target tissue site, causing the tissue resection device to resect a core of tissue from the target tissue site, removing the core of tissue from the body, wherein the removing the core of tissue from the body creates a core cavity at the target tissue site.

43 Claims, 34 Drawing Sheets

(51) Int. Cl.
  *A61B 17/3209* (2006.01)
  *A61B 18/12* (2006.01)
  *A61B 18/14* (2006.01)
  *A61B 34/30* (2016.01)
  *A61B 17/34* (2006.01)
  *A61B 18/00* (2006.01)
  *A61B 34/10* (2016.01)

(52) U.S. Cl.
  CPC ...... *A61B 17/3209* (2013.01); *A61B 18/1206* (2013.01); *A61B 34/30* (2016.02); *A61B 17/32002* (2013.01); *A61B 2017/320093* (2017.08); *A61B 2017/320094* (2017.08); *A61B 2017/320095* (2017.08); *A61B 2017/3454* (2013.01); *A61B 2018/00202* (2013.01); *A61B 2018/00208* (2013.01); *A61B 2018/00273* (2013.01); *A61B 2018/00589* (2013.01); *A61B 2018/00601* (2013.01); *A61B 2018/0063* (2013.01); *A61B 2018/00702* (2013.01); *A61B 2018/00875* (2013.01); *A61B 2018/00994* (2013.01); *A61B 2018/1407* (2013.01); *A61B 2018/141* (2013.01); *A61B 2018/1435* (2013.01); *A61B 2034/107* (2016.02)

(58) Field of Classification Search
  CPC .............. A61B 34/30; A61B 17/32002; A61B 2017/320093; A61B 2017/320094; A61B 2017/320095; A61B 2017/3454; A61B 2018/00202; A61B 2018/00208; A61B 2018/00273; A61B 2018/00589; A61B 2018/00601; A61B 2018/0063; A61B 2018/00702; A61B 2018/00875; A61B 2018/00994; A61B 2018/1407; A61B 2018/141; A61B 2018/1435; A61B 2034/107
  See application file for complete search history.

(56) References Cited

U.S. PATENT DOCUMENTS

| | | |
|---|---|---|
| 5,103,804 A | 4/1992 | Abele et al. |
| 5,133,360 A | 7/1992 | Spears |
| 5,190,561 A | 3/1993 | Graber |
| 5,196,024 A | 3/1993 | Barath |
| 5,353,804 A | 10/1994 | Kornberg et al. |
| 5,507,743 A | 4/1996 | Edwards et al. |
| 5,643,282 A | 7/1997 | Kieturakis |
| 5,651,788 A | 7/1997 | Fleischer et al. |
| 5,681,281 A | 10/1997 | Vigil et al. |
| 5,779,698 A | 7/1998 | Clayman et al. |
| 5,810,811 A | 9/1998 | Yates et al. |
| 5,843,108 A | 12/1998 | Samuels |
| 5,882,316 A | 3/1999 | Chu et al. |
| 5,908,435 A | 6/1999 | Samuels |
| 5,928,163 A | 7/1999 | Roberts et al. |
| 5,961,526 A | 10/1999 | Chu et al. |
| 6,022,362 A | 2/2000 | Lee et al. |
| 6,213,957 B1 | 4/2001 | Milliman et al. |
| 6,258,108 B1 | 7/2001 | Lary |
| 6,493,589 B1 | 12/2002 | Medhkour et al. |
| 6,574,513 B1 | 6/2003 | Collura et al. |
| 6,652,520 B2 | 11/2003 | Moorman et al. |
| 6,770,070 B1 | 8/2004 | Balbierz |
| 6,974,467 B1 | 12/2005 | Gonzales, Jr. |
| 7,517,352 B2 | 4/2009 | Evans et al. |
| 7,582,055 B2 | 9/2009 | Komiya et al. |
| 7,811,303 B2 | 10/2010 | Fallin et al. |
| 8,239,030 B1 | 8/2012 | Hagedorn et al. |
| 8,506,503 B2 | 8/2013 | Fritscher-Ravens et al. |
| 8,602,973 B2 | 12/2013 | Wendlandt |
| 8,734,362 B2 | 5/2014 | Boyle, Jr. |
| 9,241,692 B2 | 1/2016 | Gunday et al. |
| 9,521,961 B2 | 12/2016 | Silverstein et al. |
| 9,895,190 B2 | 2/2018 | Trieu |
| 10,022,179 B2 | 7/2018 | Feinberg et al. |
| 10,039,529 B2 | 8/2018 | Kerr et al. |
| 10,130,369 B2 * | 11/2018 | Fung ................. A61B 17/0487 |
| 10,314,578 B2 | 6/2019 | Leimbach et al. |
| 10,413,368 B2 | 9/2019 | Nilsagard et al. |
| 10,555,769 B2 | 2/2020 | Worrell et al. |
| 10,595,835 B2 | 3/2020 | Kerr et al. |
| 11,103,272 B2 | 8/2021 | Boyle et al. |
| 11,331,087 B2 | 5/2022 | Boyle, Jr. |
| 11,723,708 B2 | 8/2023 | Cohn et al. |
| 12,102,372 B2 | 10/2024 | Cohn et al. |
| 2002/0019597 A1 | 2/2002 | Dubrul et al. |
| 2002/0049442 A1 | 4/2002 | Roberts et al. |
| 2002/0059938 A1 | 5/2002 | Fogarty et al. |
| 2002/0082614 A1 | 6/2002 | Logan et al. |
| 2002/0095101 A1 | 7/2002 | Fontenot |
| 2002/0095152 A1 | 7/2002 | Ciarrocca et al. |
| 2002/0115997 A1* | 8/2002 | Truckai ............. A61B 18/1445 606/51 |
| 2003/0114911 A1 | 6/2003 | Lupton |
| 2003/0129382 A1 | 7/2003 | Treat |
| 2003/0233099 A1 | 12/2003 | Danaek et al. |
| 2004/0010206 A1 | 1/2004 | Dubrul et al. |
| 2004/0122349 A1 | 6/2004 | Lafontaine et al. |
| 2004/0133254 A1 | 7/2004 | Sterzer et al. |
| 2004/0147917 A1 | 7/2004 | Mueller et al. |
| 2004/0215296 A1 | 10/2004 | Ganz et al. |
| 2004/0254572 A1 | 12/2004 | McIntyre et al. |
| 2005/0113854 A1 | 5/2005 | Uckele |
| 2005/0288695 A1 | 12/2005 | Jenson et al. |
| 2006/0009756 A1 | 1/2006 | Francischelli et al. |
| 2006/0025815 A1 | 2/2006 | McGurk et al. |
| 2006/0069388 A1 | 3/2006 | Truckai et al. |
| 2006/0074484 A1 | 4/2006 | Huber |
| 2006/0190037 A1 | 8/2006 | Ginn et al. |
| 2007/0005084 A1 | 1/2007 | Clague et al. |
| 2007/0015984 A1 | 1/2007 | Yeo et al. |
| 2007/0043350 A1 | 2/2007 | Soltesz et al. |
| 2007/0073343 A1 | 3/2007 | Jahns et al. |
| 2007/0123852 A1 | 5/2007 | Deem et al. |
| 2007/0156156 A1 | 7/2007 | Badie |
| 2007/0179494 A1 | 8/2007 | Faure |
| 2007/0249911 A1 | 10/2007 | Simon |
| 2007/0265491 A1 | 11/2007 | Krag et al. |
| 2008/0108950 A1* | 5/2008 | Rioux ............... A61M 39/0208 604/181 |
| 2008/0110457 A1 | 5/2008 | Barry et al. |
| 2009/0054805 A1 | 2/2009 | Boyle, Jr. |
| 2009/0105745 A1 | 4/2009 | Culbert |
| 2010/0036312 A1 | 2/2010 | Krolik et al. |
| 2010/0069919 A1 | 3/2010 | Carls et al. |
| 2010/0168821 A1 | 7/2010 | Johnson et al. |
| 2010/0174306 A1 | 7/2010 | Mitelberg et al. |
| 2010/0191279 A1 | 7/2010 | Kassab et al. |
| 2010/0274238 A1* | 10/2010 | Klimovitch ........ A61B 18/1442 606/41 |
| 2010/0312141 A1 | 12/2010 | Keast et al. |
| 2011/0105841 A1 | 5/2011 | Kutikov et al. |
| 2011/0105947 A1 | 5/2011 | Fritscher-Ravens et al. |
| 2011/0190764 A1 | 8/2011 | Long et al. |
| 2012/0053566 A1 | 3/2012 | Tada et al. |
| 2012/0071866 A1 | 3/2012 | Kerr et al. |
| 2012/0071922 A1 | 3/2012 | Shanley et al. |
| 2012/0109174 A1 | 5/2012 | Vetter |
| 2012/0143020 A1 | 6/2012 | Bordoley et al. |
| 2012/0253229 A1 | 10/2012 | Cage |
| 2012/0289776 A1 | 11/2012 | Keast et al. |
| 2012/0316608 A1 | 12/2012 | Foley |
| 2013/0018414 A1 | 1/2013 | Widomski et al. |
| 2013/0031735 A1 | 2/2013 | Brand et al. |
| 2013/0046140 A1 | 2/2013 | Pravong et al. |
| 2013/0150701 A1 | 6/2013 | Budar et al. |
| 2013/0190809 A1 | 7/2013 | Vidlund et al. |
| 2013/0197357 A1 | 8/2013 | Green et al. |
| 2014/0236184 A1 | 8/2014 | Leimbach et al. |

(56) References Cited

U.S. PATENT DOCUMENTS

| | | |
|---|---|---|
| 2014/0257359 A1 | 9/2014 | Tegels et al. |
| 2014/0275979 A1 | 9/2014 | Fujimoto et al. |
| 2014/0276009 A1 | 9/2014 | Boyle, Jr. |
| 2014/0276687 A1 | 9/2014 | Goodman et al. |
| 2014/0276732 A1* | 9/2014 | Strobl .............. A61B 18/1445 606/42 |
| 2014/0276911 A1 | 9/2014 | Smith et al. |
| 2014/0277039 A1 | 9/2014 | Liberatore et al. |
| 2014/0277071 A1 | 9/2014 | Wu et al. |
| 2014/0343348 A1 | 11/2014 | Kaplan et al. |
| 2015/0057570 A1 | 2/2015 | Chin et al. |
| 2015/0112225 A1 | 4/2015 | Prow et al. |
| 2015/0141981 A1* | 5/2015 | Price ............... A61B 18/1445 606/38 |
| 2015/0265331 A1 | 9/2015 | Fleury et al. |
| 2015/0282823 A1* | 10/2015 | Trees .............. A61B 18/1445 606/170 |
| 2015/0342638 A1 | 12/2015 | Smith et al. |
| 2016/0067465 A1 | 3/2016 | Gerrans et al. |
| 2016/0192911 A1 | 7/2016 | Kassab et al. |
| 2016/0192999 A1* | 7/2016 | Stulen .............. A61B 18/1445 606/42 |
| 2016/0206366 A1* | 7/2016 | Clauda ............. A61B 17/295 |
| 2016/0220294 A1 | 8/2016 | Babkin et al. |
| 2016/0367279 A1 | 12/2016 | Orphanos et al. |
| 2017/0000553 A1* | 1/2017 | Wiener ............ A61B 18/1233 |
| 2017/0000554 A1* | 1/2017 | Yates .............. A61B 18/1445 |
| 2017/0042516 A1 | 2/2017 | Boyle, Jr. |
| 2017/0202595 A1* | 7/2017 | Shelton, IV ......... A61B 18/00 |
| 2017/0281214 A1 | 10/2017 | Brown et al. |
| 2018/0140319 A1 | 5/2018 | Saidi et al. |
| 2018/0153604 A1 | 6/2018 | Ayvazyan et al. |
| 2018/0193060 A1 | 7/2018 | Reddy et al. |
| 2018/0235650 A1* | 8/2018 | Beaupre ......... A61B 17/320068 |
| 2019/0000534 A1* | 1/2019 | Messerly ........ A61B 17/07207 |
| 2019/0038306 A1 | 2/2019 | Lindner et al. |
| 2019/0076164 A1 | 3/2019 | Boyle, Jr. et al. |
| 2019/0099197 A1 | 4/2019 | Boyle, Jr. et al. |
| 2019/0201029 A1 | 7/2019 | Shelton, IV et al. |
| 2019/0246946 A1 | 8/2019 | Kopel et al. |
| 2019/0269387 A1 | 9/2019 | Kerr |
| 2019/0388132 A1 | 12/2019 | Azamian et al. |
| 2020/0038089 A1 | 2/2020 | Cohn et al. |
| 2020/0038090 A1* | 2/2020 | Cohn .............. A61B 10/0266 |
| 2020/0038097 A1 | 2/2020 | Cohn et al. |
| 2020/0390427 A1 | 12/2020 | Eisenthal et al. |
| 2021/0219967 A1 | 7/2021 | Cohn et al. |
| 2021/0322091 A1 | 10/2021 | Addison et al. |
| 2021/0338215 A1 | 11/2021 | Cohn et al. |
| 2021/0338218 A1 | 11/2021 | Cohn et al. |
| 2021/0338265 A1 | 11/2021 | Cohn et al. |
| 2021/0338315 A1 | 11/2021 | Cohn et al. |
| 2021/0338316 A1 | 11/2021 | Cohn et al. |
| 2021/0393332 A1 | 12/2021 | Cohn et al. |
| 2022/0031382 A1 | 2/2022 | Cohn et al. |
| 2022/0047314 A1 | 2/2022 | Cohn et al. |
| 2022/0047322 A1 | 2/2022 | Cohn et al. |
| 2022/0225970 A1 | 7/2022 | Boyle, Jr. |
| 2023/0380878 A1 | 11/2023 | Cohn et al. |
| 2025/0228599 A1 | 7/2025 | Cohn et al. |

FOREIGN PATENT DOCUMENTS

| | | |
|---|---|---|
| DE | 102016101915 A1 | 8/2017 |
| EP | 1340469 A1 | 9/2003 |
| EP | 2866700 A1 | 5/2015 |
| EP | 3603546 A1 | 2/2020 |
| JP | H11244298 A | 9/1999 |
| JP | 3287788 B2 | 6/2002 |
| JP | 2003516800 A | 5/2003 |
| JP | 2004528056 A | 9/2004 |
| JP | 2007185495 A | 7/2007 |
| JP | 2008538518 A | 10/2008 |
| JP | 2012500098 A | 1/2012 |
| JP | 2012183302 A | 9/2012 |
| JP | 2013509255 A | 3/2013 |
| JP | 2014030555 A | 2/2014 |
| JP | 2014113211 A | 6/2014 |
| JP | 2018118115 A | 8/2018 |
| JP | 2019505320 A | 2/2019 |
| JP | 2020018853 A | 2/2020 |
| JP | 2020506772 A | 3/2020 |
| WO | WO-9603163 A1 | 2/1996 |
| WO | WO-2005110508 A2 | 11/2005 |
| WO | WO-2006108067 A2 | 10/2006 |
| WO | WO-2007014313 A2 | 2/2007 |
| WO | WO-2010001405 A1 | 1/2010 |
| WO | WO-2011053648 A1 | 5/2011 |
| WO | WO-2011094110 A1 | 8/2011 |
| WO | WO-2014172396 A2 | 10/2014 |
| WO | WO-2018144898 A1 | 8/2018 |
| WO | WO-2018218210 A1 | 11/2018 |
| WO | WO-2019130110 A1 | 7/2019 |
| WO | WO-2019239338 A2 | 12/2019 |
| WO | WO-2020006660 A1 | 1/2020 |
| WO | WO-2021220220 A1 | 11/2021 |
| WO | WO-2021220221 A2 | 11/2021 |
| WO | WO-2021220222 A2 | 11/2021 |
| WO | WO-2021220223 A1 | 11/2021 |
| WO | WO-2021220224 A2 | 11/2021 |
| WO | WO-2021220225 A1 | 11/2021 |
| WO | WO-2021250526 A1 | 12/2021 |
| WO | WO-2021260468 A1 | 12/2021 |
| WO | WO-2022023998 A1 | 2/2022 |
| WO | WO-2022034412 A1 | 2/2022 |
| WO | WO-2022038433 A1 | 2/2022 |
| WO | WO-2022214896 A1 | 10/2022 |

OTHER PUBLICATIONS

International Preliminary Report on Patentability for Application No. PCT/IB2021/054934, mailed Dec. 13, 2022, 9 pages.

International Search Report and Written Opinion for Application No. PCT/IB2021/054934, mailed Sep. 1, 2021, 14 pages.

International Search Report and Written Opinion for Application No. PCT/IB2021/055036, mailed Aug. 30, 2021, 15 pages.

Final Office Action for U.S. Appl. No. 17/319,805 mailed May 6, 2025, 52 pages.

Office Action for Japanese Application No. 2022-575799 mailed Apr. 30, 2025, with English translation, 16 pages.

Final Office Action for U.S. Appl. No. 17/319,827 dated Aug. 6, 2025, 9 pages.

EP Application No. 21 731 309.7, Office Action mailed Oct. 23, 2025; Applicant Prana Thoracic Inc.; 8 pages.

\* cited by examiner

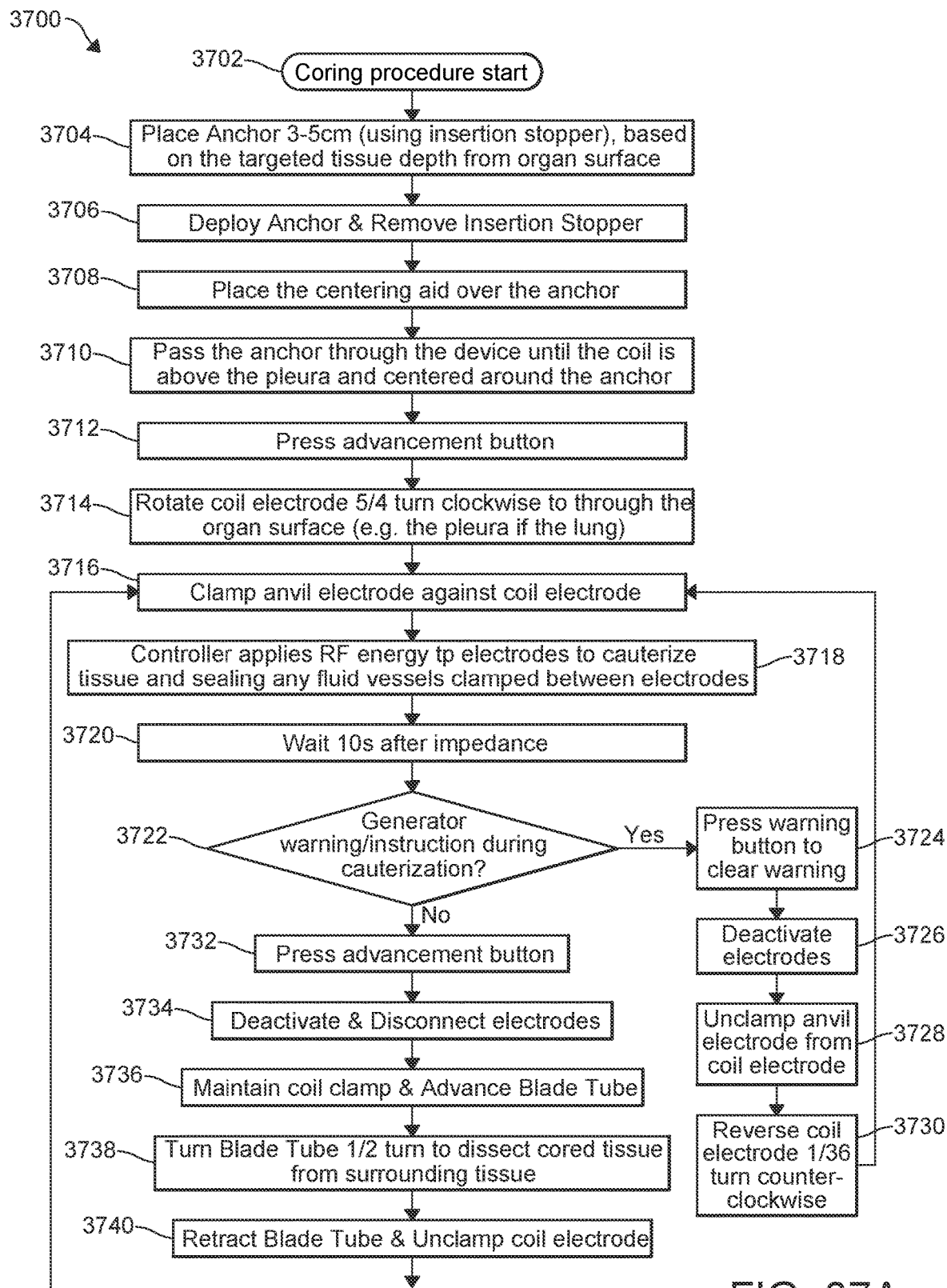

TISSUE RESECTION CONTROL SYSTEMS AND METHODS

CROSS-REFERENCE TO RELATED APPLICATIONS

This application claims priority to and the benefit of U.S. Patent Application No. 63/035,913 filed Jun. 8, 2020 and U.S. Patent Application No. 63/042,124 filed Jun. 22, 2020, each of which is hereby incorporated by reference in their entirety.

BACKGROUND

In certain instances, tissue may need to be removed from the body. As an example, cancerous or infected tissue may be removed from the body as part of a treatment. Cancer is not a single disease, but rather a collection of related diseases that may start essentially anywhere in the body. Common amongst all types of cancer is that the body's cells begin to divide without stopping, proliferating and potentially spreading into surrounding tissues. In the normal course of events, cells grow and divide to form new cells as required by the body and when they become damaged or old, they die, and new cells replace the damaged or old cells; however, cancer interrupts this process. With cancer, the cells become abnormal, and cells that should die do not and new cells form when they are not needed. These new cells may reproduce or proliferate without stopping and may form growths called tumors.

Cancerous tumors are malignant, which means they may spread into or invade surrounding healthy tissue. In addition, cancer cells may break off and travel to remote areas in the body through blood or in the lymph system. Benign tumors, unlike malignant tumors, do not spread or invade surrounding tissue; however, they may grow large and cause damage. Both malignant and benign tumors may be removed or treated. Malignant tumors tend to grow back, whereas benign tumors may grow back but are much less likely to do so.

Cancer is a genetic disease in that it is caused by changes in the genes that control the ways that cells function, especially in how they grow and divide. Genetic changes that cause cancer may be inherited or they may arise over an individual's lifetime as a result of errors that occur as cells divide or because of damage to DNA caused by certain environmental exposure, for example, industrial/commercial chemicals and ultraviolet light. The genetic changes that may cause cancer tend to affect three types of genes; namely proto-oncogenes which are involved in normal cell growth and division, tumor suppressor genes which are also involved in controlling cell growth and division, and DNA repair genes which, as the name implies, are involved in repairing damaged DNA.

More than one-hundred distinct types of cancer have been identified. The type of cancer may be named for the organ or tissue where the cancers arise, for example, lung cancer, or the type of cell that formed them, for example squamous cell cancer. Cancer, unfortunately, is a leading cause of death both in the United States and world-wide. According to the World Health Organization, the number of new cancer cases will rise to twenty-five (25) million per year over the next two decades.

Lung cancer is one of the most common cancers today. According to the World Cancer Report 2014 from the World Health Organization, lung cancer occurred in 14 million people and resulted in 8.8 million deaths world-wide, making it the most common cause of cancer-related death in men and the second most common cause of cancer-related death in women. Lung cancer or lung carcinoma is a malignant lung tumor that if left untreated may metastasize into neighboring tissues and organs. The majority of lung cancer is caused by long-term tobacco smoking; however, about 10 to 15 percent of lung cancer cases are not tobacco related. These non-tobacco cases are most often caused by a combination of genetic factors and exposure to certain environmental conditions, including radon gas, asbestos, secondhand tobacco smoke, other forms of air pollution, and other agents. The chance of surviving lung cancer as well as other forms of cancer depends on early detection and treatment.

Improvements in removing tissue are needed.

SUMMARY

It may be desirable to remove a core of tissue from other target tissue sites including, but not limited to, the lungs, the liver, pancreas, or gastrointestinal (GI) tract, for which managing post-coring bleeding may be desired. A core of tissue may have a prescribed (e.g., pre-defined) shape (e.g., columnar) and dimension based on a coring apparatus. Such coring apparatus may be used to core the same or substantially the same shaped tissue core in a repeatable manner. Such coring may be distinguished from other tissue removal, for example using scissors or scalpel, where the cut tissue will not have a pre-defined shape or dimensions.

Methods may comprise removing a core of tissue from a tissue site. Such coring may further comprise introducing a tissue resection device to a tissue site, using the tissue resection device to create a core of tissue, removing the core of tissue from the body to create a tissue cavity, and sealing the tissue cavity.

In certain aspect, removing a core of tissue from a tissue site may further comprise one or more of: determining the location of a tissue lesion using one or more imaging modalities, navigating an instrument to the tissue site such as the tissue lesion (with and without image guidance), coupling (e.g., anchoring) the instrument to the tissue lesion, obtaining access to the tissue site (making an incision, introduction through a port/trocar, or direct access via an open procedure), introducing a tissue resection device to the tissue site (with and without using the anchor as a guide), using the tissue resection device to create a core of tissue or amputating the core of tissue from the tissue site, removing the core of tissue from the body (with and without leaving a cavity "access sleeve"), analyzing the tissue core sample (tissue histology, ROSE, DNA sequencing, etc.), sealing the tissue cavity, removing some or all instrumentation, or closing tissue access points.

In certain aspects, removing a core of tissue from a tissue site and subsequent diagnosis may further comprise one or more of: determining a location of a tissue lesion using one or more imaging modalities, navigating an instrument to a tissue site such as the tissue lesion (with and without image guidance), coupling (e.g., anchoring) the instrument to the tissue lesion, obtaining access to the tissue site (making an incision, introduction through a port/trocar, or direct access via an open procedure), introducing a tissue resection device to the tissue site (with and without using the anchor as a guide), using the tissue resection device to create a core of tissue or amputating the core of tissue from the tissue site, removing the core of tissue from the body (with and without leaving a cavity "access sleeve"), analyzing the tissue core sample (tissue histology, ROSE, DNA sequencing, etc.), sealing the tissue cavity, removing some or all instrumentation, or closing tissue access points.

In certain aspects, removing a core of tissue from a tissue site, subsequent diagnosis, and therapeutic management of confirmed malignancy may further comprise one or more of: determining the location of a tissue lesion using one or more imaging modalities, navigating an instrument to the tissue lesion (with and without image guidance), coupling (e.g., anchoring) the instrument to the tissue lesion, obtaining access to the tissue site (making an incision, introduction through a port/trocar, or direct access via an open procedure), introducing a tissue resection device to the tissue site (with and without using the anchor as a guide), using the tissue resection device to create a core of tissue or amputating the core of tissue from the tissue site, removing the core of tissue from the body (with and without leaving a cavity "access sleeve"), analyzing the tissue core sample (tissue histology, ROSE, DNA sequencing, etc.), performing therapeutic management of tissue such as benign or malignant tissue, sealing the tissue cavity, removing some or all instrumentation, closing tissue access points.

Methods for coring tissue may comprise disposing a tissue resection device at a target tissue site, causing the tissue resection device to resect a core of tissue from the target tissue site, and removing the core of tissue from the body, wherein the removing the core of tissue from the body creates a core cavity at the target tissue site. The core of tissue comprises at least a portion of a tissue lesion. The resecting the core of tissue from the target tissue site may comprise mechanical transection. The resecting the core of tissue from the target tissue site may comprise the delivery of radiofrequency energy. The resecting the core of tissue from the target tissue site may comprise mechanical compression and the delivery of radiofrequency energy. The resecting the core of tissue from the target tissue site may comprise transection with an energized wire. The resecting the core of tissue from the target tissue site may comprise one of more of mechanical compression, the delivery of radiofrequency energy, the delivery of microwave energy, the delivery of ultrasonic energy, or transection with an energized wire. Other resection devices and procedures may be used. The resection device may be configured for one or more of mechanical compression, the delivery of radiofrequency energy, the delivery of microwave energy, the delivery of ultrasonic energy, or transection with an energized wire.

Methods for coring tissue may further comprise inserting a sleeve into the core cavity to support a wall of the core cavity. Methods for coring tissue may further comprise delivering radiofrequency energy to at least a portion of a wall defining the core cavity. Methods for coring tissue may further comprise delivering chemotherapy to at least a portion of a wall defining the core cavity. Methods for coring tissue may further comprise delivering microwave energy to at least a portion of a wall defining the core cavity. Methods for coring tissue may further comprise delivering thermal energy to at least a portion of a wall defining the core cavity. Methods for coring tissue may further comprise delivering ultrasonic energy to at least a portion of a wall defining the core cavity.

Methods for coring tissue may further comprise sealing biological fluid vessels. The sealing biological fluid vessels may minimize flow of biological fluids into the cavity core. The sealing may be effected using at least mechanical compression. The sealing may be effected using at least radiofrequency energy. The sealing may be effected using at least microwave energy. The sealing may be effected using at least ultrasonic energy. The sealing may be effected using one or more of compression or delivery of energy such as radiofrequency, microwave, ultrasonic, or thermal energy.

The present disclosure relates to a system, device and method for performing lung lesion removal. A lung needle biopsy is typically performed when an abnormality is found on an imaging test, for example, an X-ray or CAT scan. In a lung needle biopsy, a fine needle is used to remove sample of lung tissue for examining under a microscope to determine the presence of abnormal cells. Tissue diagnosis is challenging in small (<6 mm) and intermediate (6-12 mm) nodules. CT guided biopsy of peripheral lesions, either through the chest wall (80%) or by means of a bronchoscope (20%) yields only a 0.001-0.002 cm2 of diagnostic tissue, and as such, cancer, when present, is only successfully identified in 60% of small and intermediate nodules. Although bronchoscopic techniques and technology continue to evolve, biopsy accuracy, specificity, and sensitivity will always be limited when dealing with small and intermediate nodules in the periphery of the lung.

If it is determined that the lesion is cancerous, a second procedure may be performed to remove the lesion and then followed up with chemotherapy and/or radiation. The second procedure most likely involves lung surgery. These procedures are typically done through an incision between the ribs. There are a number of possible procedures depending on the state of the cancer. Video-assisted thoracic surgery is a less invasive procedure for certain types of lung cancer. It is performed through small incisions utilizing an endoscopic approach and is typically utilized for performing wedge resections of smaller lesions close to the surface of a lung. In a wedge resection, a portion of the lobe is removed. In a sleeve resection, a portion of a large airway is removed thereby preserving more lung function.

Nodules deeper than 2-3 cm from the lung surface, once identified as suspicious for cancer, are difficult to localize and excise using laparoscopic or robotic lung sparing technique despite pre-procedure image guided biopsy and localization. Thus, surgeons perform an open thoracotomy or lobectomy to remove lung nodules that are 2-3 cm from the lung surface. A thoracotomy is an open approach surgery in which a portion of a lobe, a full lobe or an entire lung is removed. In a pneumonectomy, an entire lung is removed. This type of surgery is obviously the most aggressive. In a lobectomy, an entire section or lobe of a lung is removed and represents a less aggressive approach than removing the entire lung. All thoracoscopic lung surgeries require trained and experienced thoracic surgeons and the favorability of surgical outcomes track with operative experience.

Any of these types of lung surgery is a major operation with possible complications which depend on the extent of the surgery as well as the patient's overall health. In addition to the reduction in lung function associated with any of these procedures, the recovery may take from weeks to months. With a thoracotomy, spreading of the ribs is required, thereby increasing postoperative pain. Although video-assisted thoracic surgery is less invasive, there may still be a substantial recovery period. In addition, once the surgery is complete, full treatment may require a system chemotherapy and/or radiation treatment.

As set forth above, a fine needle biopsy may not prove to be totally diagnostic. The fine needle biopsy procedure involves guiding a needle in three-dimensional space under two-dimensional imaging. Accordingly, the doctor may miss the lesion, or even if he or she hits the correct target, the section of the lesion that is removed through the needle may not contain the cancerous cells or the cells necessary to assess the aggressiveness of the tumor. A needle biopsy removes enough tissue to create a smear on a slide. The device of the present disclosure is designed to remove the entire lesion, or a substantial portion of it, while minimizing the amount of healthy lung tissue removal. This offers a number of advantages. Firstly, the entire lesion may be examined for a more accurate diagnosis without confounding sampling error, loss of cell packing or gross architecture. Secondly, since the entire lesion is removed, a secondary procedure as described above may not be required. Thirdly, localized chemotherapy and/or energy-based tumor extirpation, such as radiation, may be introduced via the cavity created by the lesion removal.

In at least one embodiment, the disclosure defines a method for removing a tissue lesion including coupling (e.g., anchoring) to the tissue lesion; creating a channel in the tissue leading to the tissue lesion; creating a tissue core including the tissue lesion; ligating the tissue core at a ligation point downstream from the tissue lesion; amputating the tissue core form the tissue between the ligation point and the tissue lesion; and removing the tissue core from the channel.

In keeping with aspects of the disclosure, the sleeve may be inserted in the channel prior to or after removing the tissue core. The sleeve may also be anchored to the tissue. In keeping with another aspect of the disclosure, a localized treatment may be delivered through the sleeve.

In some embodiments, creating a tissue core includes cauterizing and cutting tissue. Ligating tissue may include tissue may include cauterizing tissue at a specific location known as the ligation point. Amputation of the tissue core may be performed with a snare, an energized wire or any other device capable of slicing tissue.

In some embodiments, the tissue core is created by first sealing blood vessels then slicing tissue to form the core.

BRIEF DESCRIPTION OF THE DRAWINGS

The following drawings show generally, by way of example, but not by way of limitation, various examples discussed in the present disclosure. In the drawings:

FIGS. 37A-37B illustrate example methods of the present disclosure.

DETAILED DESCRIPTION

The present disclosure relates to systems and methods for coring tissue. Various tissue and sites may benefit from the disclosed systems and methods.

A core of tissue may have a prescribed (e.g., pre-defined) shape (e.g., columnar) and dimension based on a coring apparatus. Such coring apparatus may be used to core the same or substantially the same shaped tissue core in a repeatable manner. Such coring may be distinguished from other tissue removal, for example using scissors or scalpel, where the cut tissue will not have a pre-defined shape or dimensions.

Figure 1:
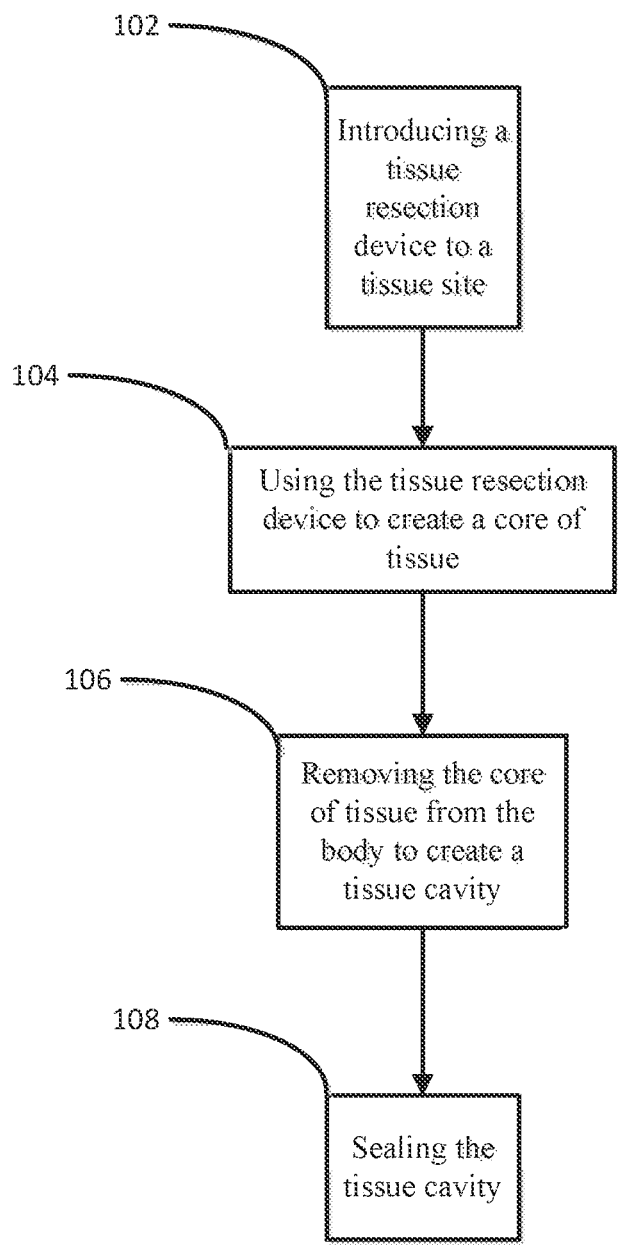
FIG. 1 shows an example method in accordance with the present disclosure.

FIG. 1 shows an example method, which may comprise removing a core of tissue from a tissue site. Such coring may further comprise introducing a tissue resection device to a tissue site (102), amputating a core of tissue such as using the tissue resection device to create a core of tissue (104), removing the core of tissue from the body to create a tissue cavity (106), and sealing the tissue cavity (108).

Figure 2:
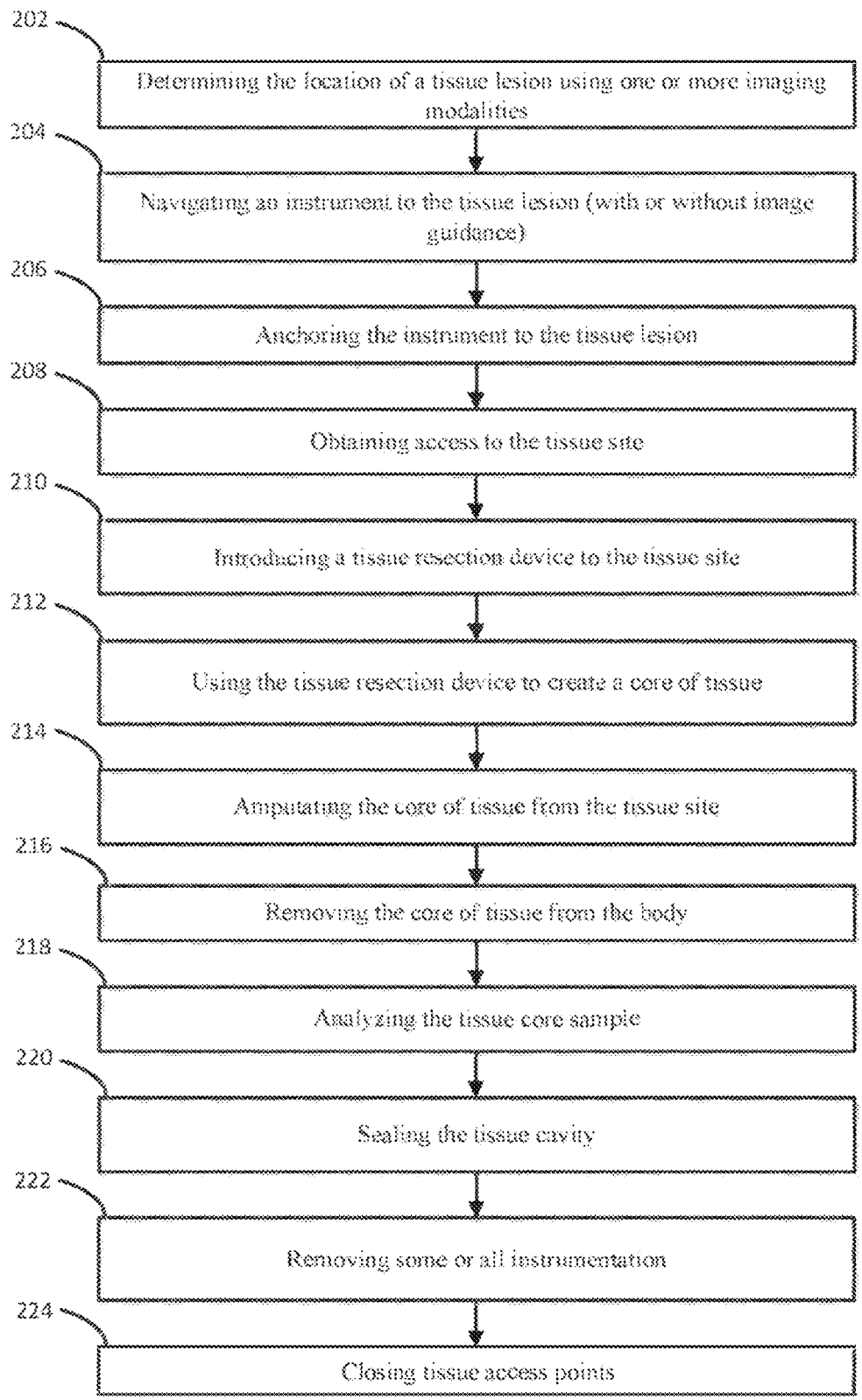
FIG. 2 shows an example method in accordance with the present disclosure.

As illustrated in FIG. 2, removing a core of tissue from a tissue site may further comprise one or more of: determining the location of a tissue lesion using one or more imaging modalities (202), navigating an instrument to a site such as the tissue lesion (with and without image guidance) (204), coupling (e.g., anchoring) the instrument to the tissue lesion (206), obtaining access to the tissue site (making an incision, introduction through a port/trocar, or direct access via an open procedure) (208), introducing a tissue resection device to the tissue site (with and without using the anchor as a guide) (210), using the tissue resection device to create a core of tissue (212) or amputating the core of tissue from the tissue site (214), removing the core of tissue from the body (with and without leaving a cavity "access sleeve") (216), analyzing the tissue core sample (tissue histology, ROSE, DNA sequencing, etc.) (218), sealing the tissue cavity (220), removing some or all instrumentation (222), or closing tissue access points (224).

Figure 3:
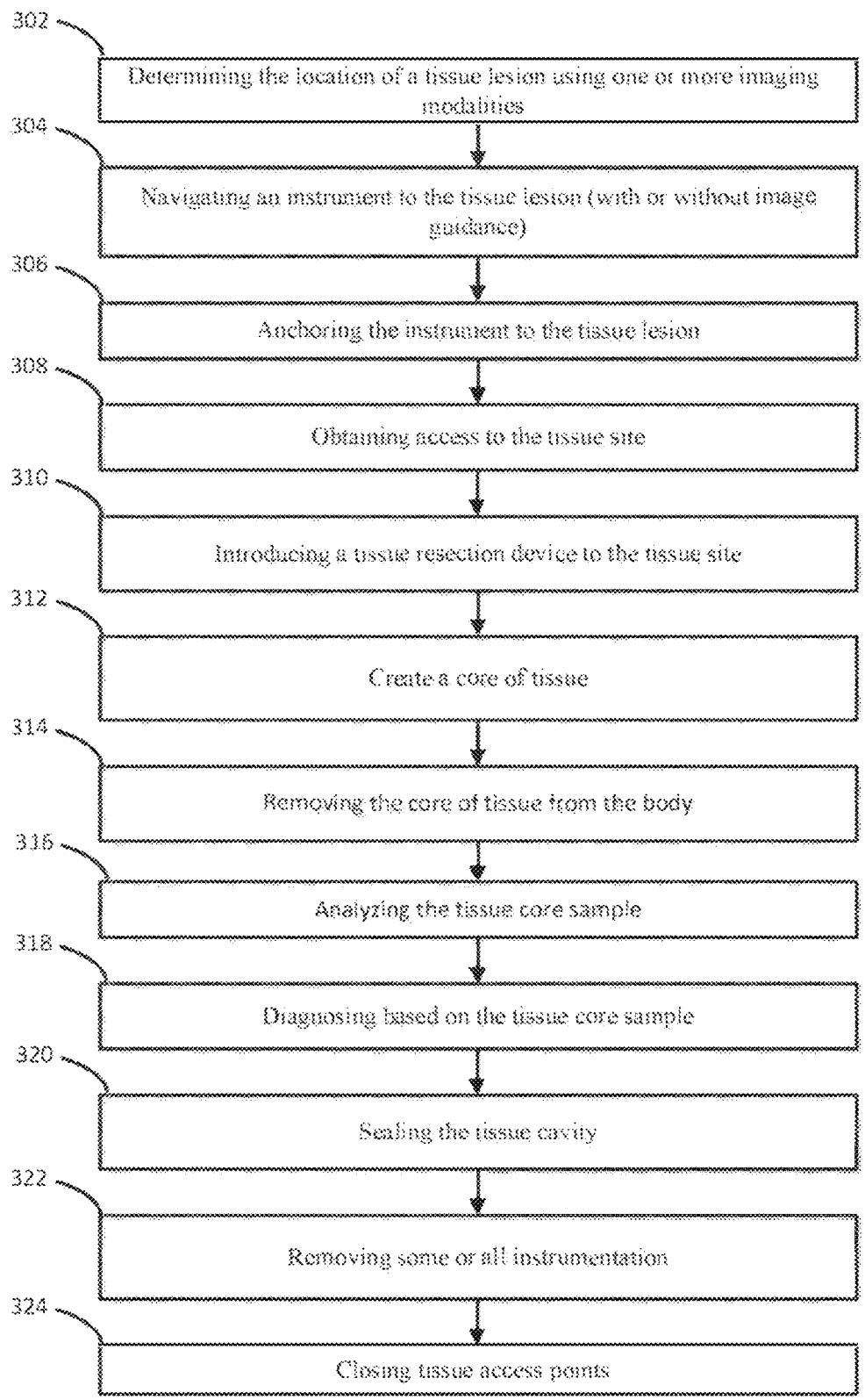
FIG. 3 shows an example method in accordance with the present disclosure.

As illustrated in FIG. 3, removing a core of tissue from a tissue site and subsequent diagnosis may further comprise one or more of: determining a location of a tissue lesion using one or more imaging modalities (302), navigating an instrument to a site such as the tissue lesion (with and without image guidance) (304), coupling (e.g., anchoring) the instrument to the tissue lesion (306), obtaining access to the tissue site (making an incision, introduction through a port/trocar, or direct access via an open procedure) (308), introducing a tissue resection device to the tissue site (with and without using the anchor as a guide) (310), using the tissue resection device to create a core of tissue (312) or amputating the core of tissue from the tissue site, removing the core of tissue from the body (with and without leaving a cavity "access sleeve") (314), analyzing the tissue core sample (tissue histology, ROSE, DNA sequencing, etc.) (316), diagnosing based on at least the tissue core sample (318), sealing the tissue cavity (320), removing some or all instrumentation (322), or closing tissue access points (324).

Figure 4:
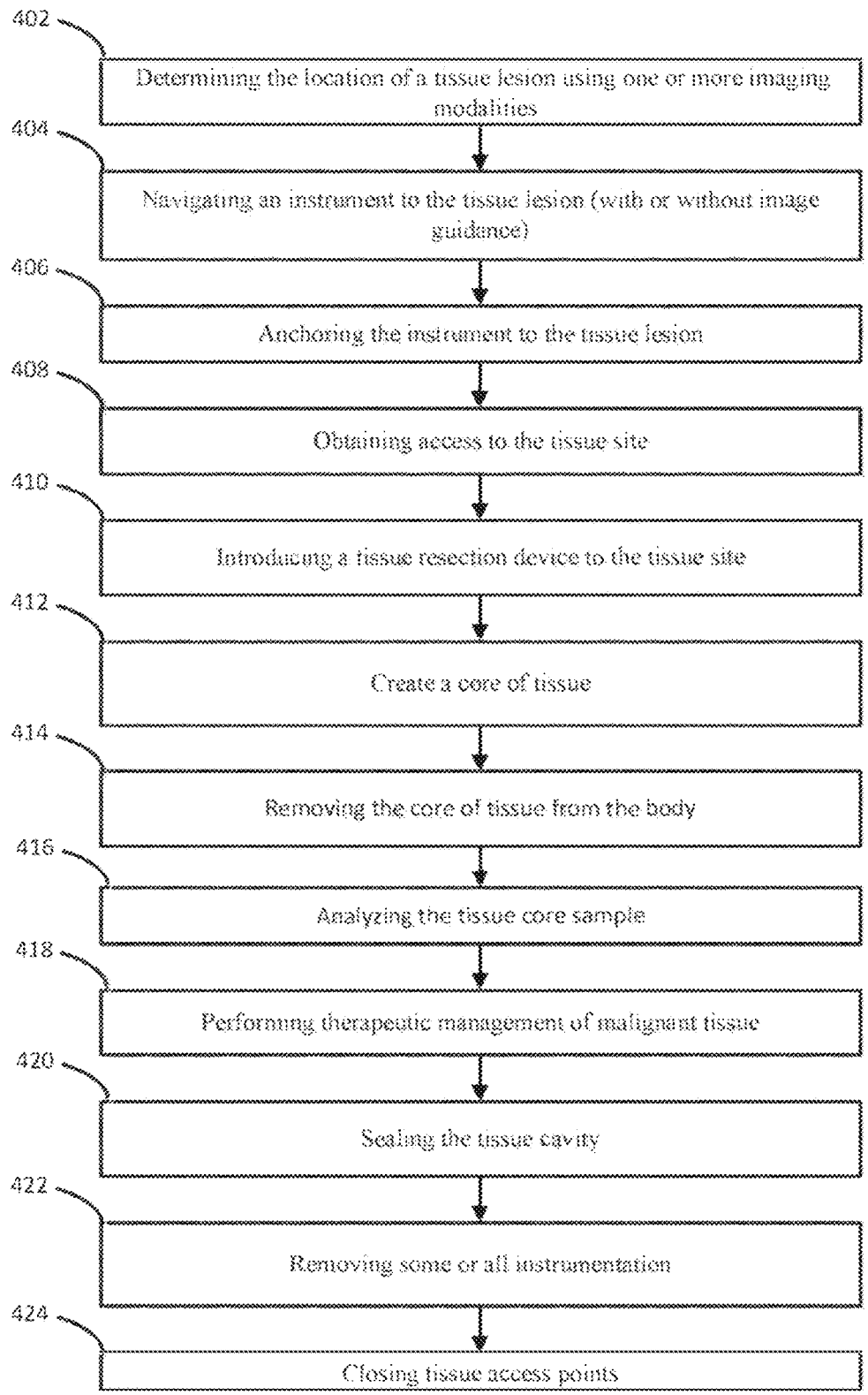
FIG. 4 shows an example method in accordance with the present disclosure.

As illustrated in FIG. 4, removing a core of tissue from a tissue site, subsequent diagnosis, and therapeutic management of confirmed malignancy may further comprise one or more of: determining the location of a tissue lesion using one or more imaging modalities (402), navigating an instrument to a site such as the tissue lesion (with and without image guidance) (404), coupling (e.g., anchoring) the instrument to the tissue lesion (406), obtaining access to the tissue site (making an incision, introduction through a port/trocar, or direct access via an open procedure) (408), introducing a tissue resection device to the tissue site (with and without using the anchor as a guide) (410), using the tissue resection device to create a core of tissue or amputating the core of tissue from the tissue site (412), removing the core of tissue from the body (with and without leaving a cavity "access sleeve") (416), analyzing the tissue core sample (tissue histology, ROSE, DNA sequencing, etc.) (418), performing therapeutic management of tissue such as benign or malignant tissue (418), sealing the tissue cavity (420), removing some or all instrumentation (422), and closing tissue access points (424).

The present disclosure relates to methods and systems for coring tissue. Methods for coring tissue may comprise disposing a tissue resection device at a target tissue site, causing the tissue resection device to resect a core of tissue from the target tissue site, and removing the core of tissue from the body. The removing the core of tissue from the body may create a core cavity at the target tissue site. The core of tissue may comprise at least a portion of a tissue lesion. The resecting the core of tissue from the target tissue site may comprise mechanical transection. The resecting the core of tissue from the target tissue site may comprise the delivery of radiofrequency energy. The resecting the core of tissue from the target tissue site may comprise mechanical compression and the delivery of radiofrequency energy. The resecting the core of tissue from the target tissue site may comprise transection with an energized wire. The resecting the core of tissue from the target tissue site may comprise one of more of mechanical compression, the delivery of radiofrequency energy, the delivery of microwave energy, the delivery of ultrasonic energy, or transection with an energized wire. Other resection devices and procedures may be used. The resection device may be configured for one or more of mechanical compression, the delivery of radiofrequency energy, the delivery of microwave energy, the delivery of ultrasonic energy, or transection with an energized wire.

The present disclosure relates to methods and systems for coring tissue and sealing the core cavity created by removing the tissue core. Such methods may comprise disposing a fill material in the core cavity. Methods may comprise applying pressure to a portion of the core cavity such as to a wall defining the core cavity. Methods may comprise ablating a portion of the core cavity such as a wall defining the core cavity. Methods may comprise causing a cavity closure device, such as suture thread, a stapling device, an ultrasonic tissue sealing device, a bipolar radiofrequency sealing device, or any combination thereof to close the tissue cavity. Methods may comprise disposing a cavity sealing material, such as a tissue graft, a hemostatic patch, a hemostatic agent such as fibrin or thrombin, a biological adhesive material such as Dermabond®, or any combination thereof to close the tissue cavity.

Methods may comprise any combination or permutation of: 1) disposing an anchoring device into a tissue cavity, 2) disposing a tissue access port into the tissue cavity, 3) disposing a tissue sealing device into the tissue cavity (with or without a tissue access port, with or without guidance from an anchoring device), 4) causing the tissue sealing device to seal at least a portion of the tissue cavity, 5) introducing a fill material into the tissue cavity (with or without a fill material delivery device, with or without being proceeded by disposing a tissue sealing device into the tissue cavity, with or without removing the tissue sealing device after sealing at least a portion of the tissue cavity, with or without a tissue access port), 6) disposing a cavity sealing material adjacent to the tissue cavity (with or without being proceeded by disposing a tissue sealing device into the tissue cavity, with or without removing the tissue sealing device after sealing at least a portion of the tissue cavity, with or without being proceeded by introducing a fill material into the tissue cavity), 7) disposing a cavity closure device adjacent to the tissue, and 8) causing a cavity closure device to close the tissue cavity (with or without being proceeded by any combination or permutation of the above steps). As described herein, methods may be used to core and/or seal tissue at various target sites. Although a lung is used as an illustrative example, it should not be so limiting, as other target sites may be punctured or actively cored and may benefit from the disclosed sealing methods.

Imaging Systems

Various systems, devices, and apparatus may be used to locate a target site such as a target tissue site in a human body. For example, imaging systems may be used such as computed tomography (CT), ultrasound, magnetic resonance imaging (MM), endoscope, visual, electromagnetic, and/or X-ray.

CT

In conventional X-ray systems, a beam of X-rays is directed through an object such as the human body onto a flat X-ray photographic film. The beam of X-rays is selectively absorbed by structures within the object, such as bones within the human body. Since the exposure of the X-ray film varies directly with the transmission of X-rays through the body (and varies inversely with the absorption of X-rays), the image that is produced provides an accurate indication of any structures within the object that absorbed the X-rays. As a result, X-rays have been widely used for non-invasive examination of the interior of objects and have been especially useful in the practice of medicine.

The image that is formed from the X-ray is basically the shadow of the structures within the object that absorb the X-rays. As a result, the image formed on the X-ray is only two-dimensional, and if multiple X-ray absorbing structures lie in the same shadow, information about some of these structures is likely to be obscured. Moreover, in the case of medical applications, it is often quite difficult to use conventional X-ray systems to examine portions of the body such as the lungs that consist mostly of air when inflated and do not absorb X-rays significantly.

Many of the limitations of conventional X-ray systems may be avoided by X-ray computer tomography, which is often referred to as CT. In particular, CT provides three-dimensional views and the imaging of structures and features that are unlikely to be seen very well in a conventional X-ray.

A CT scanning equipment typically includes a computer, a large toroidal structure and a platform that is movable along a longitudinal axis through the center of the toroidal structure. Mounted within the toroidal structure are an X-ray source (not shown) and an array of X-ray detectors (not shown). The X-ray source is aimed substantially at the longitudinal axis and is movable around the interior of the toroidal structure in a plane that is substantially perpendicular to the longitudinal axis. The X-ray detectors are mounted all around the toroidal structure in substantially the same plane as the X-ray source and are aimed at the longitudinal axis. To obtain a CT X-ray image, a patient is placed on the platform and the platform is inserted into the center of the toroidal structure. The X-ray source then rotates around the patient continuously emitting X-rays and the detectors sense the X-ray radiation that passes through the patient. Since the detectors are in the same plane as the X-ray source, the signals they receive relate essentially to a slice through the patient's body where the plane of the X-ray source and detectors intersect the body. The signals from the X-ray detectors are then processed by the computer to generate an image of this slice known in the art as an axial section.

As an example, X-rays may be emitted continuously for the full 360° around the patient and numerous features are observed but the overall approach is generally the same.

While the patient remains motionless, the platform is moved along the longitudinal axis through the toroidal structure. In the course of this movement, X-ray exposures are continuously made of the portion of the patient on which CT is to be performed. Since the table is moving during this process, the different X-ray exposures are exposures of different slices of the portion of the patient being examined and the images generated by the computer are a series of axial sections depicting in three dimensions the portion of the patient's body that is being examined. The spacing between adjacent CT sections depends on the minimum size of the features to be detected. For detection at the highest resolution, center-to-center spacing between adjacent sections should be on the order of less than 2 mm.

Because of the superior imaging capabilities of CT, the use of CT in medical imaging has grown rapidly in the last several years due to the emergence of multi-slice CT. One application of medical CT is detection and confirmation of cancer. The diagnostically superior information now available in CT axial sections, especially that provided by multidetector CT (multiple slices acquired per single rotation of the gantry) where acquisition speed and volumetric resolution provide exquisite diagnostic value, however, enables the detection of potential cancers at the earliest and most treatable stage. For example, the minimum detectable size of a potentially cancerous nodule in an axial section of the lung is about 2 mm (¹/₁₀ of inch), a size that is potentially treatable and curable if detected.

Recently, medical professionals have been able to diagnose lung cancer with the aid of computed tomography (CT) imaging systems. Radiologists are able to examine these series of cross sectional images to diagnose pulmonary nodules. The radiologists' examinations also diagnose whether these pulmonary nodules are malignant or benign. If a radiologist confirms confidently that a pulmonary nodule is benign, further medical examination may be avoided.

To enable accurate diagnosis of pulmonary nodules that have the size around the resolution of the CT scanner, it may be advantageous to combine the CT scan with a computer-aided diagnostic (CAD) scheme to assist radiologists.

A procedure in accordance with the present disclosure may be performed with CT guidance. CT is particularly well suited for solid organ interventions. With CT fluoroscopy, which shows the motion of organs and devices in real time, the trajectory of a needle may be tracked in real time, which allows the physician to make adjustments as appropriate. This advantage has made procedures shorter with equivalent or better success rates than those with standard intermittent CT imaging.

A CT scan be used to locate target sites for the anchor. CT scans may be used to reconstruct the 3D positioning of the target site with respect to fiducial markers on the body of the patient. This reconstructed 3D image of CT slices may be loaded to a system that helps the physician navigate the devices of the present disclosure through the patient's body and/or help determine the best route for access.

The devices of the present disclosure may be fitted with an accelerometer and/or gyroscope that helps determine the position of the instrument tip in 3D space at all times. By enabling communication between such devices of the present disclosure (fitted with 3D tracking) and the CT software, the tip of the devices of the present disclosure may be determined with respect to the desired target spot. The software may help keep the device on the planned trajectory and help achieve optimal outcomes.

Additionally or alternatively, CT scans may be combined with other imaging modalities, such as ultrasound or electromagnetic tracking of the tip, to facilitate navigation of the devices of the present disclosure.

In an aspect of the present disclosure, a patient may be placed in a CT scanner and the nodule may be imaged. Using standard CT guided interventional techniques commonly used in CT guided biopsy of the lung, an anchor needle may be advanced through the skin, chest wall, pleural space and lung and through to the target tissue to be sampled. Once the distal end of the anchor needle has passed through the nodule or interstitial abnormality, anchoring members comprised of shape memory metal such as Nitinol, are advanced out of the distal end of the needle.

Ultrasound

An ultrasound probe may be used to facilitate detection and/or location of target tissue sites. An ultrasound probe consists of a piezoelectric transducer that generates ultrasonic waves. These ultrasonic waves are reflected differently from various tissues based on their mechanical and constitutional properties. The reflected waves are then acquired through the receiver and interpreted to translate the properties and location of the tissue. By tracking the location of the ultrasound in 3D space, it is possible to generate a 3D map of the tissue imaged using ultrasound.

Alternatively or additionally to providing the location of the specific target tissue sites, ultrasound is also capable of distinguishing tissue stiffness. This is of critical importance as tumors are known for different mechanical and elastic properties than their surrounding tissue. Hence, ultrasound may enable rapid detection and imaging of the tumor site, in addition to providing details on its location, size and other physical properties.

The ultrasound may also be in a probe format that may be inserted into the pleural space, or navigated through the bronchial space. The probe may be in the form of a catheter configured to facilitate visualization. Such a catheter may be rotated continuously to get a complete 360 ultrasound map as the catheter navigates through the space (iVUS).

The tip has a lubricious covering that allows the operator to run the ultrasound probe over the surface of the lung until the nodule is localized. Once the nodule is localized, a suction apparatus around the perimeter of the ultrasound probe may be actuated so that the lung is sucked into the scope/probe, thus securing the area and locking the probe into place. A needle may be advanced through the lung (e.g., by an operatory) under ultrasound guidance to access the nodule.

MRI/Magnetic Detection

MRI or magnetic resonance imaging relies on the use of high flux electromagnets to oscillate polar molecules and thereby image the localization of those polar molecules. The most ubiquitous polar molecule is water present in human tissue. The water content of normal tissue is different from tumor tissues. For example, tumors usually have elaborate blood supply and drainage, compared to normal tissue. This may be used to visualize a target tissue site. Depending on the target tissue properties, a contrast agent may be added to enhance the resolution of the imaging technique. The contrast agent may comprise components that have a high dipole moment or respond, through motion, emission or vibration, to changes in surrounding magnetic fields.

Endoscope

An endoscope may be used to facilitate visualization of a target tissue site. Specifically for the lung, endoscopy may be used within the chest, thereby precluding the need for a large thoracotomy incision. Thoracoscopy is the use of a specialized viewing instrument, usually a rigid endoscope, introduced through a thoracostomy, or a small hole placed in between the ribs. Once the endoscope is placed in the space that surrounds the lung, known as the pleural space, additional thoracostomy holes may be made to introduce additional instruments. Additional instruments include grasping instruments, cutting instruments, and/or a cutting stapler, such as the Ethicon Endosurgery Endo GIA 45 mm stapler. Using the endoscope and the other instruments, a "triangulation" technique is utilized where, for example, the endoscope is used to view as the grasping instrument is brought in from one direction, and the stapler is brought in from another, and tissue is cut with the stapler and removed through one of the ports.

Visual

Visual imaging may be done using the following modalities: Laser Doppler perfusion imaging (LDPI), Laser speckle contrast imaging (LSCI), Tissue viability imaging (TiVi), Photoacoustic Imaging (PAI), Optical coherence tomography (OCT), Infrared based imaging, optical camera A wide range of visualization techniques may be used for detection and imaging of the target tissue site. These techniques employ a certain wavelength range or combination of multiple wavelengths to yield deterministic results. Depending on the wavelength range used by the source, the penetration depth may vary and therefore, it is possible to image the target tissue site non-invasively. The light (radiation source) could be a hand held probe that is used scan the patient's body from exterior, similar to an ultrasound probe, for visualization or detection of the target tissue site. Alternatively, the light source could be mounted on a probe and navigated through the patient's body up to a point close enough to visualize the target tissue site. Such a probe could be advanced through the pleural cavity along the trachea and used to detect or visualize the target tissue in the lungs.

These imaging techniques could be combined with other imaging modalities, such as ultrasound, electrical detection, etc., to enhance the resolution.

Additionally, external agents may be administered, such as contrast, nanoparticles, fluorescing agents, etc., to enhance the resolution or detection capabilities of visual imaging techniques.

Electromagnetic/Electrical Potential/Impedance

An electromagnetic probe may be used to visualize the target tissue site.

An electromagnetic guided probe may also be used to remotely control the navigation to the target tissue site.

A probe capable of detecting differences in zeta potential changes as it is navigated through the tissue may be used for detection and visualization of the target tissue site.

Bioimpedance analysis relates to the measurement that an organ or tissue responds additional applied current. The bio-impedance parameter that may record is as resistance, reactance, phase angle, and it is to determine for the purpose of blood flow and body composition (such as, water and fat content). However, there is the physical evidence of accumulation, at least the phase angular dimensions of bioimpedance analysis measures at body composition, as general health situation index and forecasting tool likely exceeded its stage generally used. Phase angle it has been generally acknowledged that, such as, be cell membrane integrity and the fluid index in the intra or extracellular spatial distribution of cellular level. Ongoing research shows, phase angle also may reflect other biological attribute.

Based on Cole-Cole model and Hanai method, a kind of method of bio-impedance frequency spectrum (BIS) of utilizing has been proposed to be used in measurement extracellular liquid volume (ECV) and intracellular fluid body volume (ICV). Now, multi-frequency bioimpedance analysis method may provide some information about extracellular fluid and intracellular fluid volume in health compartment total or sections.

The ability of recognizing cancer cells using bioimpedance is well established in the biomedical literature. The usual method for measuring bioimpedance is by introducing a sample into a special chamber and applying an AC current through it while recording the voltage across the sample at each frequency. More modern methods rely on multiple electrode matrices which are connected with the human body and measure physiological and pathological changes. Some of the methods aim to localize tumor cells inside the human body and to form an image. Another technique, based on magnetic[13] bioimpedance, measures the bioimpedance by magnetic induction. This technique consists of a single coil acting as both an electromagnetic source and a receiver operating typically in the frequency range 1-10 MHz. When the coil is placed in a fixed-geometric relationship to a conducting body, the alternating electric field in the coil generates electrical eddy current. A change in the bioimpedance induces changes in the eddy current, and as a result, a change in the magnetic field of those eddy currents. The coil acts as a receiver to detect such changes. Experiments with this technique achieved sensitivity of 95%, and specificity of 69%, distinguishing between 1% metastasis tumor and 20% metastasis tumor. Distinguishing between tumor and normal tissue is even better.

X-Ray

X-rays are electromagnetic radiation with high penetration capabilities. Differences in elemental properties of tissues will pose differences in resistance to X-ray radiation. This property of the target tissue may be used to detect and visualize the target tissue site.

Fiducial markers, comprised of material opaque to X-rays, for example, lead, may be placed on the patient's body to aid navigation to the target tissue and for trajectory planning.

Navigation Systems

Various systems, devices, and apparatus may be used to navigate instruments and/or devices to a target site such as a target tissue site in a human body. For example, navigation systems may be used such as Auris, robotic, CT/ultrasound fusion, electromagnetic navigation, fluoroscopic, etc.

A tissue coring system may comprise a tissue resection apparatus comprising a helical coil electrode; and a tracking apparatus configured to determine a position of the helical coil electrode in three dimensional space. The helical coil electrode may be configured to deliver energy to tissue. The helical coil electrode may be configured to determine electrical properties of tissue. The tissue resection device may further comprise a first clamping element comprising the helical coil electrode, a second clamping element comprising a second electrode, the second clamping element being positioned to oppose at least a portion of the first clamping element, and a cutting element configured for the transection of tissue. The tracking apparatus may comprise one or more of an X-ray device, a computed tomography device, or a fluoroscopy device. Other devices and technologies may be used. The system may further comprise an anchor configured to guide movement of the helical coil electrode. The system may further comprise a non-invasive anchor configured to guide movement of the helical coil electrode. The system may further comprise computing logic configured to control movement of the helical coil electrode. The system may further comprise computing logic configured to determine a target trajectory of the helical coil electrode. The system may further comprise computing logic configured to determine energy dosage provided by the helical coil electrode. The system may further comprise computing logic configured to determine energy dosage provided to the helical coil electrode. The system may further comprise computing logic configured to receive position information indicative of the position of the helical coil electrode and to determine, based on at least the position information, deviation from a target route or target trajectory. The system may further comprise computing logic configured to receive position information indicative of the position of the helical coil electrode and to determine, based on at least the position information, modulate an energy supplied to the helical coil electrode. The system may further comprise computing logic configured to receive position information indicative of the position of the helical coil electrode and to determine, based on at least the position information, a stop point at which tissue resection is intended to be implemented.

A method for navigating a tissue resection apparatus may comprise disposing a tissue resection apparatus into the body of a patient, the tissue resection apparatus comprising a helical coil electrode; and determining a position of the helical coil electrode in three dimensional space. Methods may further comprise controlling movement of the helical coil electrode based at least on the determined position of the helical coil electrode. Methods may further comprise determining a target trajectory of the helical coil electrode; and determining deviation from the target trajectory based at least on the determined position of the helical coil electrode. Methods may further comprise determining energy dosage provided by the helical coil electrode based at least on the determined position of the helical coil electrode. Methods may further comprise determining energy dosage provided to the helical coil electrode based at least on the determined position of the helical coil electrode. Methods may further comprise comprising determining, based on at least on the determined position of the helical coil electrode, a stop point at which tissue resection is intended to be implemented.

Figure 42:
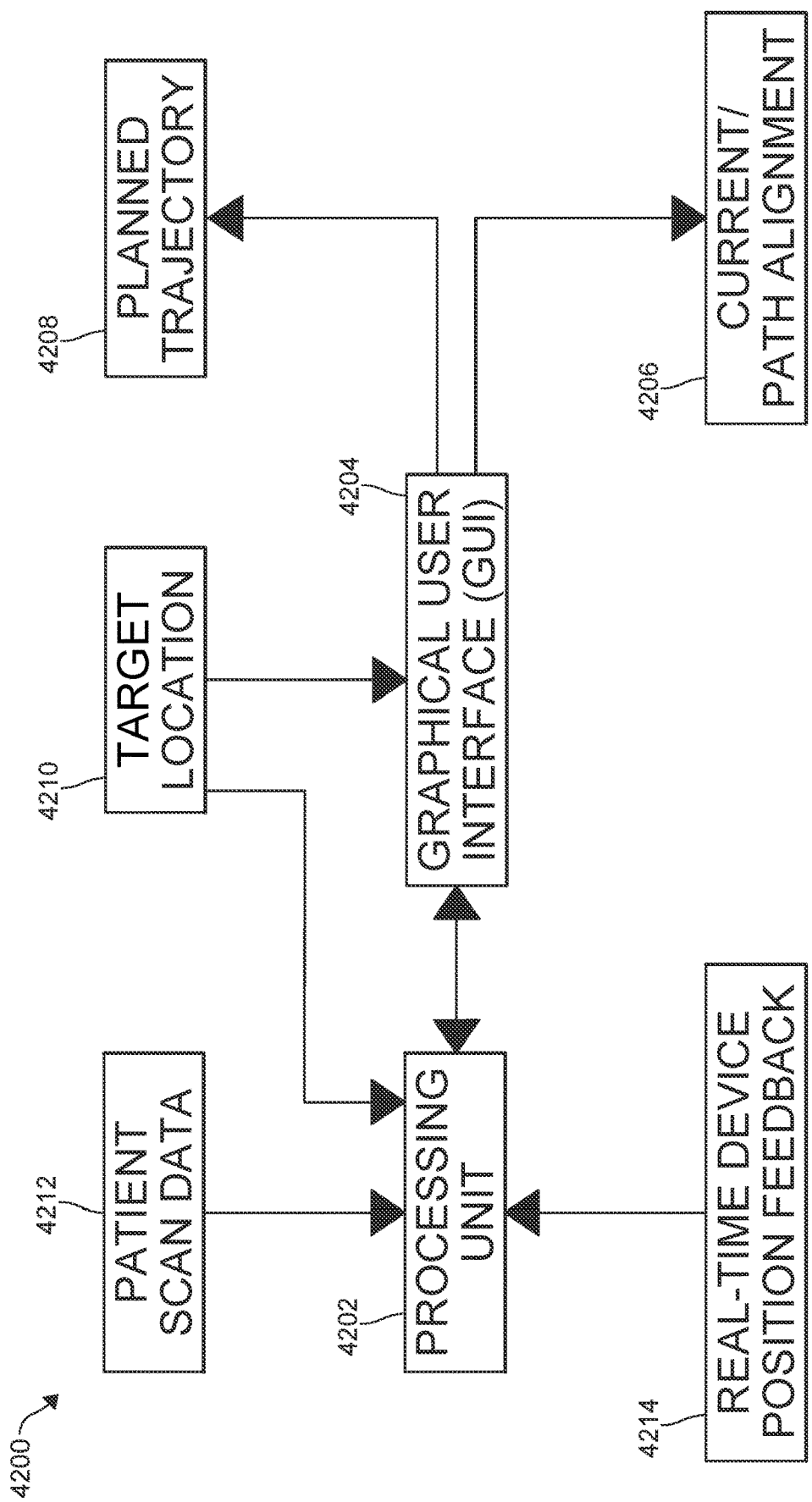
FIG. 42 illustrates an examples schematic and flow diagram in accordance with the present disclosure.

The navigation methods and systems could follow the logic as described in FIG. 42. As shown, a processing unit 4202 may communicate with a graphical user interface (GUI) 4204 to display a current device path 4206 and/or a desired trajectory 4208. The desired trajectory 4208 may be calculated based on the target location 4210 and an entry point. Other inputs may be used. The entry point may be selected based on the patient scan data 4212 or selected based on real time device position feedback 4214. Additionally, the real time device position feedback 4214 may be used to determine the current path 4206 for device navigation. The target location 4210 may be selected through the GUI 4204, or directly inputted to the processing unit 4202 and may be based on the patient scan data 4212.

An example of planned trajectory may be based on an anchor path as described herein. An example of real time device position feedback may comprise use of navigation systems described herein.

A surgical instrument system for coring tissue from a target tissue site may comprise: a tissue resection device configured for coring tissue, wherein the device comprises: a helical coil electrode, and a cutting element configured to cooperate with the helical coil electrode for the transection of tissue; a handle assembly configured to facilitate interaction between tissue the tissue resection device; and a tracking apparatus configured to determine a position of the helical coil electrode in three dimensional space.

Auris

Auris is a system and tools for endolumenal robotic procedures that provide improved ergonomics, usability, and navigation. Endoscopy is a widely-used, minimally invasive technique for both imaging and delivering therapeutics to anatomical locations within the human body. Typically a flexible endoscope is used to deliver tools to an operative site inside the body—e.g., through small incisions or a natural orifice in the body (nasal, anal, vaginal, urinary, throat, etc.)—where a procedure is performed. Endoscopes may have imaging, lighting and steering capabilities at the distal end of a flexible shaft enabling navigation of non-linear lumens or pathways.

Auris typically uses a sheath with a lumen, having a controllable and articulable distal end, which is mounted to a first robotic arm having at least 3 DOF, but preferably 6 or more DOF. This embodiment also includes a flexible endoscope having a controllable and articulable distal end, a light source and video capture unit at the distal end thereof, and at least one working channel extending. The flexible endoscope is slidingly disposed in the lumen of the sheath, and is mounted to a second robotic arm having at least 3 DOF, but preferably 6 or more DOF. Further included are first and second modules, operatively coupled, respectfully, to the proximal ends of the sheath and flexible endoscope. The modules are mounted to the first and second robotic arms, thereby mounting the sheath and flexible endoscope to first and second robotic arms, respectively. The modules provide the mechanics to steer and operate the sheath and flexible endoscope, and receive power and other utilities from the robotic arms. The robotic arms are positioned such that the first module is distal to the second module and the proximal end of the sheath is distal to the proximal end of the flexible endoscope. Movement of the first and second robotic arms relative to each other and relative to the patient causes movement of the sheath relative to the flexible endoscope and movement of either relative to the patient.

Robotic/Electromagnetic Navigation

Robotically-enabled medical systems may be used to perform a variety of medical procedures, including both minimally invasive procedures, such as laparoscopic procedures, percutaneous and non-invasive procedures, such as endoscopic procedures.

Among endoscopic procedures, robotically-enabled medical systems may be used to perform bronchoscopy, ureteroscopy, gastroenterology, etc. During such procedures, a physician and/or computer system may navigate a medical instrument through a luminal network of a patient. The luminal network may include a plurality of branched lumens (such as in bronchial or renal networks), or a single lumen (such as a gastrointestinal tract). The robotically-enabled medical systems may include navigation systems for guiding (or assisting with the guidance of) the medical instrument through the luminal network. This navigation may be guided using mechanical means, such as that of Auris, or use of electromagnets.

Among percutaneous procedures, robotically-enabled medical systems may be used to perform minimally invasive surgeries. The methods include advancing a first alignment sensor into the cavity through a patient lumen. The first alignment sensor provides its position and orientation in free space in real time. The alignment sensor is manipulated until it is located in proximity to the object. A percutaneous opening is made in the patient with a surgical tool, where the surgical tool includes a second alignment sensor that provides the position and orientation of the surgical tool in free space in real time. The surgical tool is directed towards the object using data provided by both the first and the second alignment sensors.

The alignment sensor may, for example, be an anchor coupled with an EM sensor which works in conjunction with EM field generators placed around the patient and an associated CT (or other) scan to provide position and orientation information for EM sensor in the patient's body. The alignment sensor is placed via a cavity, such as the devices of the present disclosure, and together with a camera is used to identify the location of the target tissue site. The alignment sensor provides a guidance mechanism for directing the percutaneous cut for accessing the target tissue site within lungs. Further, as at this point in the procedure, a scope is already present, a working channel of the scope may be used to advance other tools to assist in the removal of the target tissue through a port created by the access devices of the present disclosure.

CT/Fluoroscopy and/or Combining with Ultrasound

In conventional X-ray systems, a beam of X-rays is directed through an object such as the human body onto a flat X-ray photographic film. The beam of X-rays is selectively absorbed by structures within the object, such as bones within the human body. Since the exposure of the X-ray film varies directly with the transmission of X-rays through the body (and varies inversely with the absorption of X-rays), the image that is produced provides an accurate indication of any structures within the object that absorbed the X-rays. As a result, X-rays have been widely used for non-invasive examination of the interior of objects and have been especially useful in the practice of medicine.

As an illustrative example, the image that is formed from the X-ray is effectively the shadow of the structures within the object that absorb the X-rays. As a result, the image formed on an X-ray is only two-dimensional, and if multiple X-ray absorbing structures lie in the same shadow, information about some of these structures is likely to be obscured. Moreover, in the case of medical applications, it is often quite difficult to use conventional X-ray systems to examine portions of the body such as the lungs that consist mostly of air when inflated and do not absorb X-rays significantly.

Many of the limitations of conventional X-ray systems are avoided by X-ray computer tomography, which is often referred to as CT. In particular, CT provides three-dimensional views and the imaging of structures and features that are unlikely to be seen very well in a conventional X-ray.

Tracking and/or navigation of a resection device of the present disclosure may be performed with CT guidance. CT is particularly well suited for solid organ interventions. With CT fluoroscopy, which shows the motion of organs and devices in real time, the trajectory of a needle may be tracked in real time, which allows the physician to make adjustments as appropriate. This advantage has made procedures shorter with equivalent or better success rates than those with standard intermittent CT imaging.

A CT scan, for example, may be used to locate target sites for the anchor. CT scans may be used to reconstruct the 3D positioning of the target site with respect to fiducial markers on the body of the patient. This reconstructed 3D image of CT slices may be loaded to a system that helps the physician navigate a resection device through the patient's body and/or help determine the best route for access.

A resection device may be fitted with an accelerometer and/or gyroscope that helps determine the position of the instrument tip in 3D space at all times. By enabling communication between such a resection device (fitted with 3D tracking) and the CT software, a tip (e.g., coil electrode) of the resection device may be determined with respect to the desired target spot. Computing logic such as software (e.g., CT software) may be used keep the device on the planned trajectory and help achieve optimal outcomes.

Additionally or alternatively, CT scans may be combined with other imaging modalities, such as ultrasound or electromagnetic tracking of the tip, to facilitate navigation of the resection device. Other technologies may be used alone or in combination.

As a further example, an ultrasound probe may be used to facilitate detection and/or location of target tissue sites. An ultrasound probe may comprise a piezoelectric transducer that generates ultrasonic waves. These ultrasonic waves are reflected differently from various tissues based on their mechanical and constitutional properties. The reflected waves are then acquired through the receiver and interpreted to translate the properties and location of the tissue. By tracking the location of the ultrasound in 3D space, it is possible to generate a 3D map of the tissue imaged using ultrasound.

Alternatively, or in addition to providing the location of the specific target tissue sites, ultrasound is also capable of distinguishing tissue stiffness. This may be important, as tumors are known for different mechanical and elastic properties than their surrounding tissue. Hence, ultrasound may enable rapid detection and imaging of the tumor site, in addition to providing details on its location, size and other physical properties.

Systems and methods are described for navigating a probe to a location within a body of a patient. The probe may comprise a needle, introducer, catheter, stylet, or sheath. Other probes may be used. Methods may comprise visualizing a three-dimensional image of a region of a body of a patient. As an example, the three-dimensional image of a region of a body of a patient may be based on one or more of magnetic resonance imaging (MM), computer tomography (CT), or ultrasound. Other imaging techniques may be used. Methods may comprise receiving a selection of a target location within said three-dimensional image of a region of a patient's body. As an example, the receiving a selection of a target location may be via interaction with a display device configured to output one or more of the visualizing steps. Other inputs may be used to effect selection. Methods may comprise determining and visualizing a preferred pathway for the probe to follow from an external entry point on the patient's body to the target location. The preferred pathway may be determined by transforming a selected point in a two-dimensional view of the three-dimensional image of a region of a body of a patient into a line (e.g., line of sight) through the three-dimensional image of a region of a body of a patient. Methods may further comprise calibrating the preferred pathway to compensate for shift of anatomical structures pre-operatively. Alternatively or additionally, methods may further comprise calibrating the preferred pathway to compensate for shift of anatomical structures intra-operatively. Methods may comprise registering the three-dimensional image to the current actual position of the corresponding region of the patient's body. Methods may comprise registering the current actual position of the probe to the three-dimensional image and the current actual position of the patient's body. Methods may further comprise updating the registration of the three-dimensional image to the patient to compensate for shift of anatomical structures. Methods may comprise visualizing the preferred pathway for the probe simultaneously with an indication of the current actual position of the probe in real time such that the simultaneous visualizations enables a user to align the current actual position of the probe with the preferred pathway. As an example, the indication of the current actual position of the probe may comprise the position of the probe in three-dimensional space. As a further example, the indication of the current actual position of the probe may comprise the projected extension of the probe in three-dimensional space. Methods may comprise updating and visualizing an indication of the current actual position of the probe in real time as the probe is advanced to the target location. Additionally, output of an auditory or visual feedback may be used to warn the user about information regarding proximity to the target location and/or to warn the user about information regarding proximity to critical anatomical structures.

The procedures of the present disclosure may be performed with CT guidance. CT is particularly well suited for solid organ interventions. With CT fluoroscopy, which shows the motion of organs and devices in real time, the trajectory of a needle may be tracked in real-time, which allows the physician to make adjustments as appropriate. This advantage has made procedures shorter with equivalent or better success rates than those with standard intermittent CT imaging.

A CT scan be used to locate target sites for the anchor. CT scans may be used to reconstruct the 3D positioning of the target site with respect to fiducial markers on the body of the patient. This reconstructed 3D image of CT slices may be loaded to a system that helps the physician navigate devices of the present disclosure through the patient's body and/or help determine the best route for access.

The devices of the present disclosure may be fitted with an accelerometer and/or gyroscope that helps determine the position of the instrument tip in 3D space at all times. By enabling communication between such as devices of the present disclosure (fitted with 3D tracking) and the CT software, the tip of the devices of the present disclosure may be determined with respect to the desired target spot. The software may help keep the device on the planned trajectory and help achieve optimal outcomes.

Additionally, CT scans may be combined with other imaging modalities, such as ultrasound or electromagnetic tracking of the tip, to facilitate navigation of the devices of the present disclosure.

In an embodiment of the present invention, a patient may be placed in a CT scanner and the nodule may be imaged. Using standard CT guided interventional techniques commonly used in CT guided biopsy of the lung, an anchor needle may be advanced through the skin, chest wall, pleural space and lung and through to the target tissue to be sampled. Once the distal end of the anchor needle has passed through the nodule or interstitial abnormality, anchoring members comprised of shape memory metal such as Nitinol, may be advanced out of the distal end of the needle.

Fluoroscopic

Fluoroscopy uses lower doses of radiation, similar to a CT scanner, to minimize negative effects to the patient.

Magnetic Resonance Imaging or Radiofrequency Based Navigation

Magnetic resonance imaging (MRI) methods may utilize the interaction between magnetic fields and nuclear spins in order to form two-dimensional or three-dimensional images are widely used, notably in the field of medical diagnostics, because for the imaging of soft tissue they are superior to other imaging methods in many respects, do not require ionizing radiation and are usually not invasive.

For example, during MM, the body of the patient to be examined is arranged in a strong, uniform magnetic field B0 whose direction at the same time defines an axis (normally the z-axis) of the co-ordinate system to which the measurement is related. The magnetic field B0 causes different energy levels for the individual nuclear spins in dependence on the magnetic field strength which may be excited (spin resonance) by application of an electromagnetic alternating field (RF field) of defined frequency (so-called Larmor frequency, or MR frequency). From a macroscopic point of view the distribution of the individual nuclear spins produces an overall magnetization which may be deflected out of the state of equilibrium by application of an electromagnetic pulse of appropriate frequency (RF pulse) while the corresponding magnetic field B1 of this RF pulse extends perpendicular to the z-axis, so that the magnetization performs a precession motion about the z-axis. The precession motion describes a surface of a cone whose angle of aperture is referred to as flip angle. The magnitude of the flip angle is dependent on the strength and the duration of the applied electromagnetic pulse. In the example of a so-called 90° pulse, the magnetization is deflected from the z axis to the transverse plane (flip angle 90°).

After termination of the RF pulse, the magnetization relaxes back to the original state of equilibrium, in which the magnetization in the z direction is built up again with a first time constant T1 (spin lattice or longitudinal relaxation time), and the magnetization in the direction perpendicular to the z-direction relaxes with a second and shorter time constant T2 (spin-spin or transverse relaxation time). The transverse magnetization and its variation may be detected by means of receiving RF antennae (coil arrays) which are arranged and orientated within an examination volume of the magnetic resonance examination system in such a manner that the variation of the magnetization is measured in the direction perpendicular to the z-axis. The decay of the transverse magnetization is accompanied by dephasing taking place after RF excitation caused by local magnetic field inhomogeneities facilitating a transition from an ordered state with the same signal phase to a state in which all phase angles are uniformly distributed. The dephasing may be compensated by means of a refocusing RF pulse (for example a 180° pulse). This produces an echo signal (spin echo) in the receiving coils.

In order to realize spatial resolution in the subject being imaged, such as a patient to be examined, constant magnetic field gradients extending along the three main axes are superposed on the uniform magnetic field B0, leading to a linear spatial dependency of the spin resonance frequency. The signal picked up in the receiving antennae (coil arrays) then contains components of different frequencies which may be associated with different locations in the body. The signal data obtained via the receiving coils correspond to the spatial frequency domain of the wave-vectors of the magnetic resonance signal and are called k-space data. The k-space data usually include multiple lines acquired of different phase encoding. Each line is digitized by collecting a number of samples. A set of k-space data is converted to an MR image by means of Fourier transformation.

The transverse magnetization dephases also in presence of constant magnetic field gradients. This process may be reversed, similar to the formation of RF induced (spin) echoes, by appropriate gradient reversal forming a so-called gradient echo. However, in case of a gradient echo, effects of main field inhomogeneities, chemical shift and other off-resonances effects are not refocused, in contrast to the RF refocused (spin) echo.

In order to increase spatial resolution, certain elements (nuclei) may be used that provide higher contrast when excited by the magnetic field gradients. Real time visualization of the anchor or resection device may be achieved if the body of the respective device is comprised of such materials.

Visual

Visual imaging may be implemented using at least the following example modalities: Laser Doppler perfusion imaging (LDPI), Laser speckle contrast imaging (LSCI), Tissue viability imaging (TiVi), Photoacoustic Imaging (PAI), Optical coherence tomography (OCT), Infrared based imaging, and/or optical camera.

A wide range of visualization techniques may be used for detection and imaging of the target tissue site. These techniques employ a certain wavelength range or combination of multiple wavelengths to yield deterministic results. Depending on the wavelength range used by the source, the penetration depth may vary and therefore, it is possible to image the target tissue site non-invasively. The light (radiation source) could be a hand held probe that is used scan the patient's body from exterior, similar to an ultrasound probe, for visualization or detection of the target tissue site. Alternatively, the light source could be mounted on a probe and navigated through the patient's body up to a point close enough to visualize the target tissue site. Such a probe could be advanced through the pleural cavity along the trachea and used to detect or visualize the target tissue in the lungs.

These imaging techniques could be combined with other imaging modalities, such as ultrasound, electrical detection, etc., to enhance the resolution.

Additionally or alternatively, external agents may be administered, such as contrast, nanoparticles, fluorescing agents, etc., to enhance the resolution or detection capabilities of visual imaging techniques.

An example of use of an optical camera would be use of an endoscope. An endoscope may be used to facilitate visualization of a target tissue site. Specifically for the lung, endoscopy may be used within the chest, thereby precluding the need for a large thoracotomy incision. Thoracoscopy is the use of a specialized viewing instrument, usually a rigid endoscope, introduced through a thoracostomy, or a small hole placed in between the ribs. Once the endoscope is placed in the space that surrounds the lung, known as the pleural space, additional thoracostomy holes may be made to introduce additional instruments. Additional instruments include grasping instruments, cutting instruments, and/or a cutting stapler, such as the Ethicon Endosurgery Endo GIA 45 mm stapler. Using the endoscope and the other instruments, a "triangulation" technique is utilized where, for example, the endoscope is used to view as the grasping instrument is brought in from one direction, and the stapler is brought in from another, and tissue is cut with the stapler and removed through one of the ports.

Anchoring

Various anchor devices may be used. A needle may be anchored to guide the coring device. Non-invasive anchoring may be used. For example, a needle may be advanced to the desired target site via the use of a real time or virtual image guided procedure. The advancing process may be carried out by a person's hands directly, by a person manually using a robotic arm, or autonomously robotically guided per a digital 2D or 3D image. Once the desired position has been achieved, Nitinol fingers may be engaged into the target tissue.

Anchored Needle to Guide One or More Devices

Many medical procedures are undertaken through small tracts formed within a patient's tissue. These procedures are minimally invasive. In order to form the tract running from outside of the patient to a target within the patient, an anchor typically is inserted in the initial stages of a procedure. Such an example anchor may run from the surface of the patient's skin to the target. As a further example, later in the procedure, this initial insertion may be enlarged to accommodate other medical devices necessary for the procedure.

Additionally, localized applications, such as biopsies, thermoablation or localized injection of therapeutic substances are currently performed in combination with imaging means, such as ultrasound, X-ray, fluoroscopy, CT scan, MRI, visual, optical, etc. As an example, in the case of use of an X-ray emitting device, X-ray energy passes through the patient's body and differentially impinges on a fluoroscope screen, exciting fluorescent material, such as calcium tungstate, to create a screen display of the body and anchor. The anchor is visualized on the fluoroscope as it enters the patient on the display of the medical device. This anchor may appear on the screen because it does not allow the energy to pass through it (i.e., it may be opaque).

These imaging modalities allow visualization of the anchor and the target region to safely orient and move the target to the target point. Furthermore, these visualization modalities also allow proper positioning and/or repositioning of the anchor.

Non-Invasive Anchoring

In certain cases, there may be no need for coring the tissue to access the target site. Examples of such cases may include growing cancer where the access has been established through a prior biopsy procedure, or a superficial target location. In such cases, it may be possible to have a non-invasive anchor that helps guide the device along the desired trajectory.

A non-invasive anchor may sit on the patient's body surface, such as skin, and could provide guidance for a device. The device could be inserted through the non-invasive anchor or from a position adjacent to the anchor. Guidance for the device being navigated to the target site could be provided either through the means of a mechanical guide (cannula), above listed imaging and navigation technologies, sensors mounted on the device or the anchor itself, or a combination of these.

In an aspect, an anchor may comprise a ring placed on the patients' body surface, embedded with sensors. As the resection device is inserted through the ring, the sensors on the anchor tracks the resection device position in 3D space. As an example, the sensors on anchor may interact with sensors on the resection device to improve accuracy or resolution. Some examples of sensors include, but are not limited to, electromagnetic, photodiode, optical, IR, magnetic, FET, eddy current sensors.

In an aspect, an anchor may comprise hard stops that limit the freedom of motion for the resection device. Once the anchor has been deployed, the anchor may act as a guide for insertion and advancement of the resection device. The advancement of the resection device may not require any imaging or monitoring and may rely on the hard stops of the anchor to advance and position the device at the target location and position. As a further example, the anchor may have sensors disposed along the body of the anchor. Once the anchor has been deployed, the sensors may monitor and provide feedback on the advancement and position of the resection device. Although reference is made to the resection device, other devices such as sealing devices and fluid delivery devices may be used in the same or similar manner.

Various processes and mechanism may be used to navigate an anchor to a target location (such as a tissue location where coring may be desired). As an example, an anchor may be disposed at a target lesion using CT technology similar to a guided needle biopsy. Other systems such as imaging system may be used, for example ultrasound, X-ray or the like.

As a further example, a larger sheath needle may be disposed at a target location using CT technology similar to a guided needle biopsy until a distil tip of the sheath needle touches or is adjacent a target lesion. An anchor may then be inserted through the sheath needle to be placed at the target location (e.g., lesion). The sheath needle may then be removed. Other systems such as imaging system may be used, for example ultrasound, X-ray or the like.

As a further example, a position sensor may be disposed at or adjacent the tip of the anchor and configured to scan the target location (e.g., lung) to generate a 3D position of the target location (e.g., lesion). The anchor may be guided to the target lesion based on the sensor position.

As a further example, a position sensor may be disposed on a larger sheath needle and configured to scan the target location (e.g., lung) to generate a 3D position of the target location (e.g., lesion). The sheath needle may be guided until the distal tip touches the target location (e.g., lesion). The anchor may then be inserted through the sheath needle to be placed at the target lesion. The sheath needle may then be removed.

As a further example, a position sensor may be disposed at an end of an anchor and use of Auris or other comparable system to place a position sensor at a target lesion through the airway. The anchor may be guided to the lesion based on locations of the two sensors.

As a further example, a position sensor may be disposed at the tip of a larger sheath needle and use of Auris or other comparable system to place a position sensor at a target lesion through the airway. The sheath needle may be guided until the distal tip touches the lesion based on the locations of the two sensors. The anchor may then be inserted through the sheath needle to be placed at the target lesion. The sheath needle may then be removed.

Tissue Site Access

Various systems, devices, and apparatus may be used to provide or support access to a target site such as a target tissue site in a human body. For example, chest wall incision blades, deployable access ports, tissue dilation, trocar, and/or open incisions may be used.

Chest Wall Incision Blades

Once the anchor is placed and deployed at the target location, to access the chest cavity through the chest wall without causing puncture to the lung, there is a need to break the vacuum of the intrapleural space. The chest wall incision blade may be designed with an open channel next to the center hole, which allows the blade to be advanced and cut through chest wall tissue along the anchor. The open channel may be used to allow air to be introduced into the pleural space when the first layer of the pleural space is penetrated. The intrapleural vacuum may be lost, and thus the lung may be dropped away to minimize the potential of damaging to the lung pleura.

Figure 5:
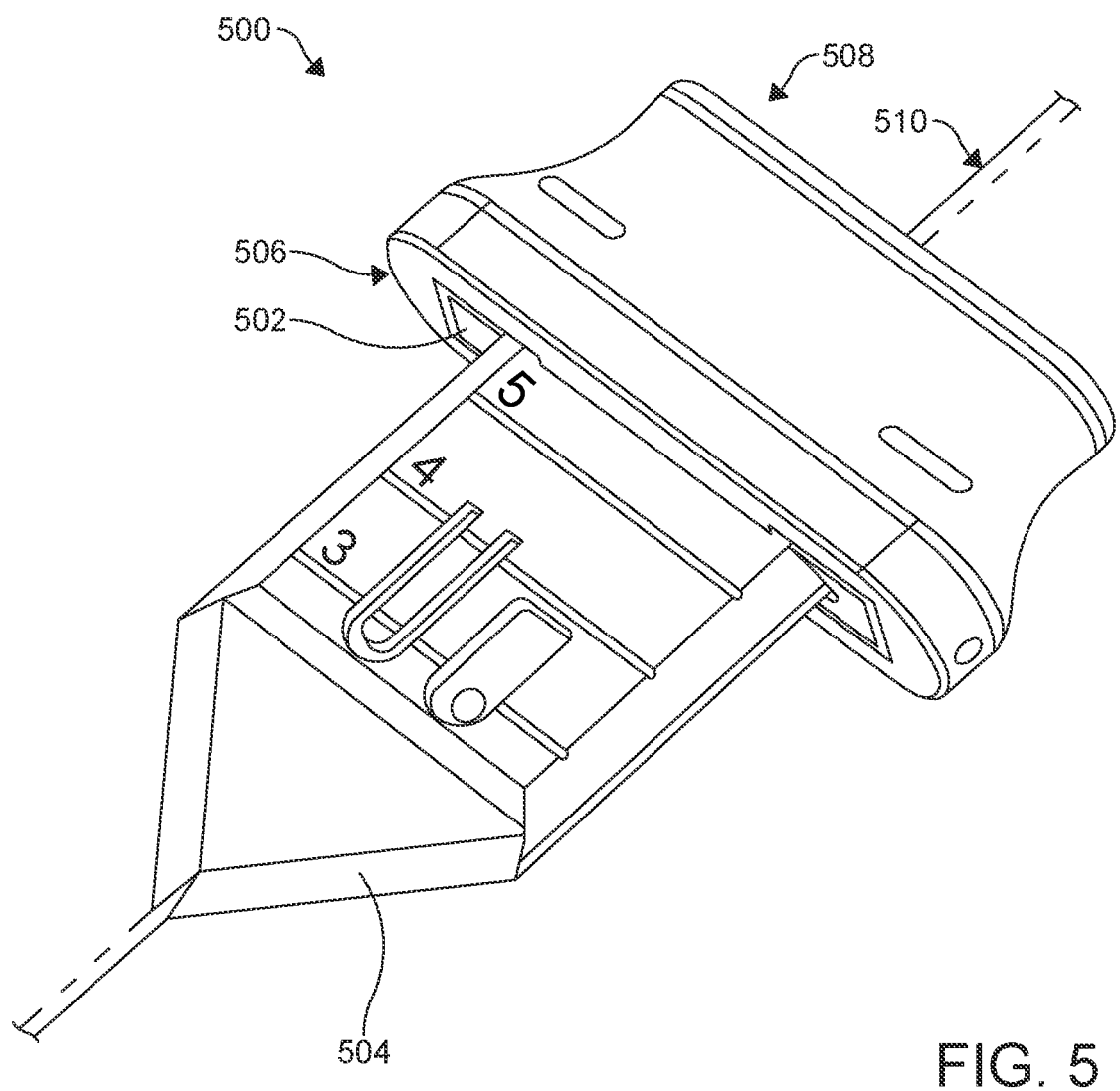
FIG. 5 illustrates a blade with an open channel.
Figure 6:
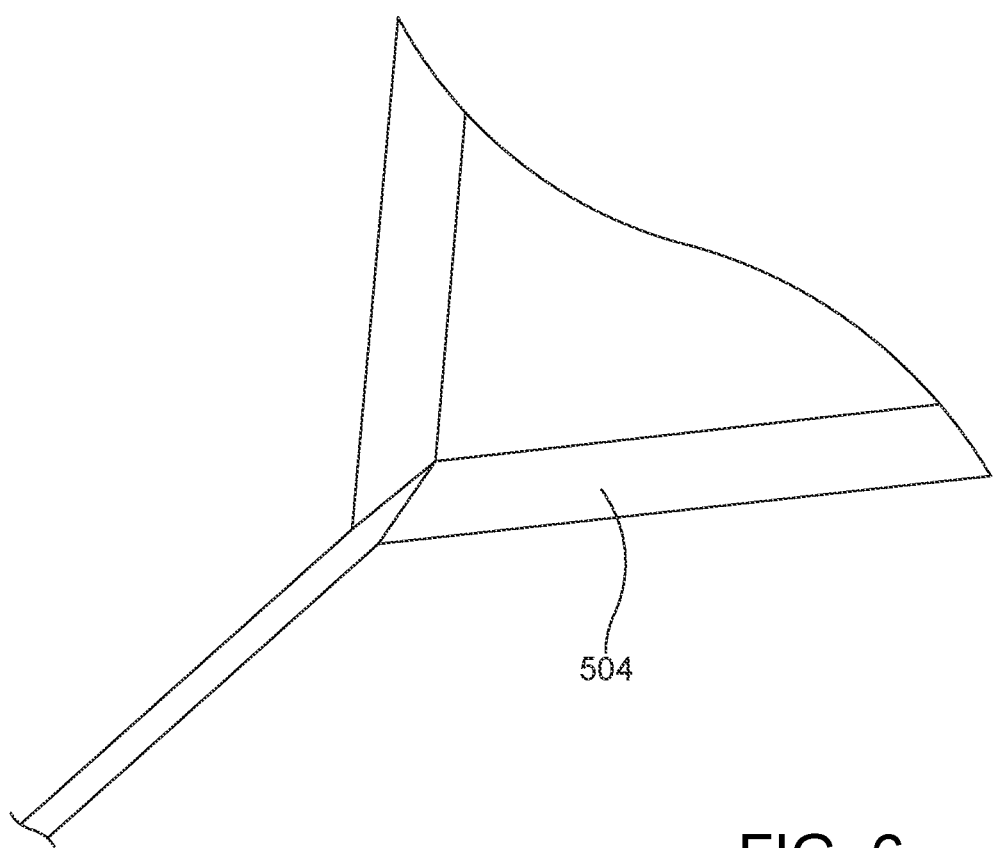
FIG. 6 illustrates a distal tip of the blade of FIG. 5.
Figure 7:
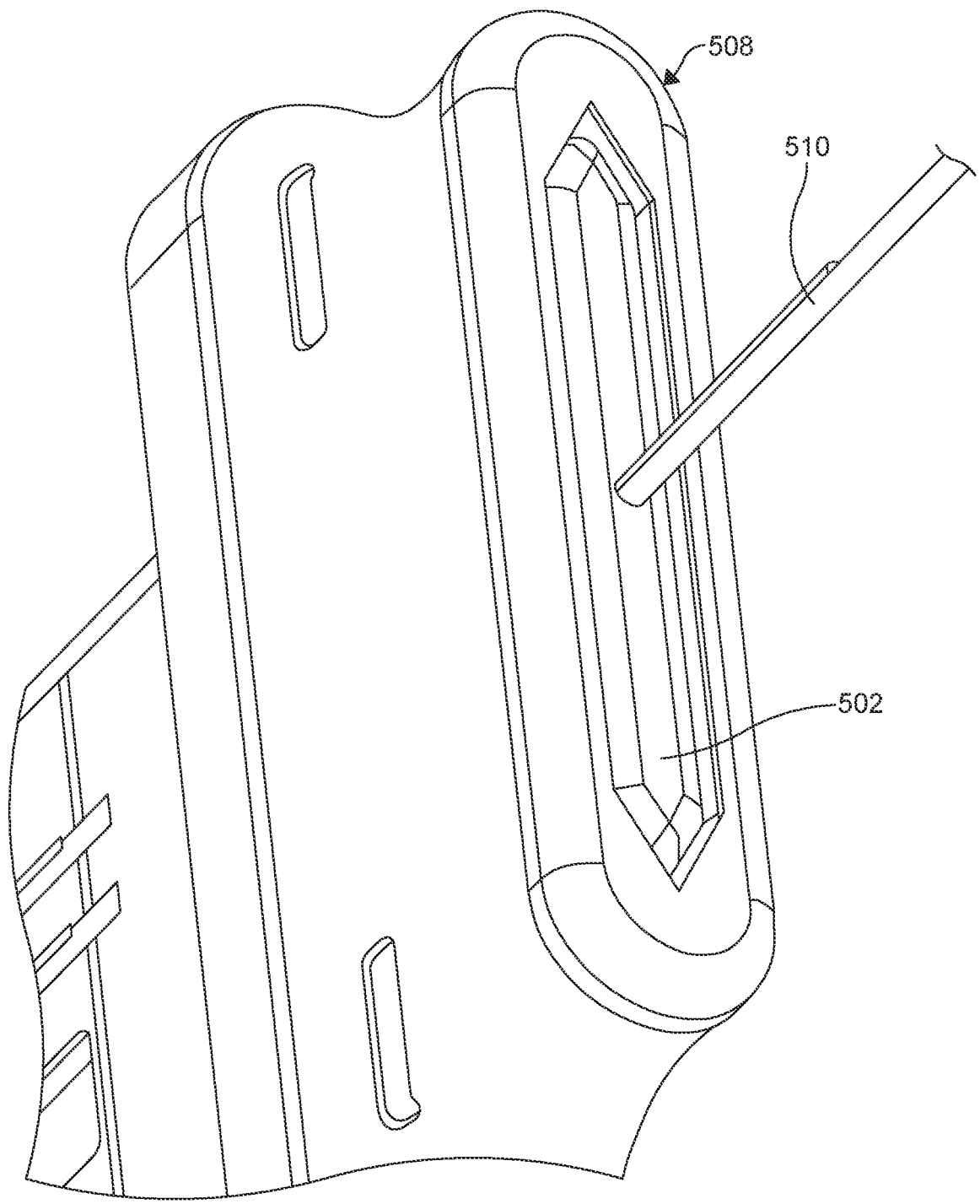
FIG. 7 illustrates a distal end of air channel connected to a flexible or rigid tube.

FIG. 5 illustrates a blade 500 with an open channel 502. The open channel 502 may be an air channel and may be connected to the sharp distal tip 504 of the blade at a distal end 506 to allow air to continuously flow to the distal tip 504 of the blade 500 (see, e.g., FIG. 6). FIG. 6 illustrates a distal tip 504 of the blade of FIG. 5. The proximal end 508 of the open channel 502 may be connected to a rigid or flexible tube 510. Air may enter the open channel 502 by ambient pressure or by a higher pressurized air (see, e.g., FIG. 7). FIG. 7 illustrates a proximal end 508 of an open channel 502 connected to a flexible or rigid tube 510.

Cavity Access Sleeve

Post coring and amputation of the target tissue, prior to removing the coring device with the target tissue inside, a cavity access sleeve may be placed on the outside diameter of the coring device shaft to maintain access to the location where the target tissue was removed from. Re-access to the location may be desirable for post coring treatment, such as adding a marking device of the tissue location for subsequent surgery, cavity seal, cavity ablation, delivery of drug or local chemotherapy. Without placing a cavity access sleeve prior to removing the coring device, re-access to the removed target tissue location could be difficult in an organ that has large movement, such as the lung.

Tissue Dilation

After the anchor is deployed at a target tissue location of an organ, such as a target lesion in a human lung, to spare the healthy tissue between the organ surface and the target tissue from being removed, the tissue may be dilated to allow subsequent insertion of the coring device to remove the target tissue only. The dilation may be achieved as follows:

Rigid rods with center holes may be advanced over the anchor until the distal ends of the rods reach the target tissue. The rigid rods may have a diameter increasing from small to larger diameters.

An expandable rod may be advanced over the anchor until the distal end of the expendable rod reaches the target tissue. At this point, the distal end of the rod may be expanded to a desired diameter.

A balloon catheter in its collapsed state may be advanced over the anchor. Once the distal end of the balloon catheter reaches the target site, the balloon may be expanded to dilate the tissue. The balloon may have a similar shape as an angioplasty balloon, or it may be configured to have square corners at the distal end. Also, the body of the balloon may have features, such as a corrugated balloon, to minimize tissue slippage along the balloon as the balloon is inflated.

Trocar

Figure 8A:
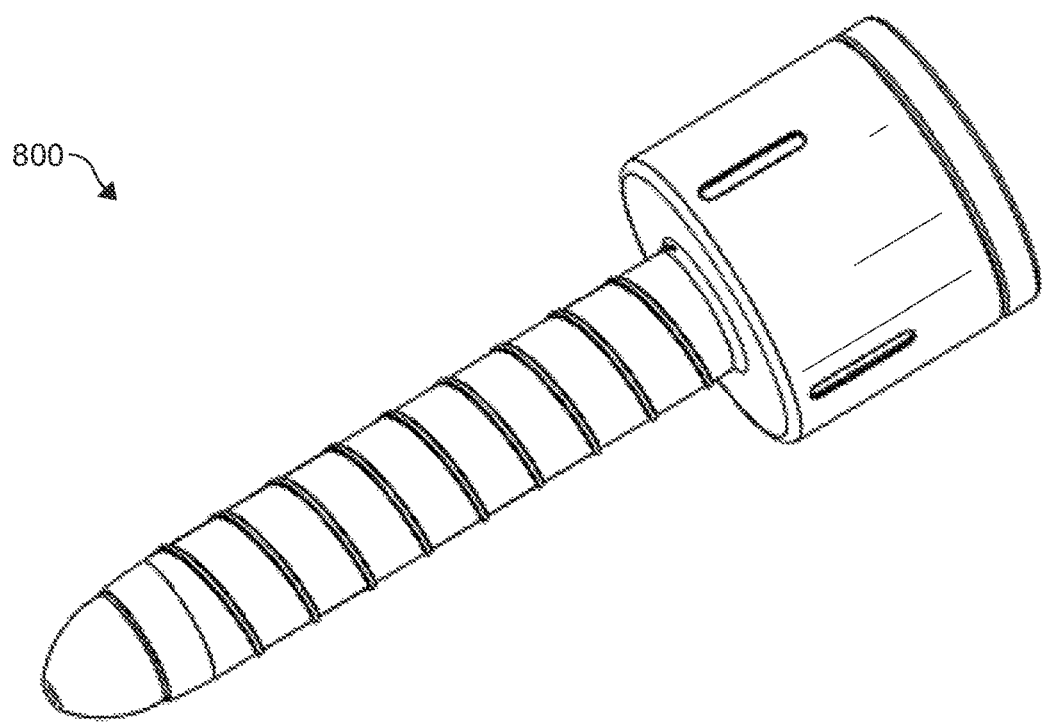
FIGS. 8A-8B illustrate an example trocar.
Figure 8B:
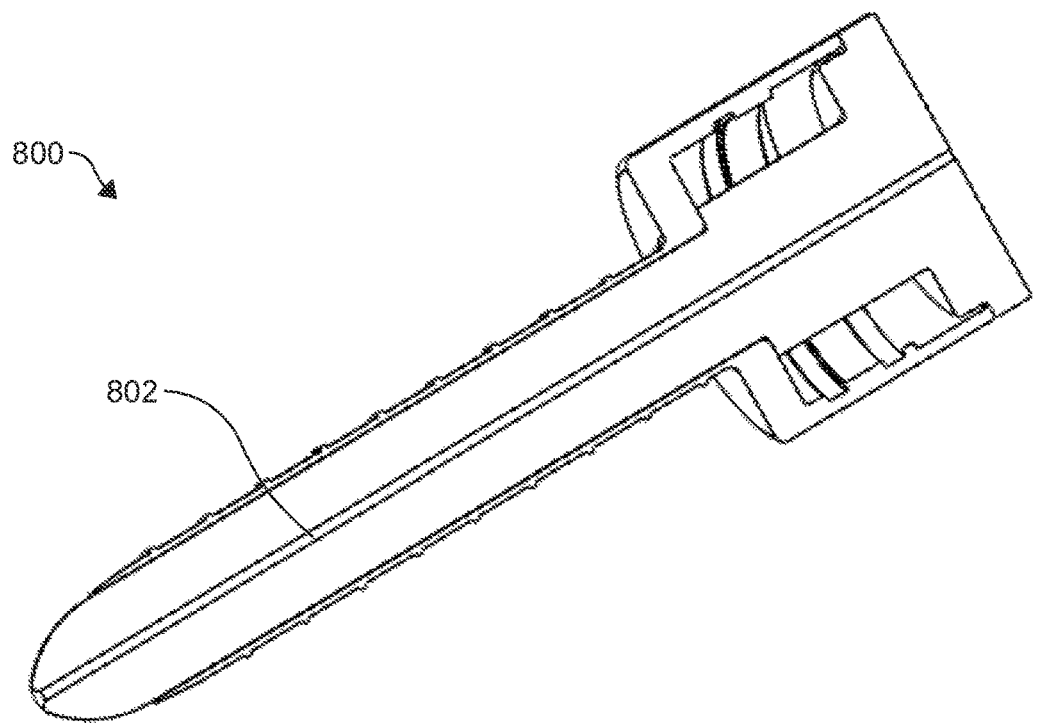
Figure 9A:
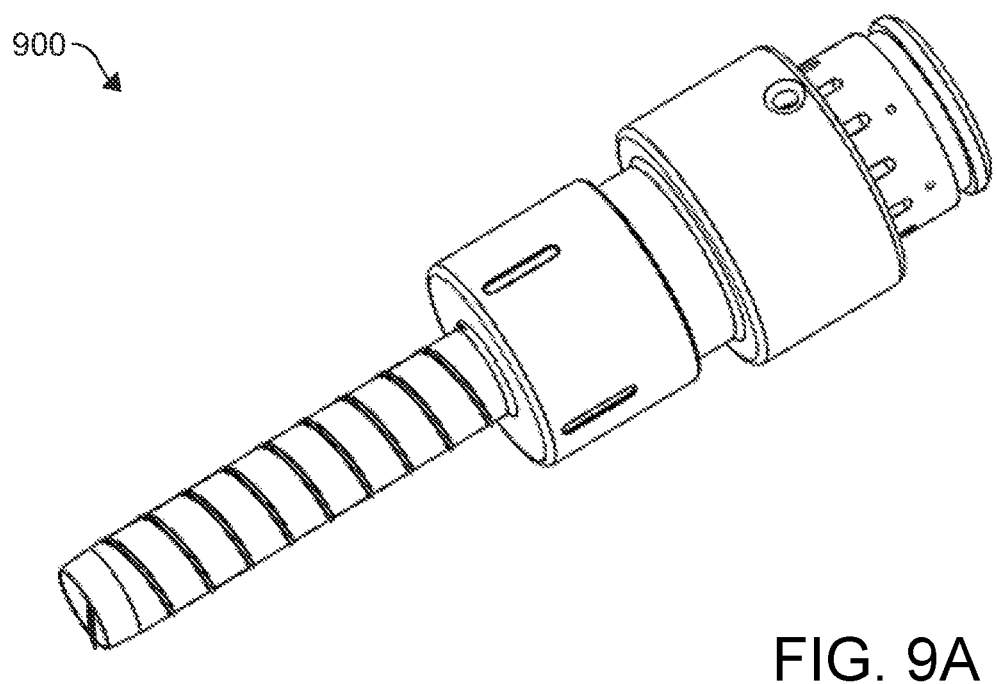
FIGS. 9A-9B illustrate an example trocar.
Figure 9B:
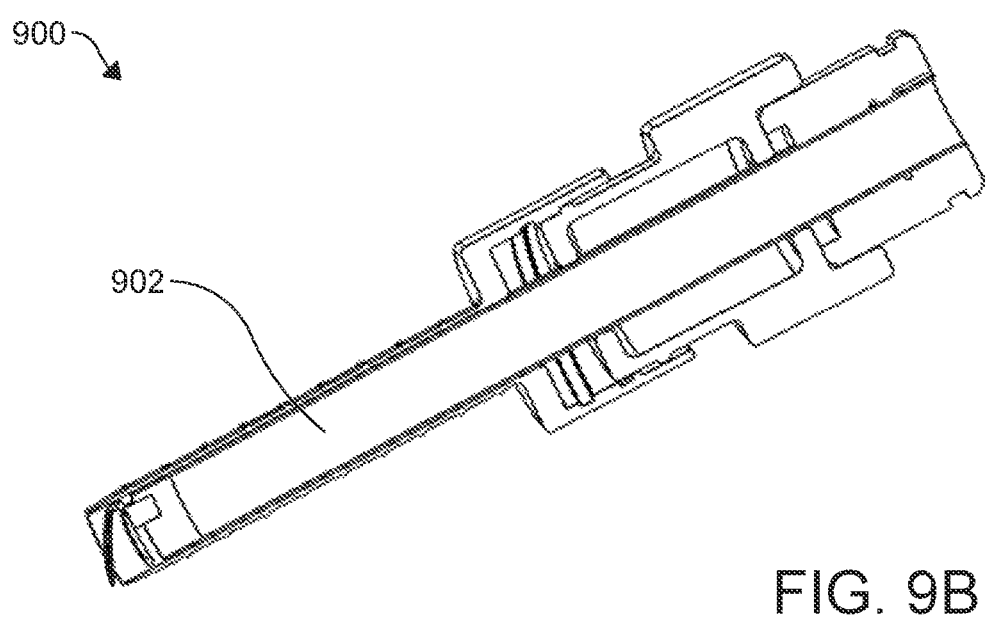
Figure 10:
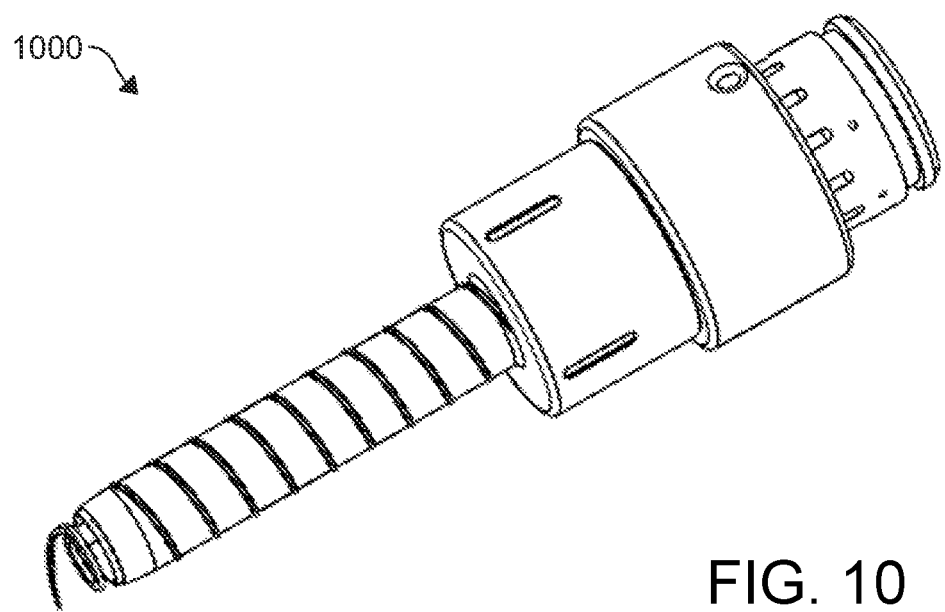
FIG. 10 illustrates an example trocar.

Access to a target tissue site may be achieved via a trocar. Example trocars 800, 900, 1000 are shown in FIGS. 8-10. Trocars may comprise a trocar channel (e.g., trocar channel 802 of FIG. 8B and/or trocar channel 902 of FIG. 9B). Trocar channel may be used to allow air to be introduced into the pleural space when the first layer of the pleural space is penetrated. The intrapleural vacuum may be lost, and thus the lung may be dropped away to minimize the potential of damaging to the lung pleura. Once a lesion has been successfully located, an anchoring device may be used to stabilize the target tissue lesion. The tissue coring device may also be introduced directly to the location of the target lesion using a trocar or under direct visualization with or without a guide anchor and perform the tissue resection.

Open Incision

Access to a target tissue site may be achieved via an open incision. Specifically for the lung, a thoracotomy may be performed and consists of creating a 300 to 450 mm (12 to 18 inches) incision on the chest wall followed by division or dissection of the major back muscles to move them out of the way, partial removal of the rib, and the placement of a rib spreader to provide intra thoracic access to the operating surgeon. The advantage of a thoracotomy is that the surgeon has excellent access to the intrathoracic structures, and may see and manually feel the lung and other structures directly. Once a lesion has been successfully located, an anchoring device (such as the above) may be used to stabilize the target tissue lesion. The tissue coring device may also be introduced directly to the location of the target lesion using an endoscope or under direct visualization with or without a guide anchor and perform the tissue resection.

Tissue Coring

Various methods, devices, and systems may be used to core or remove tissue.

A method for removing a tissue lesion may comprise introducing a tissue resection device to a target tissue site, causing the tissue resection device to resect a core of tissue from the target tissue site, and removing the core of tissue from the body. The core of tissue may comprise at least a portion of a tissue lesion. A method may further comprise creating a core cavity at the target tissue site. A method may further comprise inserting a sleeve into the core cavity. A method may further comprise delivering radiofrequency energy through the core cavity. A method may further comprise delivering chemotherapy through the core cavity. A method may further comprise delivering microwave radiation through the core cavity. A method may further comprise delivering thermal energy through the core cavity. A method may further comprise delivering ultrasonic energy through the core cavity. The tissue resection device may be configured for the delivery of radiofrequency energy. The tissue resection device may be configured for mechanical transection. The tissue resection device may comprise mechanical compression and the delivery of radiofrequency energy. A method may further comprise amputating the core of tissue from the target tissue site. As an example, the means for amputation of the core of tissue may comprise mechanical transection. As a further example, the means for amputation of the core of tissue may comprise the delivery of radiofrequency energy. The means for amputation of the core of tissue may comprise mechanical compression and the delivery of radiofrequency energy. The means for amputation of the core of tissue may comprise transection with an energized wire. Other devices may be used.

A method for removing a core of tissue may comprise introducing a tissue resection device to a target tissue site, causing the tissue resection device to resect a core of tissue from the target tissue site, and removing the core of tissue from the body. A method may further comprise creating a core cavity at the target tissue site. A method may further comprise inserting a sleeve into the core cavity. A method may further comprise delivering radiofrequency energy through the core cavity. A method may further comprise delivering chemotherapy through the core cavity. A method may further comprise delivering microwave radiation through the core cavity. A method may further comprise delivering thermal energy through the core cavity. A method may further comprise delivering ultrasonic energy through the core cavity. The tissue resection device may be configured for the delivery of radiofrequency energy. The tissue resection device may be configured for mechanical transection. The tissue resection device may be configured for mechanical compression and the delivery of radiofrequency energy. A method may further comprise amputating the core of tissue from the target tissue site. The means for amputation of the core of tissue may comprise mechanical transection. The means for amputation of the core of tissue may comprise the delivery of radiofrequency energy. The means for amputation of the core of tissue may comprise mechanical compression and the delivery of radiofrequency energy.

The means for amputation of the core of tissue may comprise transection with an energized wire.

A method for removing a core of tissue may comprise introducing a tissue resection device to a target tissue site. The tissue resection device may comprise one or more of: a first clamping element comprising a helical coil and a first electrode, or a second clamping element comprising a second electrode. Where a second clamping element is included, the second clamping element may be positioned to oppose at least a portion of the first clamping element. The method may further comprise causing the tissue resection device to resect a core of tissue from the target tissue site and removing the core of tissue from the body. A method may further comprise creating a core cavity at the target tissue site. A method may further comprise inserting a sleeve into the core cavity. A method may further comprise delivering radiofrequency energy through the core cavity. A method may further comprise delivering chemotherapy through the core cavity. A method may further comprise delivering microwave radiation through the core cavity. A method may further comprise delivering thermal energy through the core cavity. A method may further comprise delivering ultrasonic energy through the core cavity. The tissue resection device may be configured for resecting the core of tissue comprises the delivery of radiofrequency energy. The tissue resection device may be configured for resecting the core of tissue comprises mechanical transection. The tissue resection device may be configured for resecting the core of tissue comprises mechanical compression and the delivery of radiofrequency energy. A method may further comprise amputating the core of tissue from the target tissue site. The means for amputation of the core of tissue may comprise mechanical transection. The means for amputation of the core of tissue may comprise the delivery of radiofrequency energy. The means for amputation of the core of tissue may comprise mechanical compression and the delivery of radiofrequency energy. The means for amputation of the core of tissue may comprise transection with an energized wire.

A method for sealing biological fluid vessels may comprise piercing a target tissue site containing a least a portion of at least one target biological fluid vessel with a helical tissue sealing mechanism. The helical tissue sealing mechanism may comprise a helical piercing element and a clamping element. The method may comprise causing the helical tissue sealing mechanism to apply mechanical compression to at least one target biological fluid vessel and delivering energy to seal at least one target biological fluid vessel. The helical piercing element may comprise the clamping element. The mechanical compression may be applied between the helical piercing element and the clamping element. A method may further comprise a second clamping element. The mechanical compression may be applied between the first and second clamping elements. The delivered energy may comprise monopolar radiofrequency energy. The delivered energy may comprise bipolar radiofrequency energy. The delivered energy may comprise thermal energy. The delivered energy may comprise ultrasonic energy.

A method for sealing biological fluid vessels may comprise piercing a target tissue site with a helical piercing element, adjusting the pitch of the helical piercing element to apply mechanical compression to the target tissue, and delivering energy to seal at least one biological fluid vessel in the target tissue. The helical piercing element may comprise a plurality of tissue sealing electrodes. The delivered energy may comprise monopolar radiofrequency energy. The delivered energy may comprise bipolar radiofrequency energy. The delivered energy may comprise thermal energy. The delivered energy may comprise ultrasonic energy.

A tissue resection apparatus may comprise a first clamping element comprising a helical coil, a second clamping element, the second clamping element being positioned to oppose at least a portion of the first clamping element, a first and second electrode configured for the delivery of radiofrequency energy for sealing tissue, and a cutting element configured for the transection of at least a portion of the sealed tissue. A tissue resection device may further comprise: a first actuator operable to actuate the first or second clamping element to apply mechanical compression to tissue and a second actuator operable to actuate the cutting element to transect tissue. The helical coil may include first and second contiguous coil segments. The first coil segment may comprise a generally planar open ring. The first coil segment may be helical and may have a pitch of zero. The second coil segment may be helical and may have a non-zero pitch. The second coil segment may have a variable pitch. The first coil segment may be helical and may have a first pitch and the second coil segment may be helical and may have a second pitch, and at least one of the first and second pitches may be variable. The first electrode may be comprised of at least a portion of the first clamping element. The second electrode may be comprised of at least a portion of the second clamping element. The helical coil may comprise a blunt tip. The first and second electrodes may comprise surface profiles that are matching or substantially matching. At least a portion of the cutting element may comprise a sharpened edge. The cutting element may comprise at least one electrode configured for the delivery of radiofrequency energy. The cutting element may comprise an ultrasonic blade. The tissue resection device may further comprise a second cutting element configured for the amputation the core of tissue from the target tissue site. At least a portion of the second cutting element may comprise a sharpened edge. The second cutting element may comprise at least one electrode configured for the delivery of radiofrequency energy. The second cutting element may comprise an energized wire. The second cutting element may comprises a suture. The tissue resection device may further comprise an actuator operable to actuate the second cutting element to transect tissue.

A tissue resection apparatus may comprise a first clamping element having a helical coil disposed on a distal end, a second clamping element, the second clamping element being positioned to oppose at least a portion of the first clamping element, a first and second electrode configured for the delivery of radiofrequency energy for sealing tissue, and a cutting element configured for the transection of at least a portion of the sealed tissue. The tissue resection device may further comprise a first actuator operable to actuate the first or second clamping element to apply mechanical compression to tissue and a second actuator operable to actuate the cutting element to transect tissue. The helical coil may comprise first and second contiguous coil segments. The first coil segment may comprise a generally planar open ring. The first coil segment may be helical and may have a pitch of zero. The second coil segment may be helical and may have a non-zero pitch. The second coil segment may have a variable pitch. The first coil segment may be helical and may have a first pitch and the second coil segment may be helical and may have a second pitch, and at least one of the first and second pitches may be variable. The first electrode may be comprised of at least a portion of the helical coil. The first electrode may be comprised of at least a portion of the first clamping element. The second electrode may be comprised of at least a portion of the second clamping element. The helical coil may comprise a blunt tip. The first and second electrodes may comprise surface profiles that are matching or substantially matching. At least a portion of the cutting element may comprise a sharpened edge. The cutting element may comprise at least one electrode configured for the delivery of radiofrequency energy. The cutting element may comprise an ultrasonic blade. The tissue resection device may further comprise a second cutting element configured for the amputation the core of tissue from the target tissue site. At least a portion of the second cutting element may comprise a sharpened edge. The second cutting element may comprise at least one electrode configured for the delivery of radiofrequency energy. The second cutting element may comprise an energized wire. The second cutting element may comprise a suture. The tissue resection device may further comprise an actuator operable to actuate the second cutting element to transect tissue.

A tissue resection apparatus may comprise a first clamping element comprising a helical coil and a first electrode, and a second clamping element comprising a second electrode, the second clamping element being positioned to oppose at least a portion of the first clamping element. The first and second clamping elements may be configured for: (a) the delivery of radiofrequency energy for sealing tissue, and (b) the application of mechanical compression for the transection of tissue. The tissue resection device may further comprise a first actuator operable to actuate the first or second clamping element to apply mechanical compression to tissue and a second actuator operable to actuate the cutting element to transect tissue. The helical coil may comprise first and second contiguous coil segments. The first coil segment may comprise a generally planar open ring. The first coil segment may be helical and may have a pitch of zero. The second coil segment may be helical and may have a non-zero pitch. The second coil segment may have a variable pitch. The first coil segment may be helical and may have a first pitch and the second coil segment may be helical and may have a second pitch, and at least one of the first and second pitches may be variable. The first electrode may be comprised by at least a portion of the helical coil. The first electrode may be comprised of at least a portion of the first clamping element. The second electrode may be comprised of at least a portion of the second clamping element. The helical coil may comprise a blunt tip. The first and second electrodes may comprise surface profiles that are matching or substantially matching. At least a portion of the cutting element may comprise a sharpened edge. The cutting element may comprise at least one electrode configured for the delivery of radiofrequency energy. The cutting element may comprise an ultrasonic blade. The tissue resection device may further comprise a second cutting element configured for the amputation the core of tissue from the target tissue site. At least a portion of the second cutting element may comprise a sharpened edge. The second cutting element may comprise at least one electrode configured for the delivery of radiofrequency energy. The second cutting element may comprise an energized wire. The second cutting element may comprise a suture. The tissue resection device may further comprise an actuator operable to actuate the second cutting element to transect tissue.

A surgical instrument system for the resection of tissue may comprise an end effector operable to cut and seal tissue, wherein the end effector and a generator configured to provide power to the end effector having the first and second electrodes for sealing tissue. The end effector may comprise a first clamping element comprising a helical coil, a second clamping element, the second clamping element being positioned to oppose at least a portion of the first clamping element, a first and second electrode configured for the delivery of radiofrequency energy for sealing tissue, and a cutting element configured for the transection of at least a portion of the sealed tissue. The surgical instrument system may further comprise a controller in communication with the generator, wherein the controller is configured to control the generator to provide radiofrequency energy sufficient to seal tissue to the first and second electrodes of the end effector, based on at least one sensed operating condition of the end effector. The controller may be configured to sense the presence of tissue at the end effector. The controller may be configured to sense the presence of tissue at the end effector based on a measured impedance level associated with the first and second electrodes. The controller may be configured to sense an amount of force applied to at least one of the first or second clamping elements to detect the presence of tissue at the end effector. The controller may be configured to sense the position of the cutting element relative to at least one of the first or second clamping elements. The controller may be configured to control the generator to provide radiofrequency energy at the end effector when the second actuator is actuated and no tissue is sensed at the end effector. The controller may be configured to control the generator to provide a continuous amount of radiofrequency energy. The controller may be configured to control the generator to automatically provide an increase or decrease in the amount of radiofrequency energy. The system may further comprise a first actuator operable to actuate the first or second clamping element to apply mechanical compression to tissue, and a second actuator operable to actuate the cutting element to transect tissue. The helical coil may comprise first and second contiguous coil segments, the first coil segment including the first electrode. The first coil segment may comprise a generally planar open ring. The first coil segment may be helical and may have a pitch of zero. The second coil segment may be helical and may have a non-zero pitch. The second coil segment may have a variable pitch. The first coil segment may be helical and may have a first pitch and the second coil segment may be helical and may have a second pitch, and at least one of the first and second pitches may be variable. The first electrode may be comprised of at least a portion of the helical coil. The first electrode may be comprised of at least a portion of the first clamping element. The second electrode may be comprised of at least a portion of the second clamping element. The helical coil may comprise a blunt tip. The first and second electrodes may comprise surface profiles that are matching or substantially matching. At least a portion of the cutting element may comprise a sharpened edge. The cutting element may comprise at least one electrode configured for the delivery of radiofrequency energy. The cutting element may comprise an ultrasonic blade. The tissue resection device may further comprise a second cutting element configured for the amputation the core of tissue from the target tissue site. At least a portion of the second cutting element may comprise a sharpened edge. The second cutting element may comprise at least one electrode configured for the delivery of radiofrequency energy. The second cutting element may comprise an energized wire. The second cutting element may comprise a suture. The tissue resection device may further comprise an actuator operable to actuate the second cutting element to transect tissue.

A tissue resection apparatus may comprise a first clamping element comprising a helical coil, a second clamping element, the second clamping element being positioned to oppose at least a portion of the first clamping element, a first and second electrode configured for the delivery of radiofrequency energy for sealing tissue, a first cutting element configured for the transection of at least a portion of the sealed tissue, a first and second ligating element, and a second cutting element positioned between said first and second ligating elements. The tissue resection device may further comprise a first actuator operable to actuate the first or second clamping element to apply mechanical compression to tissue, and a second actuator operable to actuate the cutting element to transect tissue. The helical coil may comprise first and second contiguous coil segments. The first coil segment may comprise a generally planar open ring. The first coil segment may be helical and may have a pitch of zero. The second coil segment may be helical and may have a non-zero pitch. The second coil segment may have a variable pitch. The first coil segment may be helical and may have a first pitch and the second coil segment may be helical and may have a second pitch, and at least one of the first and second pitches may be variable. The first electrode may be comprised of at least a portion of the helical coil. The first electrode may be comprised of at least a portion of the first clamping element. The second electrode may be comprised of at least a portion of the second clamping element. The helical coil may comprise a blunt tip. The first and second electrodes may comprise surface profiles that are matching or substantially matching. At least a portion of the cutting element may comprise a sharpened edge. The cutting element may comprise at least one electrode configured for the delivery of radiofrequency energy. The cutting element may comprise an ultrasonic blade. The tissue resection device may further comprise a second cutting element configured for the amputation the core of tissue from the target tissue site. At least a portion of the second cutting element may comprise a sharpened edge. The second cutting element may comprise at least one electrode configured for the delivery of radiofrequency energy. The second cutting element may comprise an energized wire. The second cutting element may comprise a suture. The tissue resection device may further comprise an actuator operable to actuate the second cutting element to transect tissue.

A tissue sealing mechanism may comprise a helical coil with a generally obround cross section and a tapered point disposed at a distal end, a first and second helical tissue sealing surface, wherein the first and second helical tissue sealing surfaces are provided by the parallel planar surfaces of the helical coil, a first electrode disposed on the first helical tissue sealing surface, and a second electrode disposed on the second helical tissue sealing surface, wherein the first and second electrodes are configured to apply bipolar radiofrequency energy for sealing tissue. The helical coil may comprise first and second contiguous coil segments. The helical coil may comprise a blunt tip. The first and second electrodes may have surface profiles that are substantially matching. The first and second helical tissue sealing surfaces may further comprise a plurality of electrodes configured for the delivery of bipolar radiofrequency energy.

FIGS. 11-17 shown examples devices that may be used to effect a coring process, as described herein. For example, a resection device of the present invention may comprise an energy-based arrangement capable of penetrating tissue towards a target lesion. In one embodiment depicted in FIG. 11, tissue resection device 1100 includes an outer tube 1105 may be provided having a distal edge profile and having an inner diameter IDouter. A coil 1110 may be attached to an outer tube 1105 where the coil turns are spaced from and opposed to a distal end of the outer tube 1105. The coil 1110 preferably has a slightly blunted tip 1115 to minimize the possibility that it will penetrate through a blood vessel while being sufficiently sharp to penetrate tissue such as pleura and parenchyma. In some embodiments, the coil 1110 may take the form of a helix having a constant or variable pitch. The coil 1110 may also have a variable cross-sectional geometry. An electrode 1130 may be disposed on a surface or embedded within the coil 1110.

Figure 11:
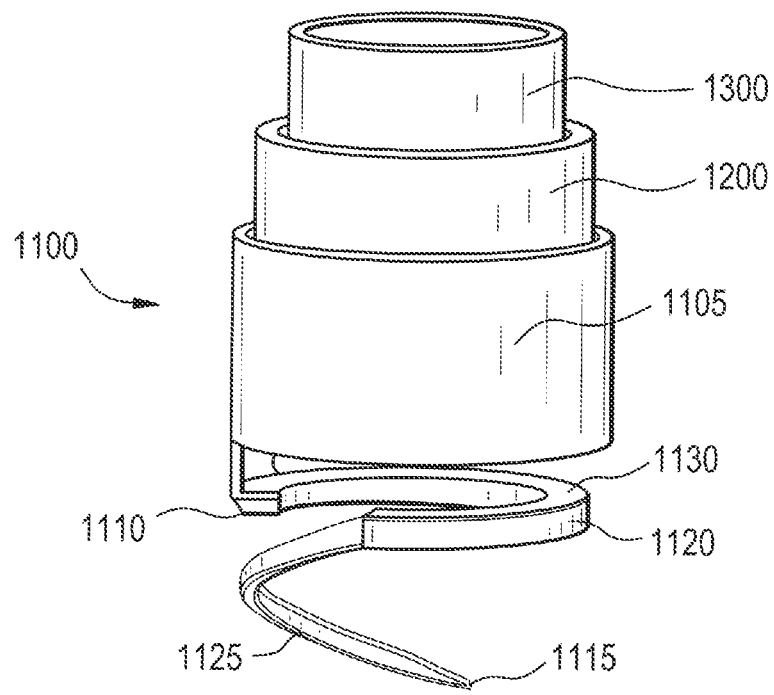
FIG. 11 depicts a tissue resection device in accordance with an embodiment of the present disclosure.

In some embodiments, as illustrated in FIG. 11, the coil 1110 may include a plurality of contiguous coil segments, e.g., coil segments 1120 and 1125. The coil segment 1120 may comprises a helical member having a pitch of zero, e.g., a generally planar open ring structure, having an inner diameter IDcoil and an outer diameter ODcoil. The coil segment 1125 may comprise a helical structure of constant or variable pitch and constant or variable cross-sectional geometry. In this embodiment, the electrode 1130 may be disposed on a surface of or embedded in the coil segment 1120.

Figure 12:
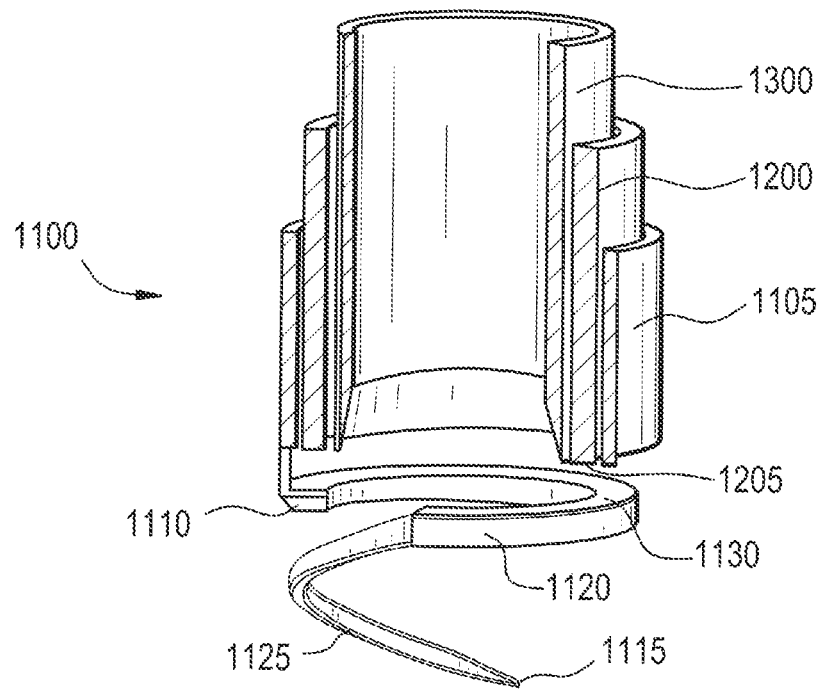
FIG. 12 illustrates a sectional view of the tissue resection device of FIG. 11.

A central tube 1200 may be provided having a distal end with an edge profile comprising one or more surface segments and having an outer diameter ODcentral and an inner diameter IDcentral. As illustrated in FIG. 12, an electrode 1205 may be disposed on or embedded within at least one of the surface segments. The central tube 1200 may be slidably disposed within the outer tube 1105 and positioned such that the electrode 1205 opposes and overlaps at least a portion of electrode 1130. The space between electrode 1205 and electrode 1130 may be referred to as the tissue clamping zone. In keeping with an aspect of the present disclosure, ODcentral>IDcoil and ODcoil>IDcentral. In some embodiments, ODcentral may be about equal to ODcoil. Accordingly, the central tube 1200 may be advanced through the tissue clamping zone towards coil 1110 such that electrode 1205 abuts electrode 1130.

A cutting tube 1300 may be slidably disposed within the central tube 1200. The distal end of the cutting tube 1300 may be provided with a knife edge to facilitate tissue cutting.

To enable tissue resection, the resection device 1100 may be inserted into tissue and the outer tube 1105 may be advanced a predetermined distance towards a target. The coil segment 1125 may allow the device to penetrate the tissue in a manner similar to a cork screw. As the coil segment 1125 penetrates tissue, any vessel in its path may either be moved to planar coil segment 1120 or pushed away from the coil 1100 for subsequent turns. A coil tip 1115 may be made blunt enough to minimize chances that it will penetrate through a blood vessel, while still sharp enough to penetrate certain tissue, such as the lung pleura and parenchyma. The central tube 1200 may then be advanced a predetermined distance towards the target. Any vessels that are disposed in the tissue clamping zone will be clamped between electrode 1130 and electrode 1205. The vessels may then be sealed by the application of bipolar energy to electrode 1130 and electrode 1205. Once blood vessels are sealed, the cutting tube 1300 may be advanced to core the tissue to the depth that the outer tube 1105 has reached. The sealing and cutting process may be repeated to create a core of desired size.

Figure 13:
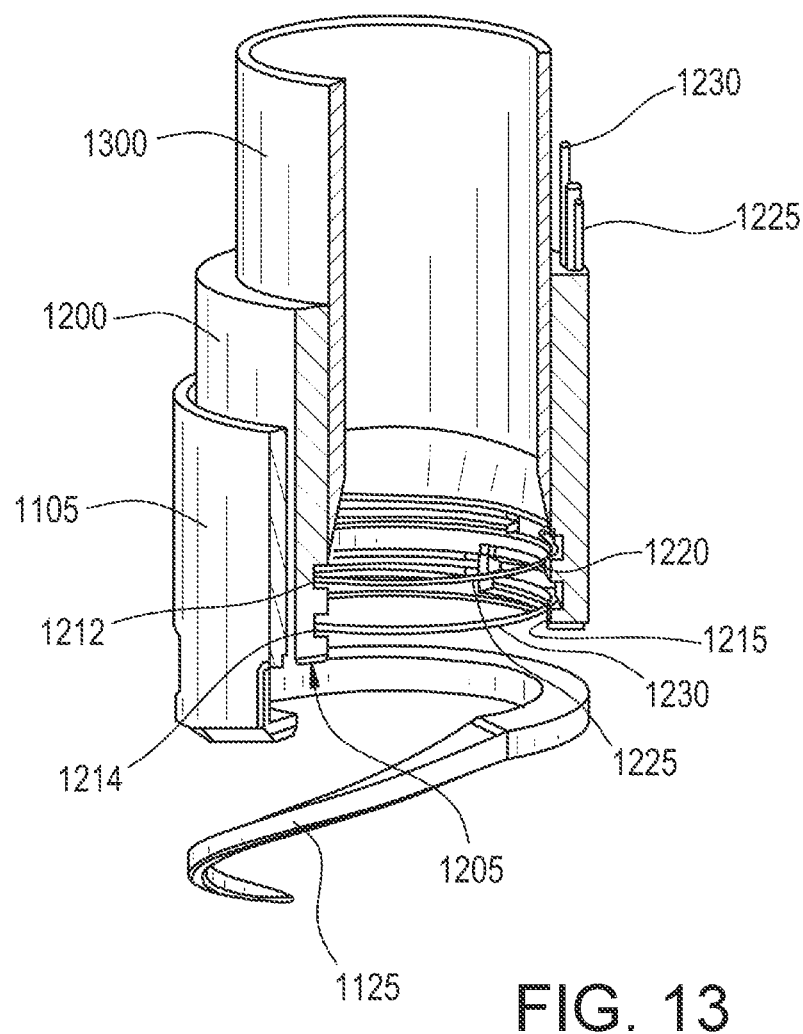
FIG. 13 shows a sectional view of a tissue resection device in accordance with an embodiment of the present disclosure.
Figure 14:
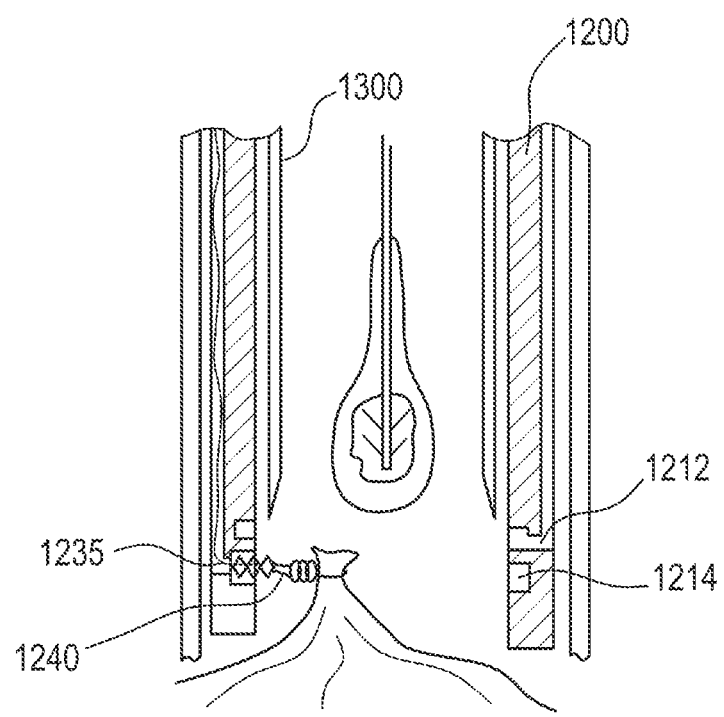
FIG. 14 depicts a sectional view of a tissue resection device in accordance with an embodiment of the present disclosure.

In keeping with an aspect of the present disclosure, the resection device may be further configured to dissect a target lesion and seal tissue proximate the dissection point. To facilitate dissection and sealing, as illustrated in FIG. 13, the central tube 1200 may be provided with a ligation snare 1230, first and second ligation electrodes 1215 and 1220, and an amputation snare 1225. As used herein, the word "snare" refers to a flexible line, e.g., a string or a wire. The inner wall surface of the central tube 1200 may include upper and lower circumferential grooved pathways 1212 and 1214 disposed proximate the distal end. The first and second ligation electrodes 1215 and 1220 may be disposed on the inner wall of central tube 1200 such that lower circumferential groove 1214 may be between them. The upper grooved pathway 1212 may be disposed axially above the ligation electrodes 1215 and 1220.

The ligation snare 1230 may be disposed in the lower circumferential groove 1214 and extends through the central tube 1200 and axially along the outer wall surface to a snare activation mechanism (not shown). The amputation snare 1225 may be disposed in the upper circumferential groove 1212 and extends through the central tube 1200 and axially along the outer wall surface to a snare activation mechanism (not shown). The outer surface of the central tube 1200 may be provided with a plurality of axially extending grooved pathways which receive the amputation snare 1225 and the ligation snare 1230 and are in communication with the upper and lower circumferential grooved pathways 1212 and 1214. In addition, electrode leads for the ligation electrodes 1215 and 1220 may extend to an energy source via the axially extending grooved pathways.

In operation, the resection device of this embodiment may detach and seal the tissue core. The cutting tube 1300 may be retracted to expose the ligation snare 1230 which may be preferably made of flexible line, e.g., suture. The ligation snare 1230 may be engaged to snag tissue and pull tissue against the inner wall surface between the first and second ligation electrodes 1215 and 1220. Bipolar energy may then be applied to the first and second electrodes 1215 and 1220 to seal, i.e., cauterize, the tissue. Once sealed, the cutting tube 1300 may be further retracted to expose the amputation snare 1225 which may then be activated to sever the tissue core upstream from the point where the tissue was sealed (ligation point). In some embodiments, the amputation snare 1225 has a smaller diameter than that of ligation snare 1230. The smaller diameter facilitates tissue slicing. Accordingly, the resection device 1100 according to this embodiment may both create a tissue core and disengage the core from surrounding tissue.

In an alternative embodiment, the resection device of the present disclosure may be provided with a single snare disposed between ligation electrodes which both ligates and cuts tissue. In this embodiment, the single snare may first pull tissue against the inner wall surface of the central tube 1200 between the ligation electrodes 1215 and 1220. Bipolar energy may then applied to the first and second electrodes 1215 and 1220 to seal, i.e., cauterize, the tissue. Once sealed, the snare may further pulled to sever the tissue core.

In yet another embodiment, cutting and sealing may be performed without employing electrodes. In this embodiment, the ligation snare 1230 may include a set of knots 1235 and 1240 which tighten under load, shown, for example, in FIG. 14. Ligation may be performed by retracting the cutting tube 1300 to expose the ligation snare 1230 and activating the ligation snare 1230, which lassos tissue as ligation knot tightens. Once the tissue is lassoed, the cutting tube 1300 may be further retracted to expose the amputation snare 1225 which may then be activated to sever the tissue core upstream from the point where the point where the tissue was lassoed.

The present disclosure also contemplates a method and system for using the resection device to remove tissue lesions, for example, lung lesions. The method generally comprises anchoring the lesion targeted for removal, creating a channel in the tissue leading to the target lesion, creating a tissue core which includes the anchored lesion, ligating the tissue core and sealing the surrounding tissue, and removing the tissue core including the target lesion from the channel.

Anchoring may be performed by, any suitable structure for securing the device to the lung. Once the lesion is anchored, a channel may be created to facilitate insertion of the resection device 1100. The channel may be created by making an incision in the lung area and inserting a tissue dilator and port into the incision. A tissue core which includes the anchored lesion may be created. In keeping with the present disclosure, the resection device 1100 may be used to create the tissue core, to ligate the tissue core and to seal the tissue core and sever it from the surrounding tissue as described hereinabove. The tissue core may then be removed from the channel. As an example, a cavity port may be inserted in the channel to facilitate subsequent treatment of the target lesion site through chemotherapy and/or energy-based tumor extirpation such as radiation. As a further example, a cavity port may be disposed on the perimeter of the tissue resection apparatus. When the apparatus is removed from the tissue site, the cavity port may remain in place or may be removed.

Figure 15:
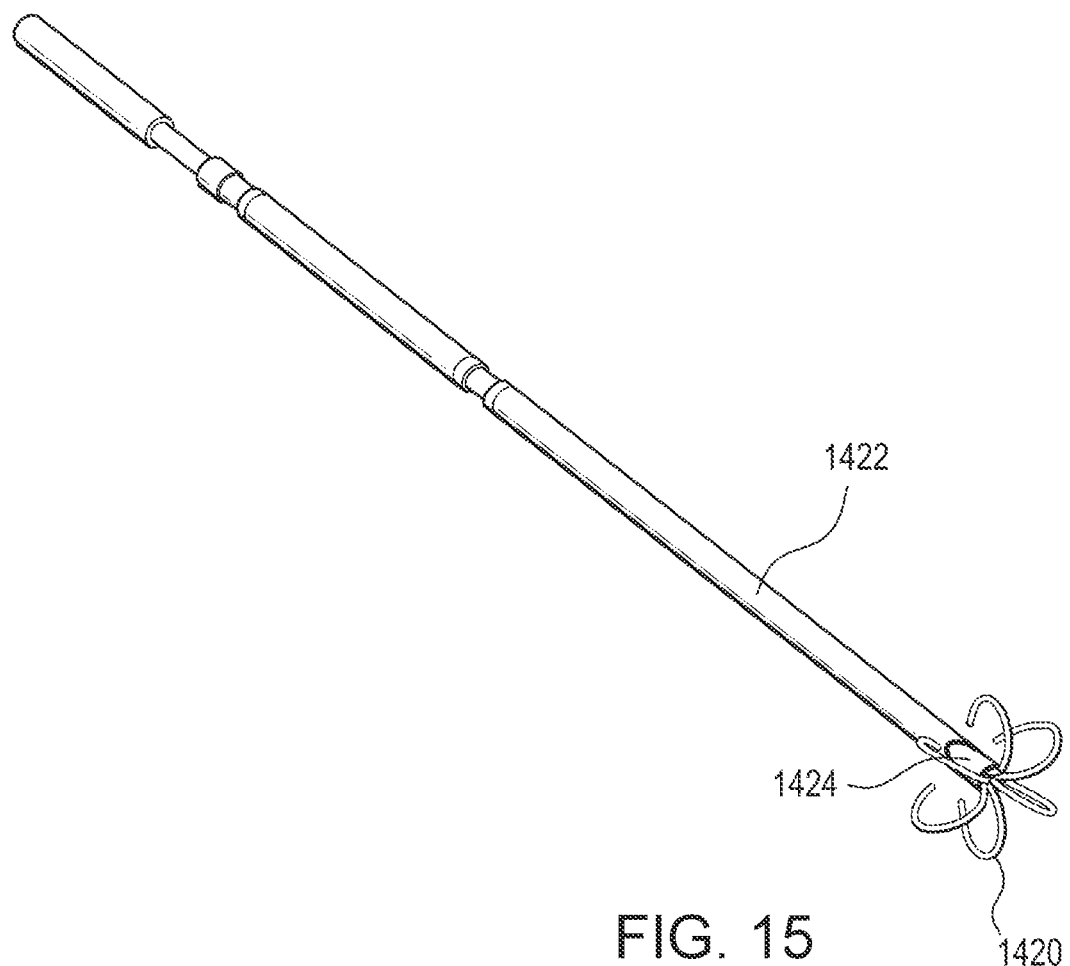
FIG. 15 illustrates an exemplary anchor that may be employed in a lesion removal method in accordance with an embodiment of the present disclosure.

The anchor depicted in FIG. 15 may be suitable for use in performing the method for removing tissue lesions described herein. The anchor may comprise an outer tube 1422 having a sufficiently sharp edge to pierce the chest cavity tissue and lung without causing excess damage and an inner tube 1424 disposed within the outer tube 1422. One or more tines or fingers 1426 formed or preformed from shape memory material, e.g., Nitinol, may be attached to the end of inner tube 1424. The outer tube 1422 may be retractably disposed over the inner tube 1424 such that when the outer tube 1422 may be retracted, the tines 1426 assume their preform shape as shown. In keeping with the present disclosure, the outer tube 1422 may be retracted after it has pierced the lung lesion thereby causing the tines 1426 to engage the lung lesion. Other suitable anchors may include coils and suction-based structures.

Figure 16:
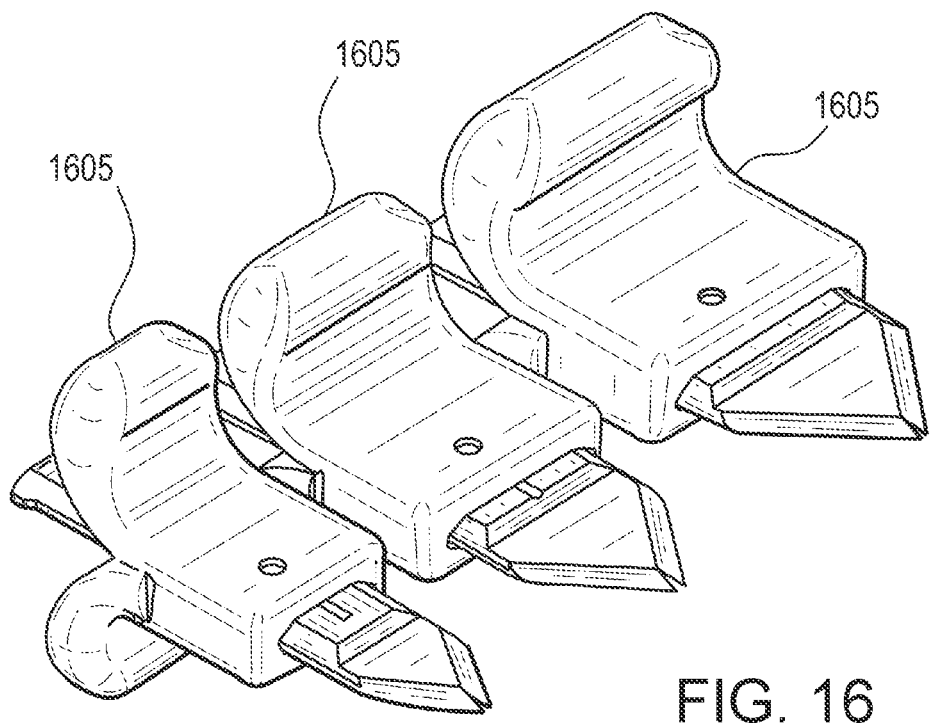
FIG. 16 shows a series of incision blades for use in a lesion removal method in accordance with an embodiment of the present disclosure.

The incision blades depicted in FIG. 16 are suitable for use in performing the method for removing tissue lesions described herein. Once the anchor 1400 is set, it may be preferable to create a small cut or incision to facilitate insertion of chest wall tissue dilator. Incision blades 1605 may be used to make a wider cut. The incision blades 1605 may successive. The incision blades 1605 may include a central aperture which may allow them to be coaxially advanced along the anchor needle 1405 to create a wider cut in the chest wall, with each successive blade being larger than the previous blade, thereby increasing the width of the incision.

Figure 17:
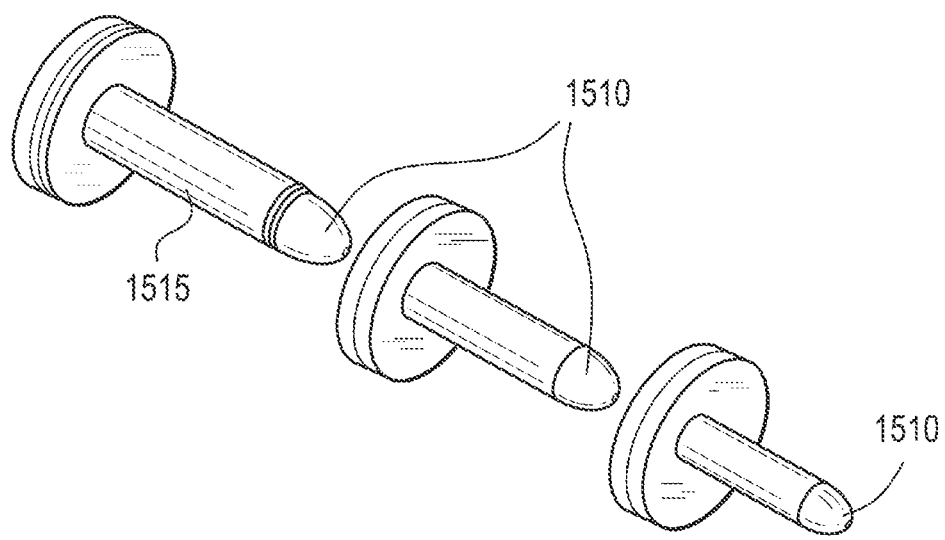
FIG. 17 displays tissue dilators suitable for use in a lesion removal method in accordance with an embodiment of the present disclosure.

The tissue dilator depicted in FIG. 17 may be suitable for use in performing the method for removing tissue lesions described herein. The tissue dilator may comprise any suitable device for creating a channel in organic tissue. In one exemplary embodiment, the tissue dilator assembly includes a single cylindrical rod with a rounded end 1510 or a cylindrical rod with rounded end and a rigid sleeve arrangement 1515. Successive tissue dilators may be coaxially advanced along the anchor needle to create tissue tract or channel in the chest wall, with each successive dilator being larger than the previous dilator, thereby increasing the diameter of the channel. Once a final dilator with rigid sleeve is deployed, the inner rod 1505 may be removed, leaving the rigid sleeve in the intercostal space between ribs to create direct passage to the lung pleura.

Any tissue resection device capable of penetrating lung tissue and creating a tissue core including a target lesion may be suitable for use in performing the method for removing tissue lesions described herein. The tissue resection device 1100 described hereinbefore is preferred.

Once the tissue resection device 1100 is removed, a small channel in the lung may exist where the target lesion was removed. This channel may be utilized to introduce an energy-based ablation device and/or localized chemotherapy depending on the results of the tissue diagnosis. Accordingly, the method and system of the present disclosure may not only be utilized to ensure an effective biopsy is performed but also complete removal of the lesion with minimal healthy lung tissue removal is accomplished.

Generator

Electrical energy applied by the devices of the present disclosure may be transmitted to the devices by a generator. The electrical energy may be in the form of radio frequency ("RF") energy. In application, an electrosurgical instrument may transmit RF energy through tissue, which causes ionic agitation, or friction, in effect resistive heating, thereby increasing the temperature of the tissue. Because a sharp boundary is created between the affected tissue and the surrounding tissue, surgeons may operate with a high level of precision and control, without sacrificing un-targeted adjacent tissue. The low operating temperatures of RF energy is useful for removing, shrinking, or sculpting soft tissue while simultaneously sealing blood vessels.

The devices of the present disclosure is designed to work with any commercially available bipolar energy generator, such as an Enseal generator or a Bovie generator. The devices of the present disclosure may interface with a "brand-agnostic" generator adapter that enables device operation regardless of the proprietary brand of generator used to delivery radiofrequency energy. In an exemplary embodiment, the adapter may automatically or, with the assistance of a user, manually identify the specific generator product that is connect to any of the devices of the present disclosure. The generator adapter may modify, modulate, or change the output of the generator (which may have subtle characteristic differences depending on the specific generator used) to ensure optimal tissue sealing using the tissue coring devices of the present disclosure. The generator provides radiofrequency power to drive the devices of the present disclosure such as an electrosurgical coring instrument that is used during open or laparoscopic general surgery to cut and seal vessels and to cut, grasp, and dissect tissues. The generator has an Adaptive Tissue Technology, which delivers intelligent energy for greater precision and efficiency.

Sample Analysis

Various systems, devices, processes, and apparatus may be used to analyze a sample such as a cored tissue sample. For example, tissue histology, DNA sequencing, rapid on-site evaluation (ROSE), or a combination of the same may be used. The coring method described provides a large tissue sample. Following the removal of a core of tissue from a site of interest, the specimen may be analyzed for diagnostic purposes using any of the methods described below, independently or in combination.

Figure 18:
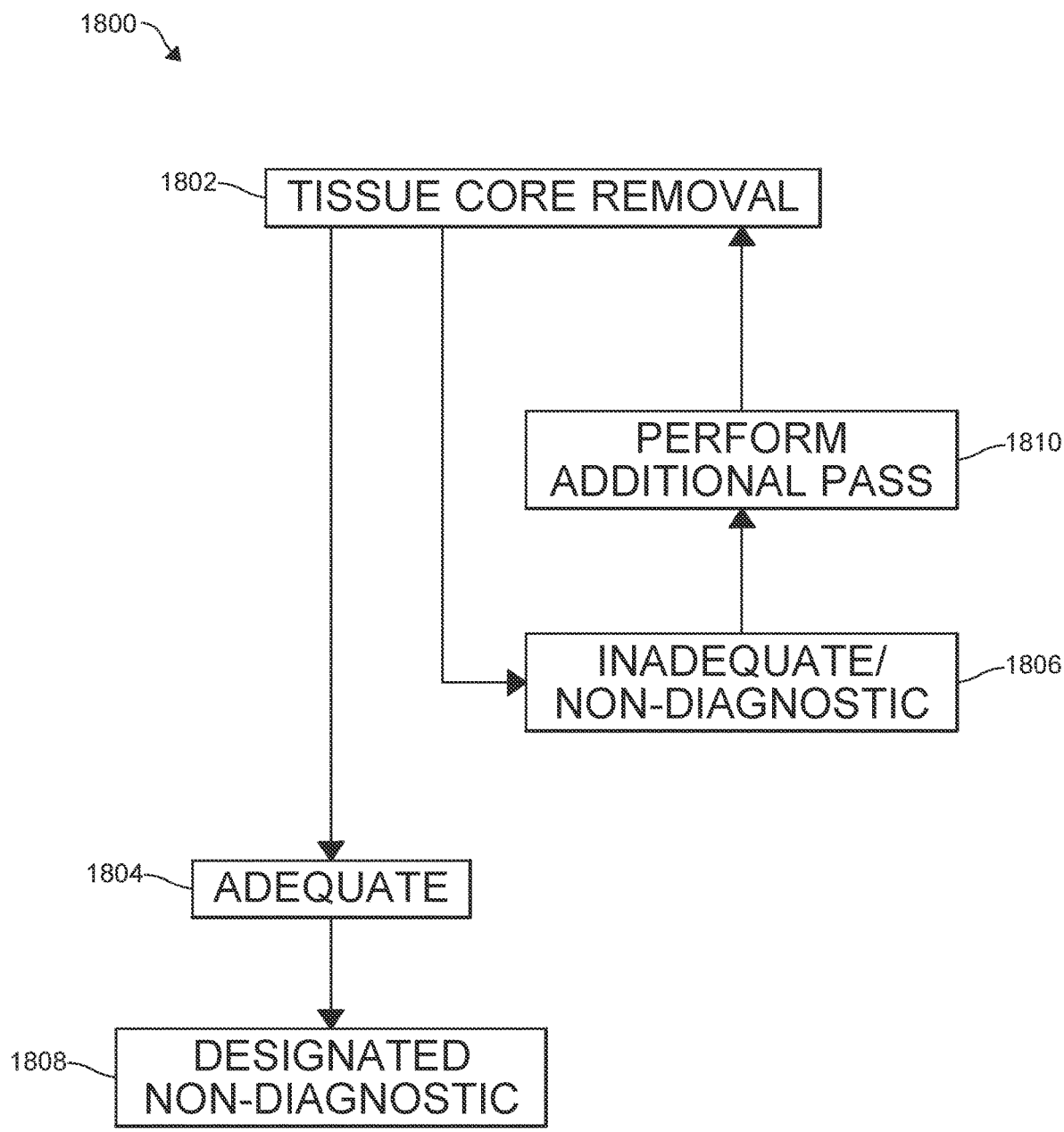
FIG. 18 shows an example workflow of tissue sample analysis.

FIG. 18 shows an example workflow 1800 of tissue sample analysis. As illustrated in FIG. 18, tissue sample analysis may further comprise one or more of: removing core tissue (1802) and determining if the removed core tissue is adequate (1804), or inadequate/non-diagnostic (1806). If adequate, the removed tissue core may be analyzed using a designated analysis technique (1808). If inadequate, the workflow may perform an additional pass (1810), and the cycle may continue, starting with step 1802.

Rapid On-Site Evaluation (ROSE)

Rapid on-site examination (ROSE) is a rapid, real-time examination method of the specimen at hand. Use of ROSE during lung lesion biopsy sampling has been suggested to improve diagnostic yield. Reported advantages of ROSE include reduced number of biopsies performed, a lower procedural risk, and an improved accuracy yield. The core of tissue isolated may be analyzed using ROSE techniques. Using ROSE, one may check the sample adequacy and establish a preliminary diagnosis by performing a rapid stain in the bronchoscopy suite or operating room, with evaluation by a cytopathologist or a trained cytotechnologist.

Histology

Morphologic assessment of the core tissue sample may be performed by routine hematoxylin-eosin (H & E) staining, thereby allowing for interpretation of the biopsy.

Immunohistochemistry

A vast majority of neoplasms arising from lung or pleura are initially diagnosed based on the histologic evaluation of tissue biopsies. Although most diagnoses may be determined by morphology alone, immunohistochemistry may be a valuable diagnostic tool in the workup of problematic cases. The core tissue sample may also be analyzed using immunohistochemistry. This may help differentiate between lung adenocarcinoma and squamous cell carcinoma (SqCC), lung adeno-carcinoma and malignant mesothelioma (MM), primary and metastatic carcinomas, and small cell lung carcinoma (SCLC) and carcinoid tumor.

Electron Microscopy

The cored tissue sample may be evaluated using electron microscopy. Electron microscopy may be used to visualize details of a cancer cell's structure that provide clues to the exact type of the cancer.

Flow Cytometry

Flow cytometry is used to detect the presence of tumor markers, such as antigens, on the surface of the cells. It may be used to help in the diagnosis of cancer. The core of tissue isolated may be analyzed using flow cytometry.

Image Cytometry

DNA image cytometry (DNA-ICM) has gained attention for its diagnostic advantages, including objectivity, convenience and a high positive rate, in diagnosing various malignant cancer types. Thus technique has been successfully used for lung biopsies. The core of tissue isolated may be analyzed using image cytometry.

Polymerase Chain Reaction (PCR)

The core of tissue isolated may be analyzed using PCR. PCR may be used to look for certain changes in a gene or chromosome, which may help find and diagnose a genetic condition or a disease, such as cancer.

Gene Expression Microarrays

The core of tissue isolated may be analyzed using gene expression microarrays. Microarray-based technology is an ideal way in which to study the effects and interactions of multiple genes in cancer.

Fluorescent In Situ Hybridization (FISH)

The core of tissue isolated may be analyzed using FISH technology. FISH may be used to identify where a specific gene is located on a chromosome, how many copies of the gene are present, and any chromosomal abnormalities. It is used to help diagnose diseases, such as cancer.

Genetic Sequencing

Next-generation sequencing (NGS) helps to characterize cancer and is rapidly being implemented to guide therapy. It has been previously demonstrated that small lung biopsy samples yield adequate quality DNA and RNA, enabling high-quality NGS analysis. The core of tissue isolated may be analyzed using NGS techniques.

Atomic Force Microscopy

The core of tissue isolated may be analyzed using atomic force microscopy. Atomic force microscopy (AFM) allows for nanometer-scale investigation of cells and molecules. The physicochemical properties of live cells undergo changes when their physiological conditions are altered. These physicochemical properties may therefore reflect complex physiological processes occurring in cells. When cells are in the process of carcinogenesis and stimulated by external stimuli, their morphology, elasticity, and adhesion properties may change. AFM may perform surface imaging and ultrastructural observation of live cells with atomic resolution under near-physiological conditions, collecting force spectroscopy information which allows for the study of the mechanical properties of cells. For this reason, AFM has potential to be used as a tool for the analysis and diagnosis of lung biopsy samples.

Surface Enhanced Ramen Spectroscopy

The core of tissue isolated may be analyzed using surface enhanced Ramen spectroscopy. Ramen spectroscopy may characterize biomolecules, because each macromolecule (lipid, protein, DNA, etc.) has unique finger-printing information about the modes of vibration and rotation. Therefore, Raman spectroscopy may be a promising tool for cancer diagnostics in the future. Nevertheless, Raman spectroscopy has the deficiency of low sensitivity in practical application. Compared with conventional Raman spectroscopy, Raman scattering signals may be strengthened by 4-15 orders of magnitude utilizing surface-enhanced Raman spectroscopy (SERS) technology. Studies have shown that the Raman enhancement effect may be obtained by utilizing silver nanospheres, gold nanospheres, and similar particulates. In clinical detection, label-free SERS detection of tissue provides a rapid and facile way to differentiate tumors from normal tissues. The differences in SERS spectra between lung cancer and normal tissue may be used to potentially diagnose lung cancer.

Sealing

The present disclosure relates to a method to deliver a fill material such as autologous blood to the core site that may be used to seal and provide pneumostasis. As an example, once the tissue specimen is cored and removed from the lung, there may be a need to seal the core site to provide pneumostasis. As a further example, pneumostasis may be achieved in the same surgery session as the tissue removal.

Although autologous blood is described herein as an example, other fill materials and additives may be used. For example, a hemostatic adjunct such as an absorbable gelatin foam (e.g., SURGIFOAM®), biologic, oxidized regenerated cellulose (ORC), fibrin/thrombin spray, etc. As a further example, a patient may have a rare disorder of hemophilia in which their blood does not clot normally. Other patients may be on blood thinning medicines which could inhibit blood clotting formation. For such patients, to seal the cored cavity, thrombin and/or fibrinogen may be added to the autologous blood sample to aid in clot formation. Reactive polyethylene glycol (PEG), ammonium sulfate, ethanol, calcium chloride, or magnesium chloride may also be added to the blood sample to aid in clot formation. Another source for the blood to be used to seal the cored cavity is donated blood from other people or blood bank. Donated blood may be used with or without clotting agents as mentioned above.

Systems and/or methods for sealing tissue are described herein. An example method may comprise disposing a port to provide access to a target site. The target site may comprise biological tissue. The target site may comprise tissue of a lung. The target site may comprise a cored tissue. The target site may comprise a punctured tissue. Other sites may benefit from the disclosed methods.

Example methods may comprise anchoring an anchor device (e.g., via the port) to a surface at the target site. Anchoring may be performed by any suitable structure for securing the device to the lung. Example methods may comprise disposing (e.g., via the port) a sealing device adjacent the target site. Example methods may comprise disposing a sealing device adjacent the target site using the anchoring device as a guide. The sealing device may comprise an inflatable balloon. The sealing device may comprise an inflatable balloon with an array of radio frequency (RF) electrodes configured to ablate and seal tissue. The sealing device may comprise an inflatable balloon configured to seal tissue using a thermal fluid. The sealing device may comprise an inflatable balloon catheter. The sealing device may comprise an access port with an array of RF electrodes configured to ablate and seal tissue. The sealing device may comprise at least one microwave ablation probe.

Example methods may comprise causing the sealing device to seal the target site. The causing the sealing device to seal the target site may comprise causing at least a portion of the sealing device to abut a portion of the target site. Example methods may comprise disposing a fill material adjacent the target site. Example methods may comprise disposing a fill material adjacent the target site via a fill material delivery device such as a catheter. The fill material may comprise autologous blood, donated blood, recirculated blood, hemostatic adjuncts such as fibrin and/or thrombin, biological tissue adhesives such as Dermabond®, ORC, absorbable gelatin, or any combination thereof. The fill material may promote pneumostasis. The fill material may additionally promote hemostasis. Other materials may be used. The sealing device may minimize escape of the fill material from the target site.

As an illustrative example, the target site may comprise at least a portion of a lung. The lung may be caused to collapse prior to disposing the sealing device adjacent the target site. The lung may be allowed to ventilate while the sealing device is sealing the target site. The sealing device may be spaced (e.g., removed, separated, etc.) from the target site after the fill material is disposed.

Systems and/or methods for sealing are described herein. An example method may comprise disposing a sealing device adjacent a target site of a lung. The sealing device may be disposed adjacent the target site while the lung is collapsed. However, the lung may be ventilated. Example methods may comprise causing the sealing device to seal the target site. Example methods may comprise disposing a sealing device adjacent the target site using the anchoring device as a guide. The sealing device may comprise an inflatable balloon. The sealing device may comprise an inflatable balloon with an array of RF electrodes configured to ablate and seal tissue. The sealing device may comprise an inflatable balloon configured to seal tissue using a thermal fluid. The sealing device may comprise an inflatable balloon catheter. The sealing device may comprise an access port with an array of RF electrodes configured to ablate and seal tissue. The sealing device may comprise at least one microwave ablation probe. Example methods may comprise disposing a fill material adjacent the target site. Example methods may comprise disposing a fill material adjacent the target site via a fill material delivery device such as a catheter. The fill material may comprise autologous blood, donated blood, recirculated blood, hemostatic adjuncts such as fibrin, thrombin, biological tissue adhesives such as Dermabond®, ORC, absorbable gelatin, or any combination thereof. The fill material may promote pneumostasis. The fill material may additionally promote hemostasis. Other materials may be used. The sealing device may minimize escape of the fill material from the target site.

Systems and/or methods for sealing are described herein. An example method may comprise disposing a fluid delivery device into a target site of a lung. The sealing device may be disposed adjacent the target site while the lung is collapsed. However, the sealing device may be disposed adjacent the target site when the lung is ventilated. Example methods may comprise disposing a fill material into the target site. Example methods may comprise spacing (e.g., removing, separating, etc.) the sealing device from the target site.

The sealing device may comprise an inflatable balloon. The sealing device may comprise an inflatable balloon with an array of RF electrodes configured to ablate and seal tissue. The sealing device may comprise an inflatable balloon configured to seal tissue using a thermal fluid. The sealing device may comprise an inflatable balloon catheter. The sealing device may comprise an access port with an array of RF electrodes configured to ablate and seal tissue. The sealing device may comprise at least one microwave ablation probe. The systems and/or methods described herein may allow clotted blood to provide a seal to achieve pneumostasis. Example methods may comprise disposing a fill material adjacent the target site. Example methods may comprise disposing a fill material adjacent the target site via a fill material delivery device such as a catheter. The fill material may comprise autologous blood, donated blood, recirculated blood, hemostatic adjuncts such as fibrin, thrombin, biological tissue adhesives such as Dermabond®, ORC, absorbable gelatin, or any combination thereof. The fill material may promote pneumostasis. The fill material may additionally promote hemostasis. Other materials may be used. The sealing device may minimize escape of the fill material from the target site.

The target site may comprise a cavity. The cavity may be closed, for example, after sealing. Closing the cavity may comprise using biological tissue adhesive such as Dermabond®, tissue grafts, hemostatic sealing patches, staple closure, sutures, or the like.

Figure 19:
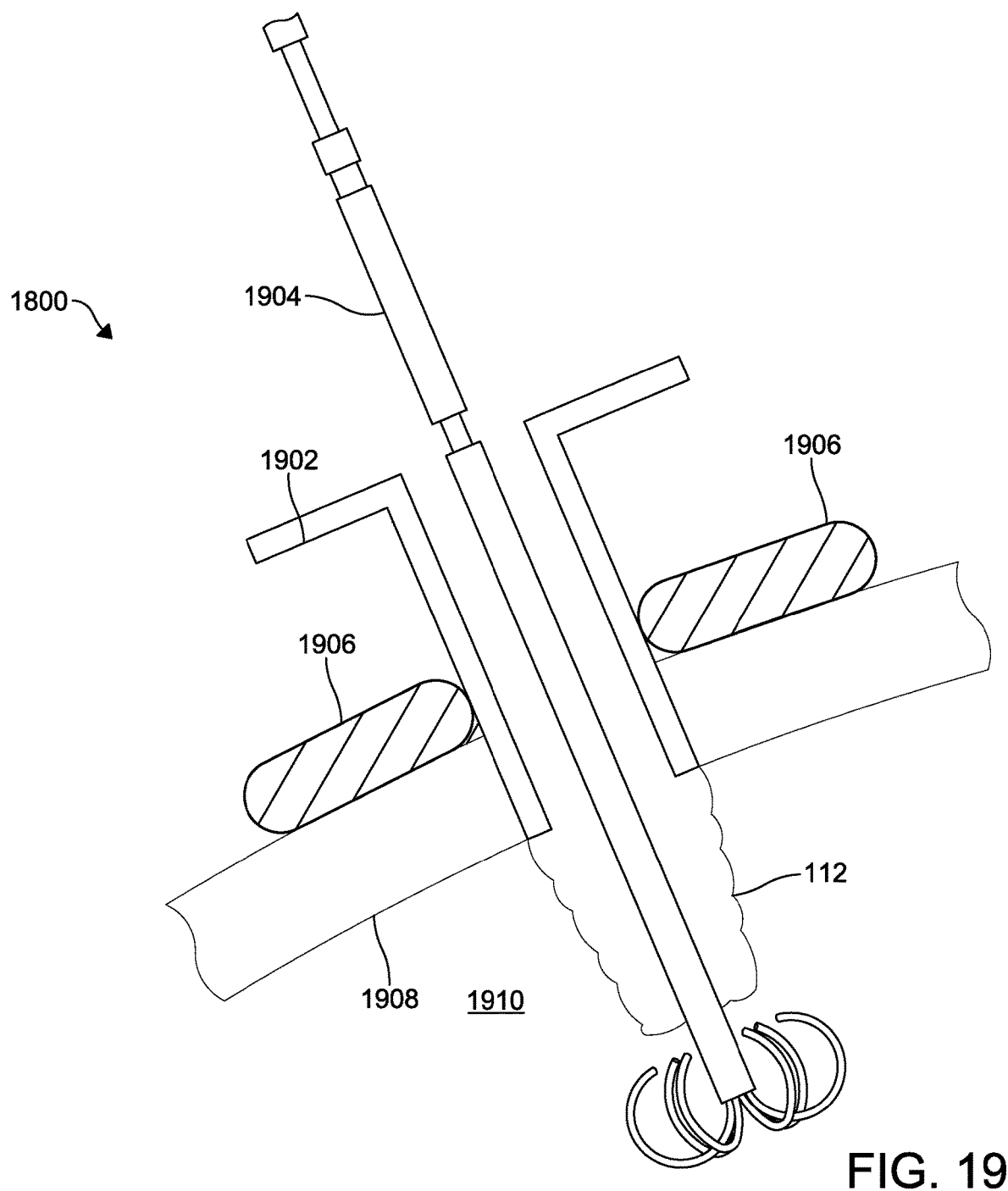
FIG. 19 shows an application of an example system for sealing tissue.

FIG. 19 shows an example system 1900. The system 1900 may comprise a port such as chest port 1902 configured to provide access, such as via a channel to a portion of a body. It should be understood that various channels or ports may be used throughout the body and the chest port 1902 is shown as a non-limiting example. As an illustrative example, the chest port 1902 is shown disposed adjacent ribs 1906 to provide access to lungs 1910 of a patient. However, other sites may be used and a chest port 1902 (or other port) may not be necessary. An anchor device 1904 may be anchored to tissue, such as the lung 1910. An example anchor device is shown in FIG. 6 for illustration. However, any suitable device for anchoring to the target site 1912 may be used. As show, the anchor device 1904 extends via the chest port 1902, through the pleura 1908, and anchors to tissue in the lung 1910. The anchor device 1904 may be anchored (e.g., releasably coupled) to a tissue at a target site 1912. The target site 1912 may comprise a core site where a portion of lung tissue has been cored, punctured, or removed. The anchor device 1904 may be placed at the target site 1912 while the lung is inflated. However, other processes may be implemented while the lung is collapsed.

Figure 20:
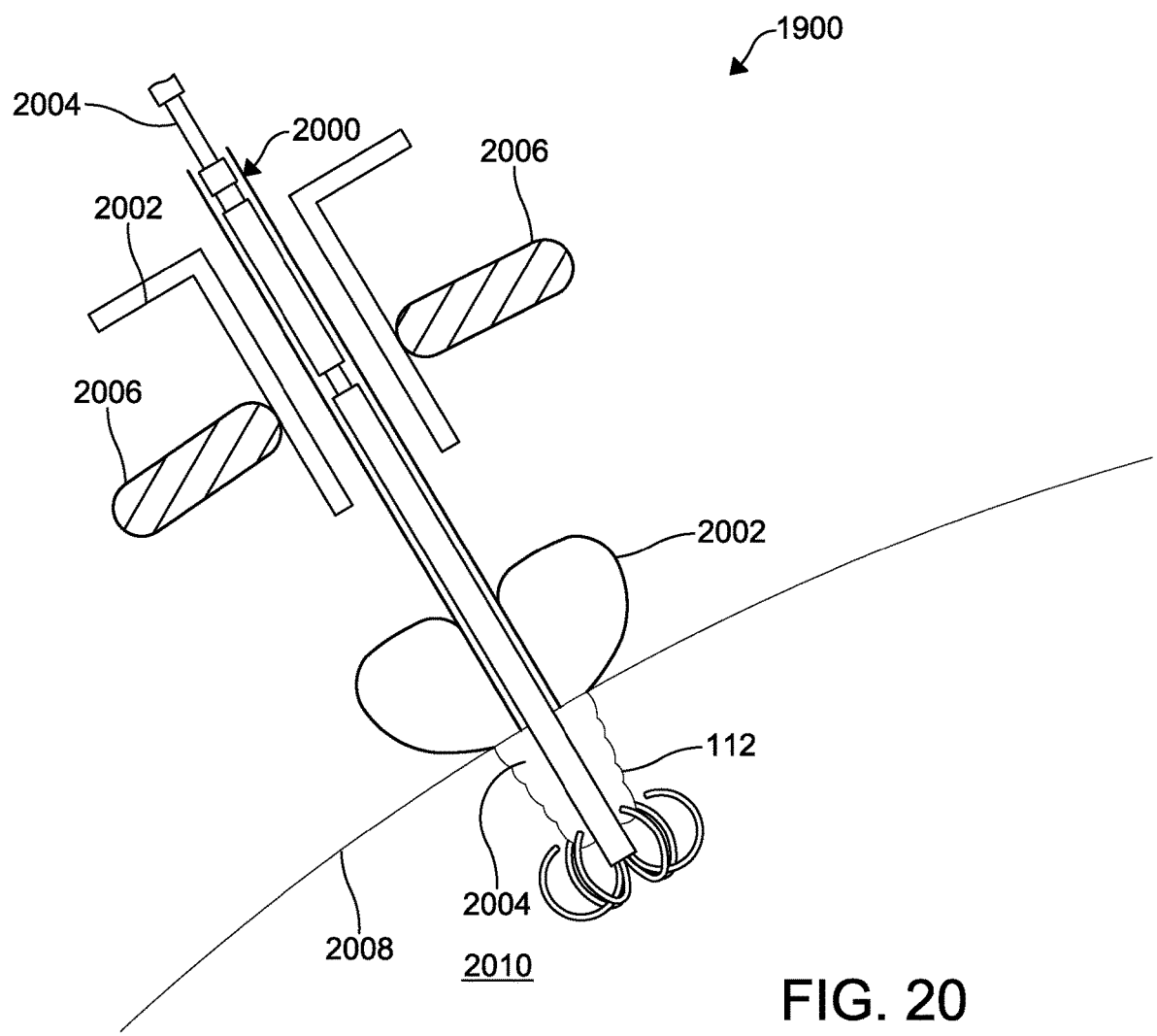
FIG. 20 shows an application of an example system for sealing tissue.

FIG. 20 shows an application of an example sealing device 2000. The sealing device 2000 may comprise an inflatable balloon 2002. Other sealing mechanisms may be used. The sealing device 2000 may comprise and/or be in contact with a balloon catheter. The balloon catheter may be a single lumen balloon catheter. The balloon catheter may be multi-lumen balloon catheter. The sealing device 2000 may be disposed adjacent the target site 2012. As such, the sealing device 2000 may seal the target site 2012 to minimize exit of a fluid or material from the target site 2012. As an example, a fill material 2004 may be disposed at the target site 2012 and may be sealed in the target site 2012 by the sealing device 2000. As an illustrative example, the inflatable balloon 2002 may provide sealing while the lung 110 moves (e.g., inflates and deflates). The sealing device 2000 may be implemented when the lung 2010 is inflated or collapsed.

Example sealing procedures are described herein and include fill materials, ablation, mechanical pressure, energy emission (e.g., RF energy), and others, for example. Causing the sealing device to seal at least a portion of the core cavity at the target site may comprise causing at least a portion of the sealing device to abut a wall defining the core cavity. Causing the sealing device to seal at least a portion of the core cavity at the target site may comprise ablating a wall defining the core cavity. Causing the sealing device to seal at least a portion of the core cavity at the target site may comprise applying pressure to a wall defining the core cavity. Methods may further comprise disposing a fill material in the core cavity, wherein the sealing device minimizes escape of the fill material from the core cavity. The fill material may comprise autologous blood. As an example, the target site may comprise at least a portion of a lung and the method may further comprise causing the lung to collapse prior to disposing the sealing device adjacent the target site. As a further example, the target site may comprise at least a portion of a lung and methods may further comprise allowing the lung to ventilate while the sealing device is sealing the target site.

An example system for implementing one or more of the methods of the present disclosure may comprise a guided anchor. The example system may comprise a single lumen balloon catheter. The example system may comprise a multi-lumen balloon catheter. The example system may comprise a coring device. Post coring by the coring device, an anchor may be introduced into the tissue cavity to ensure access to a cored site. The chest port may be removed, and the lung may be collapsed. The balloon catheter may be inserted over the anchor. Once the balloon catheter is in the chest cavity, the balloon catheter may be inflated. The inflated balloon catheter may be moved forward and pushed slightly against lung tissue. Autologous blood may be injected into a core site through the inflated balloon catheter. The inflated balloon catheter and autologous blood may be held in place for a predetermined time period (e.g., one (1) minute, etc.) to allow the blood to clot at the core site. The lung may be allowed to resume ventilation. The inflated balloon catheter may be allowed to go up and down with the lung while maintaining contact with the lung to keep the blood at the core site to facilitate further clotting. The balloon catheter may be deflated. The balloon catheter and anchor may be removed after a predetermined time period (e.g., three (3) minutes, etc.). The autologous blood may be clotted at the core site to provide pneumostasis.

In an embodiment, the anchor and/or the balloon catheter may be used to deposit autologous blood at the core site with the lung collapsed. The anchor and/or the balloon catheter may be removed right after the autologous blood is delivered. The blood may be allowed to clot in place with a predetermined time period (e.g., five (5) minutes, etc.) before the lung is allowed to resume ventilation.

The example system may cause autologous blood to be delivered to the core site. Other fill materials may be used.

The example system may allow clotted blood to provide a seal to achieve pneumostasis.

In an embodiment, a method and apparatus are provided whereby a plug or series of stitches are on a wire within the chest in a compressed configuration. When it is desired to seal the pleural space, the wire may be pulled back towards the operator, bringing the plug or stitches in opposition to the internal opening of the body space. The device may then be actuated to insert the plug or Stitches into the internal body space opening, and the wire breaks away, thereby closing the hole and preventing fluid from leaking out or air from getting sucked back in.

Polypeptide/protein-based adhesives, fibrin-based adhesives, gelatin-based adhesives, collagen-based adhesives, albumin based adhesives, polysaccharide-based adhesives, chitosan-based adhesives, human blood-based adhesives, and animal-based adhesives, and synthetic and semi-synthetic adhesives (such as cyanoacrylates, polyethylene glycol hydrogels, urethane-based adhesives, and other synthetic adhesives). The fluid may fill the volume of the tract and may be heated with RF energy or laser beyond the temperature of the surrounding tissue, to a temperature sufficient to cauterize and seal the surrounding tissue. The combination of the fluid and the RF seals the surrounding tissues Various methods, devices, and systems may be used to core or remove tissue.

Therapy

Various therapies may be implemented.

FIGS. 21-22 show illustrative examples, but other methods of ablation or energy emission may be used for sealing tissue. For example, a shaped mesh catheter may be used. As such, a catheter with collapsed meshed shape may be inserted into the cavity and the cavity sheath may be removed. The mesh may be then expanded, and suction may be applied to pull tissue to contact with the mesh. Energy, e.g. RF, may then be applied to ablate the cavity tissue wall.

Margin Ablation

Introducing an energy delivery device into a tissue cavity and delivering energy to eradicate cancerous tissue. Once the target tissue has been cored out and removed, the tissue wall of the cavity may be ablated. For example, any of the following ablation methods could be used:

Rotating Ablation Probe

Figure 21A:
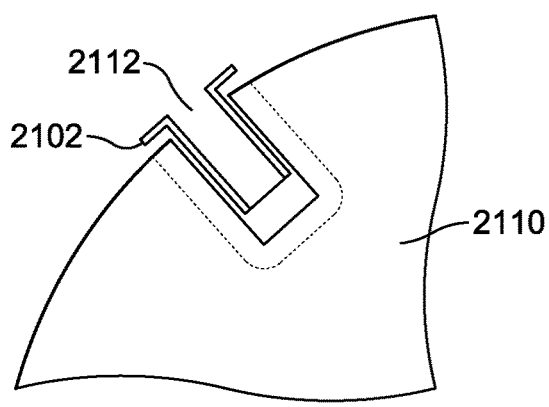
FIGS. 21A, 21B, and 21C show an application of an example system for sealing tissue.
Figure 21B:
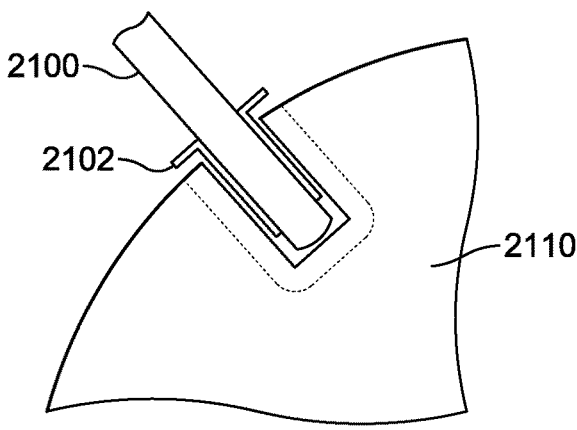
Figure 21C:
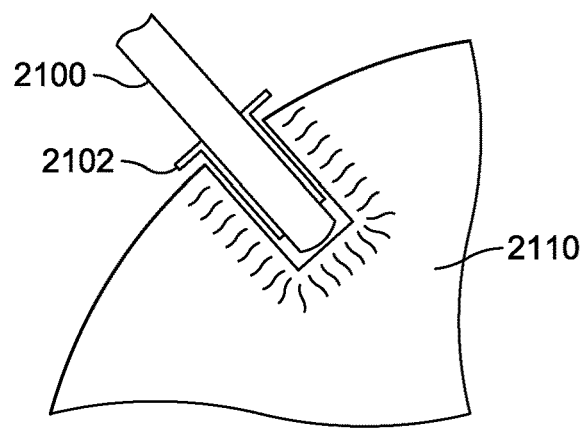

FIGS. 21A-21C show an example application. As shown, once a target site has been cored out and the tissue core removed, there may be a need to ablate the tissue wall of the cavity. As such, the following ablation methods could be used. For example, a rotating ablation probe may be used. FIG. 21A shows a cored-out cavity 2112 in tissue 2110 with the cavity sheath 2102 in place to keep the cavity open. A rotating probe 2100 may then be inserted into the cavity sheath 2102, as shown in FIG. 21B. The probe 2100 may be equipped with an energy source such as an array of energy heads or a continuous energy strip. The energy may be microwave, RF, other output form. Once the probe 2100 is in place, the cavity sheath 2102 may remain in place or be removed. The energy may then be applied while the probe/ energy heads are rotated to give a radially continuous ablation on the wall and bottom tissue 2110 of the cavity, as shown in FIG. 21C.

Hot Balloon Catheter

Figure 22A:
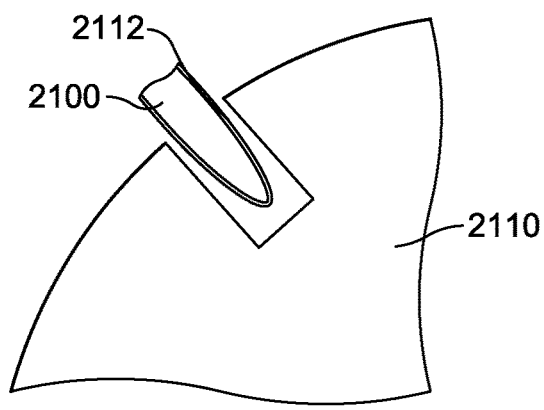
FIGS. 22A and 22B show an application of an example system for sealing tissue.
Figure 22B:
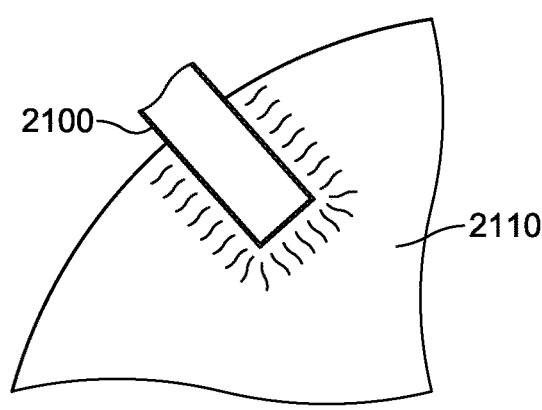

FIGS. 22A-22B show an example application. As shown, a hot balloon catheter may be used. For example, a balloon catheter 2200 may be placed into a cavity 2212 formed in tissue 2210 and a cavity sheath may be removed to expose the cavity 2212 needed to be ablated, as shown in FIG. 22A. The balloon 2200 may then be inflated with hot fluid or hot air/gas to ablate the cavity wall tissue 2210, as shown in FIG. 22B.

Figure 23A:
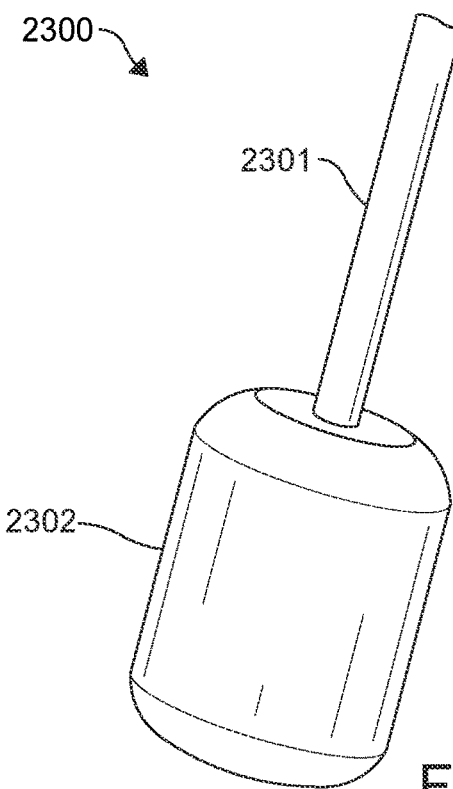
FIGS. 23A, 23B, and 23C show an application of an example system for sealing tissue.
Figure 23B:
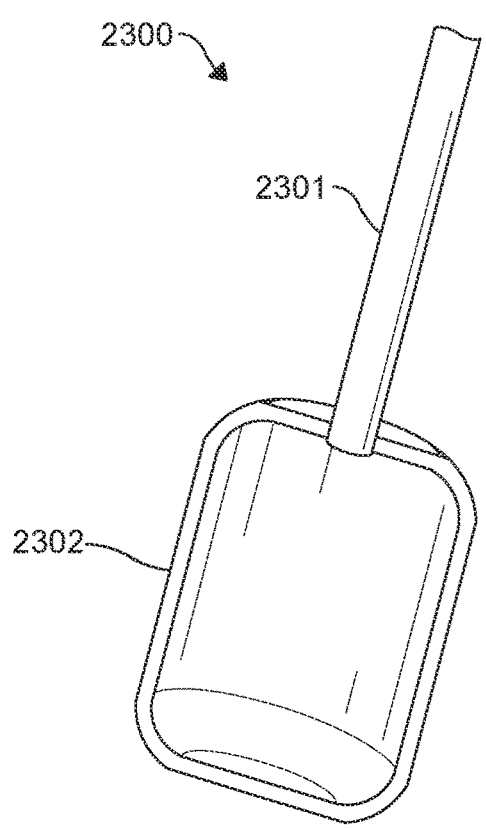
Figure 23C:
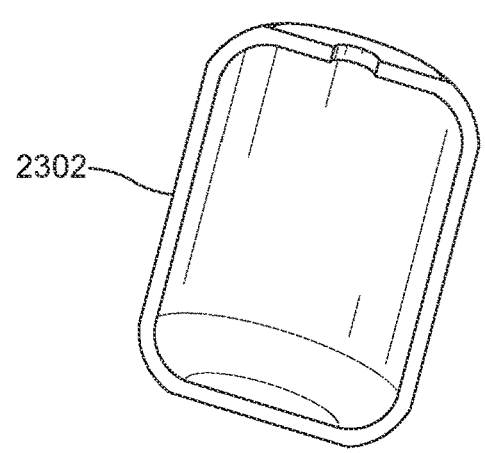

FIGS. 23A-23C show an example application. As shown, once a target site has been cored out and the tissue core removed, there may be a need to seal the cut tissue wall of the cavity. As such, the following example procedure may be used. A device 2300 may comprise a fluid conduit 2301 and an inflatable absorbable balloon 2302. The balloon 2302 may be coated on the exterior with absorbable bio adhesive that will seal against the tissue of the cored cavity post coring, as shown in FIGS. 23A-23B. Once the deflated balloon 2302 may be placed in the desired location, the balloon 2302 may be inflated with CO2 (or other fluid), for example via fluid conduit 2301, so that the bio adhesive is pressed against the tissue wall of the cored cavity to achieve sealing to prevent air leak. The CO2 filled balloon 2302 may be pressurized to an appropriate pressure and may be left behind inside the cored cavity.

Shaped Mesh Catheter

A catheter with a collapsed meshed shape may be inserted into the cavity and the cavity sheath may be removed. The mesh may then be expanded, and suction may be applied to pull tissue to contact the mesh. Energy, e.g. RF, may then be applied to ablate the cavity tissue wall.

Microwave Ablation

Figure 24:
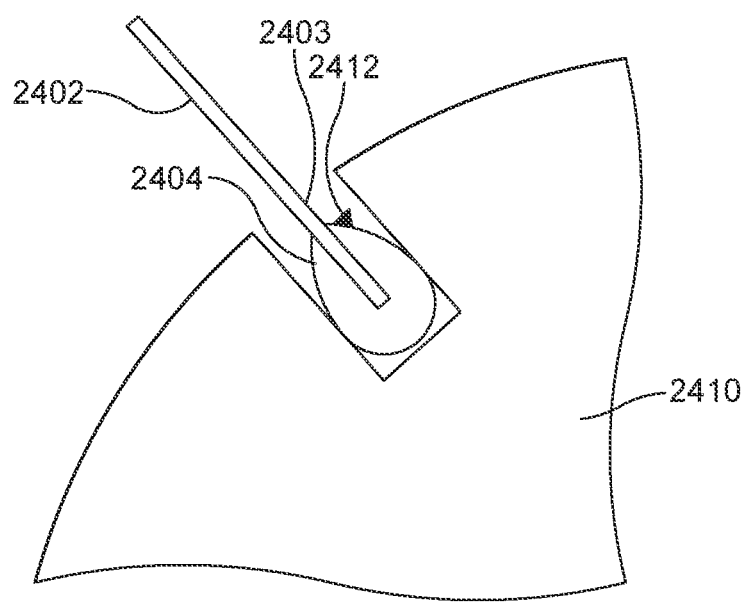
FIG. 24 illustrates an example therapy system and method in accordance with the present disclosure.

FIG. 24 illustrates an example therapy system. A catheter probe 2402 containing an antenna 2404 which emits microwaves may be inserted into a tissue cavity 2412 cored out of tissue 2410, such as illustrated in FIG. 24. The probe produces intense heat that ablates (e.g., destroys) the target tissue.

Cryoablation

Figure 25:
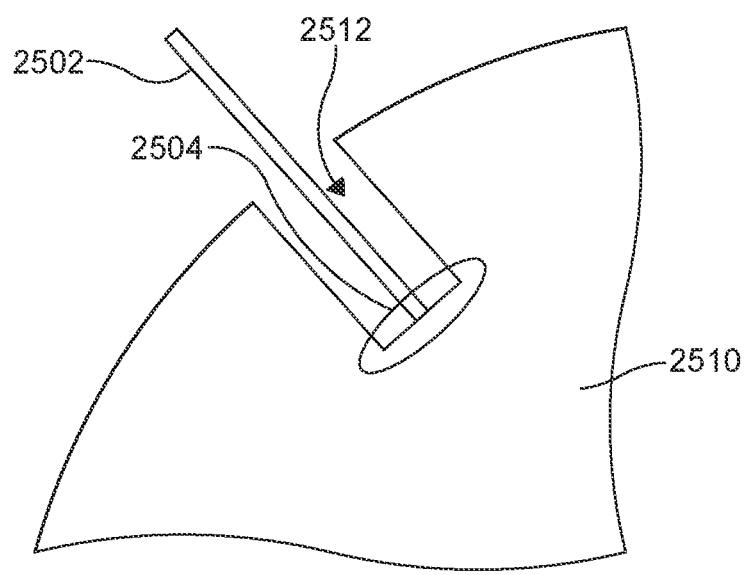
FIG. 25 illustrates an example therapy system and method in accordance with the present disclosure.

FIG. 25 illustrates an example therapy system. A cryoablation probe 2502 may be inserted into a tissue cavity 2512 cored out of target tissue 2510, such as shown in FIG. 25. The probe produces extremely cold temperatures to ablate the target tissue 2510 within a cryoablation zone 2504.

Chemical Ablation (Chemoablation)

Hypertonic saline gel, solid salt, and/or acetic acid gel may be implanted into the cavity to promote damage of the target cells.

Laser Ablation (Photoablation)

A probe that emits a laser beam at a specific wavelength and pulse length may be inserted into the cavity. The emitted laser beam may be used to kill the target tissue in the cavity.

Ethanol Ablation

In this procedure, concentrated alcohol in liquid or gel form may be injected directly into the target cavity to damage the cells.

Chemotherapy Drugs

At the cored site, administration of chemotherapy drugs such as doxorubicin, fluorouracil, and/or cisplatin may be done via direct injection of the agent into the cored tissue site.

Figure 26:
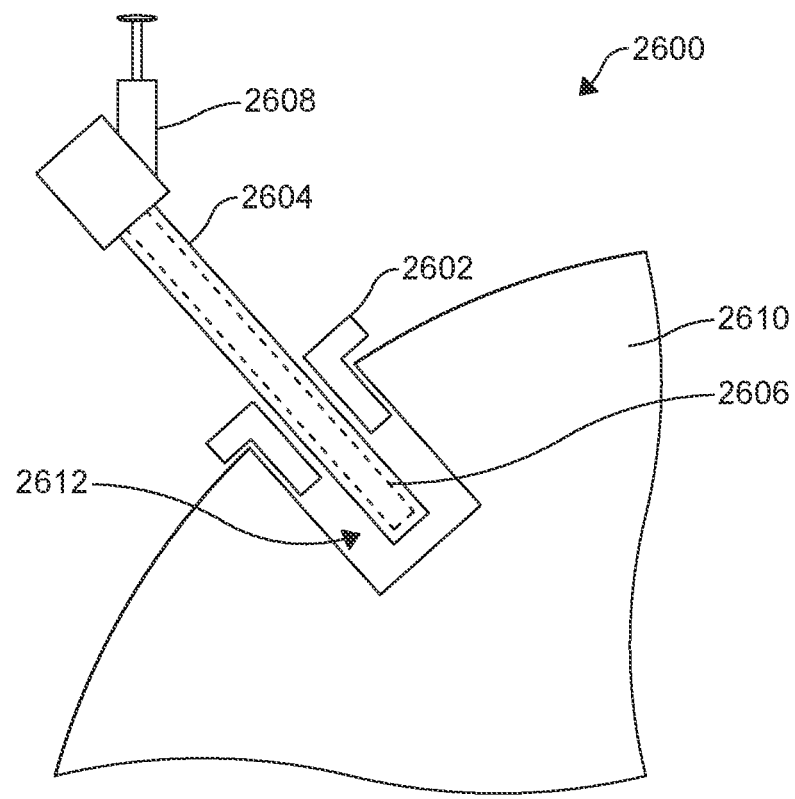
FIG. 26 illustrates an example therapy system and method in accordance with the present disclosure.

FIG. 26 illustrates an example therapy system. The method of drug/therapy delivery may be achieved by placing a cavity sheath 2602 into a tissue cavity 2612 at the cored site of cored tissue 2610. Then, a delivery probe 2604 containing one or more lumens 2606 at the distal end may be inserted into the cavity sheath 2602. Said delivery probe 2604 may extend out of the distal opening of said cavity sheath into the cored tissue cavity. The desired therapeutic and/or diagnostic agent may then be delivered through the delivery lumen 2606 to the tissue via the distal end of the delivery probe via direct injection using a drug/therapy injection port with plunger 2608, such as shown in FIG. 26.

Figure 27:
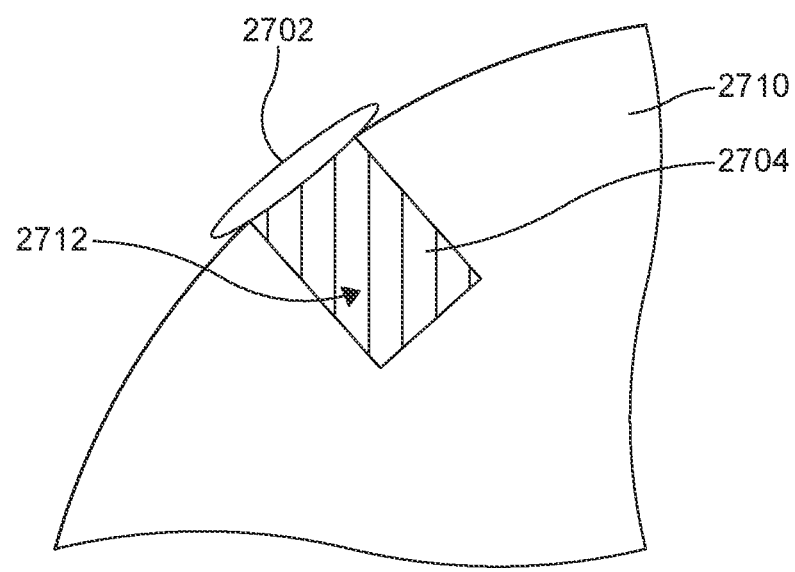
FIG. 27 illustrates an example therapy system and method in accordance with the present disclosure.

FIG. 27 illustrates an example therapy system. In some scenarios, a biodegradable plug 2702 may be placed over the cored site of cored tissue 2710 following the addition of the drug/therapy to the cavity, such as shown in FIG. 27. Namely, drug 2704 may be delivered into a tissue cavity 2712 at the cored site of cored tissue 2710. The plug 2702 may be secured in place using a biocompatible glue.

Chemotherapy Drug-Eluting Particles

Chemotherapy drug-eluting particles may be delivered to the cored tissue site, thereby promoting controlled and sustained locoregional release of therapeutic agents in high concentration with prolonged administration. For example, doxorubicin may be encapsulated into nanoparticles to form micelles for targeted drug delivery. Additionally, anti-cancer drugs may be vectorized using porous particles, such as mesoporous silica nanoparticles, and delivered to the cored tissue site.

Co-Delivery of siRNA and Chemotherapy Drugs

Chemotherapy drugs and short interfering RNA (siRNA) may be co-delivered to the cored tissue site through direct injection to promote cancer cell death. Multidrug resistance in cancer cells may be suppressed using siRNA-based formulations to induce specific silencing of a broad range of genetic targets. Delivering siRNAs in combination with chemotherapy drugs may enhance the efficacy of the chemotherapy through conquering the resistance mechanism of the cancer cells. For example, siRNA encapsulated in mesoporous silica nanoparticles may be co-delivered with doxorubicin to the target core site.

Biodegradable Hydrogel-Based Controlled Drug Delivery

Figure 28:
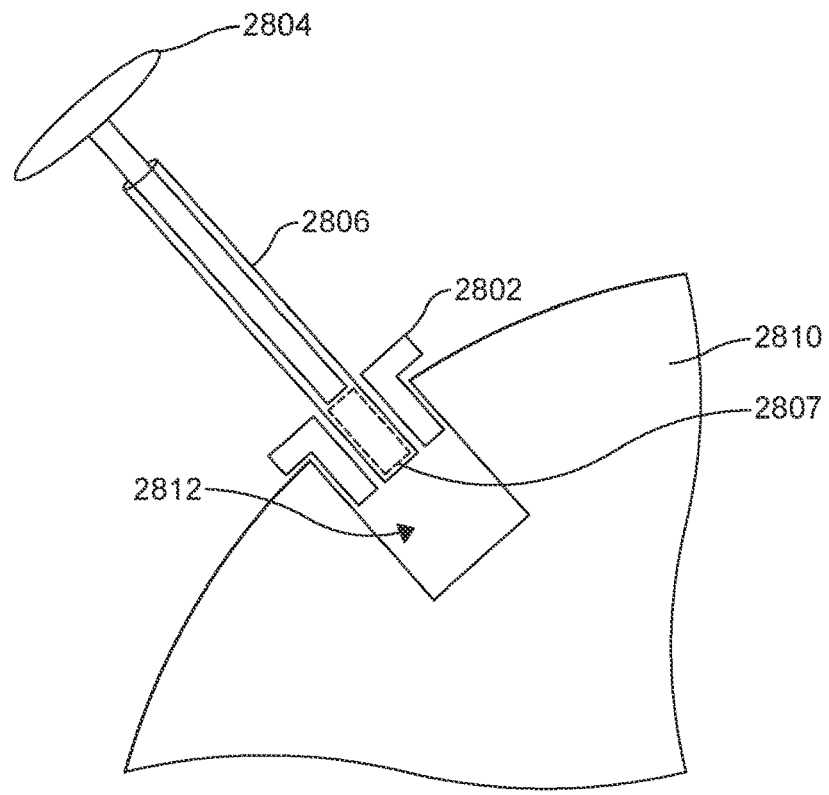
FIG. 28 illustrates an example therapy system and method in accordance with the present disclosure.
Figure 29:
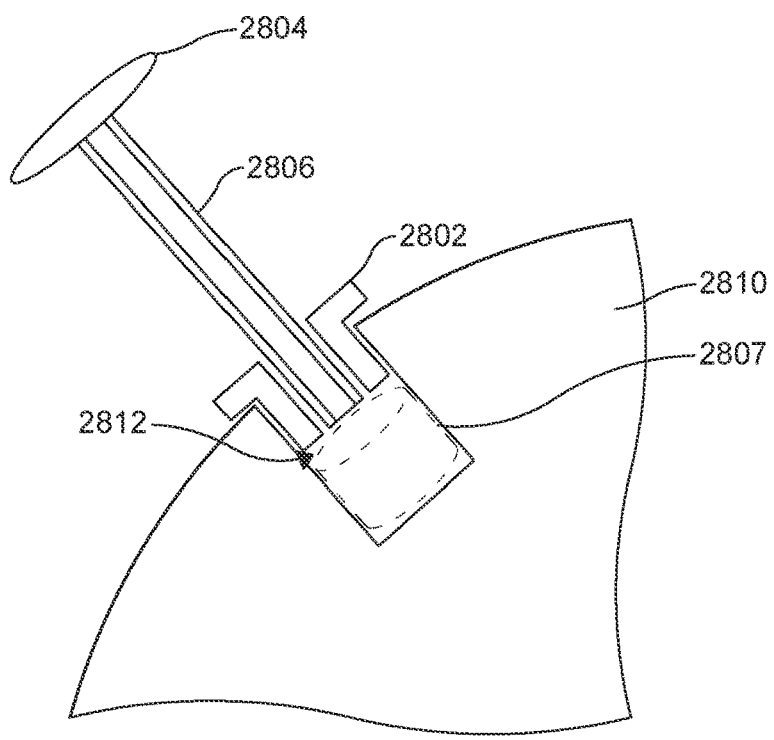
FIG. 29 illustrates an example therapy system and method in accordance with the present disclosure.

FIGS. 28-29 illustrate an example therapy system and method. The method of hydrogel/plug delivery may be achieved by placing a cavity sheath 2802 into a tissue cavity 2812 at the cored site 2810. Then, a delivery plunger 2804, further comprising a delivery plunger sheath 2806, and containing the hydrogel 2806 at the distal end 2814 may be inserted through the cavity sheath 2802 into the cored site 2812. The hydrogel 2806 may then be delivered into the cored site 2812 through the plunging mechanism of the delivery plunger 2802, such as is shown in FIGS. 28-29.

Photodynamic Therapy (PDT)

A combination of chemotherapy drug(s) and photodynamic therapy (PDT) may be directly delivered to the cored tissue site. PDT is a treatment modality which relies on a photosensitizer and light to generate reactive oxygen species (ROS) to kill cancer cells.

Degradable Polymer/Scaffold System

Figure 30:
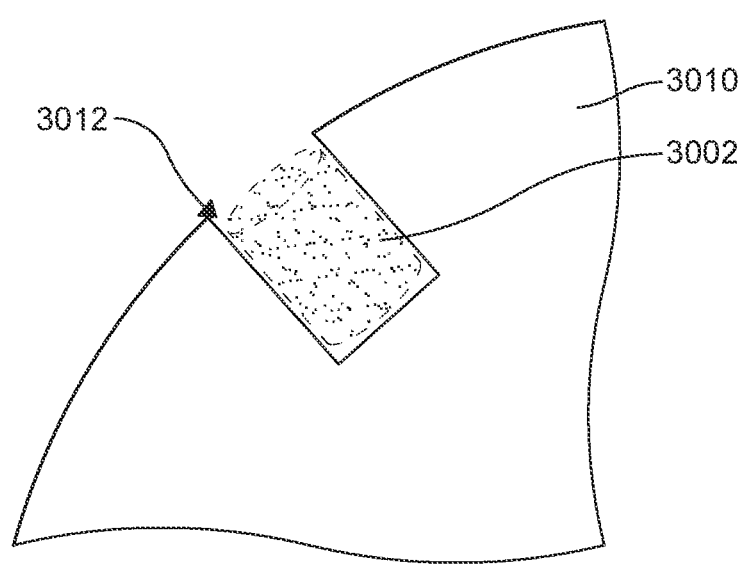
FIG. 30 illustrates an example therapy system and method in accordance with the present disclosure.

FIG. 30 illustrates an example therapy system. Polymer systems containing chemotherapy drugs may be delivered to the cored tissue site 3012 of cored tissue 3010 via direct implantation. Porous biodegradable polymers, such as sponges or scaffolds 3002, may be designed to carry chemotherapy drugs, such as cisplatin. These polymers degrade overtime, thereby releasing the chemotherapy drug at a controlled rate within the targeted site. The excellent biodegradability of the scaffolds, such as porous scaffolds, overcome the limitations of non-biodegradable systems which support the sustained release of the chemotherapy drugs and degrade after a specific time period. The scaffold 3002 may be manufactured in manner that is convenient for surgical delivery, such as shown in FIG. 30.

Hyperthermia of Cored Tissue Site

Hyperthermia may be used to treat the desired cored tissue site. Using this approach, the cored tissue site may be exposed to higher than normal temperatures to promote selective destruction of abnormal cells, which minimizes the size effects on healthy cells. For example, light-absorbing metal particles, such as gold nanoparticles or iron oxide microparticles, may be delivered to the cored tissue site. Then, by applying a short-pulsed laser, cancer cells targeted with the metal particles may be killed.

Control System

The present disclosure generally relates to electrosurgical systems configured for the resection a core of tissue from a tissue site. The present disclosure generally relates to electrosurgical methods for optimizing tissue coring, for example, based on the type of tissue being treated, employing multiple energy modalities based on tissue parameters, based on tissue impedance, and employing simultaneous energy modalities based on tissue parameters.

Depending upon specific instrument configurations and operational parameters, electrosurgical instruments may provide substantially simultaneous cutting of tissue and hemostasis through the application of radiofrequency energy, desirably minimizing patient trauma. For resection devices of the present disclosure, the tissue sealing action may be realized by clamping tissue between a helical coil and a corresponding circular ring (referred to as first and second clamping elements), delivering radiofrequency energy to two RF electrodes on the surface of the helical coil and circular ring (referred to as first and second electrode elements), and finally the cutting action is typically realized by a blade tip (or cutting element). Elements may be located at the distal end of the tissue coring instrument. The devices of the present disclosure may be configured for open surgical use, laparoscopic, or endoscopic surgical procedures including robotic-assisted procedures.

Electrosurgical devices for applying electrical energy to tissue in order to treat and/or destroy the tissue are also finding increasingly widespread applications in surgical procedures. An electrosurgical device typically includes a hand piece, an instrument having a distally-mounted end effector (e.g., one or more electrodes). The end effector may be positioned against the tissue such that electrical current may be introduced into the tissue. Electrosurgical devices may be configured for bipolar or monopolar operation. During bipolar operation, current may be introduced into and returned from the tissue by active and return electrodes, respectively, of the end effector. During monopolar operation, current may be introduced into the tissue by an active electrode of the end effector and returned through a return electrode (e.g., a grounding pad) separately located on a patient's body. Heat generated by the current flowing through the tissue may form hemostatic seals within the tissue and/or between tissues and thus may be particularly useful for sealing blood vessels, for example. The end effector of an electrosurgical device also may include a cutting member that may be movable relative to the tissue and the electrodes to transect the tissue.

Electrical energy applied by an electrosurgical device may be transmitted to the instrument by a generator in communication with the hand piece. The electrical energy may be in the form of radio frequency ("RF") energy. RF energy is a form of electrical energy that may be in the frequency range of 200 kilohertz (kHz) to 1 megahertz (MHz). In application, an electrosurgical device may transmit low frequency RF energy through tissue, which causes ionic agitation, or friction, in effect resistive heating, thereby increasing the temperature of the tissue. Because a sharp boundary may be created between the affected tissue and the surrounding tissue, surgeons may operate with a high level of precision and control, without sacrificing un-targeted adjacent tissue. The low operating temperatures of RF energy may be useful for removing, shrinking, or sculpting soft tissue while simultaneously sealing blood vessels. RF energy works particularly well on connective tissue, which is primarily comprised of collagen and shrinks when contacted by heat.

The RF energy may be in a frequency range described in EN 60601-2-2:2009+A11:2011, Definition 201.3.218-HIGH FREQUENCY. For example, the frequency in monopolar RF applications may be typically restricted to less than 5 MHz. However, in bipolar RF applications, the frequency may be almost anything. Frequencies above 200 kHz may be typically used for monopolar applications in order to avoid the unwanted stimulation of nerves and muscles that would result from the use of low frequency current. Lower frequencies may be used for bipolar applications if the risk analysis shows the possibility of neuromuscular stimulation has been mitigated to an acceptable level. Normally, frequencies above 5 MHz are not used in order to minimize the problems associated with high frequency leakage currents. Higher frequencies may, however, be used in the case of bipolar applications. It is generally recognized that 10 mA is the lower threshold of thermal effects on tissue.

One challenge of using conventional medical devices is the inability to control and customize the power output depending on the type of tissue being treated by the devices. It would be desirable to provide a surgical instrument configured for the coring of tissue that overcomes some of the deficiencies of current instruments.

In an aspect, a surgical instrument for resecting a core of tissue may be provided, the surgical instrument comprising a processor; an end effector at a distal end of the surgical instrument, the end effector configured to interact with tissue, the end effector comprising: first and second clamping elements; first and second electrode elements; a force sensor in communication with the processor and configured to measure a force applied to tissue located between the first and second clamping elements; and a temperature sensor in communication with the processor; first and second electrode elements configured to receive radiofrequency energy from a generator and deliver RF energy to tissue interposed between the first and second clamping elements to seal tissue; wherein the processor is configured to: determine a type of tissue interacting with the end effector based on a tissue coefficient of friction, wherein the tissue coefficient of friction is determined based on the force applied to the tissue by the end effector and a rate of heat generated by the end effector; and dynamically control the energy delivered to the first and second electrode elements based on the type of tissue interacting with the end effector. Specifically, the output power of a surgical instrument may be modulated as a function of a desired impedance trajectory where the impedance trajectory results in a desired tissue effect or outcome. In one aspect, the RF output may be therapeutic, e.g. tissue treating, or sub-therapeutic, e.g. sensing only. The RF output may be applied to the tissue and the voltage and current, or representations of the voltage and current, are measured or estimated. The impedance may be calculated by determining the ratio of the voltage to the current.

In an aspect, a tissue coring instrument may comprise a controller and processing unit configured to optimize the delivery of radiofrequency energy for coring tissue by: a) identifying the brand and/or model of electrosurgical generator supplying power to the device, b) directly adjusting the dynamics of RF energy delivery to tissue to optimize tissue sealing, and/or c) communicating with the electrosurgical generator to affect generator operation. Identification of the device-connected generator may be achieved automatically be the controller, or be manually determined, identified, and/or selected by a user.

The controller may be integrated within the device, or comprise an external unit placed in-line between the device and the corresponding electrosurgical generator. The controller may additionally comprise an assortment of proprietary connectors to enable "brand agnostic" use of the device (i.e. to assure that the device may perform resection of a core of tissue regardless of the type of generator used, the controller may comprise a modular connector system).

The controller may affect energy delivery to the device via two-way communication between a corresponding electrosurgical generator and the device. Various operating settings for energy delivery and tissue sealing parameters may be transferred from the generator to the controller. Real-time tissue sensing parameters may be additionally transferred from the device to the generator.

Additionally, the controller and processing unit may serve other purposes, including providing an interface for the connection of other devices or accessories such as a display to visualize and communicate useful information to a user (such as tissue sealing progress; device positioning relative to a target tissue site; proper device positioning and orientation; relevant device diagnostic data and error reports; device misuse warnings; navigation systems to determine the position of the device in 3D space and/or relative to anatomic landmarks obtained via various medical imaging modalities such as CT, MRI, and ultrasound).

In another embodiment, a custom generator configured for the coring of tissue may comprise a controller and processing unit directly integrated into the generator. This exemplary tissue coring electrosurgical generator may comprise an interface for the connection of other devices or accessories such as a display to visualize and communicate useful information to a user (such as tissue sealing progress; device positioning relative to a target tissue site; proper device positioning and orientation; relevant device diagnostic data and error reports; device misuse warnings; navigation systems to determine the position of the device in 3D space and/or relative to anatomic landmarks obtained via various medical imaging modalities such as CT, MM, and ultrasound).

For any of the exemplary surgical instruments configured for the resection of a core of tissue from a target tissue site as described above (i.e. a tissue coring electrosurgical generator specifically configured for the coring of tissue, an integrated controller within the tissue core resection device configured to affect RF energy delivery from an electrosurgical generator to optimize tissue sealing, or an external controller configured to affect RF energy delivery to the tissue core resection device from an electrosurgical generator), RF energy delivery to tissue may be modulated, controlled, affected, or otherwise changed to achieve a desired tissue effect or outcome.

RF impedance is known to change during the heating and coagulation of tissue. RF impedance may be used as an indicator of the state of the tissue and therefore may be used to indicate progress in a coagulation cycle, vessel sealing cycle, cutting, etc. An extension of this change in RF impedance may be used to form a desired treatment cycle if the output is modulated such that the RF impedance follows a particular, desired course of change in impedance. The desired course of impedance may be pre-determined based on the instrument's operating parameters or determined by selection of the surgeon or measurement of tissue parameters to set this course of treatment. The course of impedance may determine one or more of the output power, output waveform or wave shape, selection of energy mode or modality or a point to terminate the application of energy to tissue.

During tissue treatment, a parameterized tissue model may be fitted to the tissue. The parameters that are found in the model may be used to generate an optimal controller in real-time and could also be correlated to specific tissue characteristics. The present application provides real-time optimization on a generator control system based on RF impedance and real-time tissue evaluation.

These techniques may be used to model the tissue in real-time and develop controllers in real-time, specific to a particular tissue type to maximize sealing, minimize sticking of tissue, and cycle times. Furthermore, control of the output of a surgical instrument based on tissue characteristics and changes in tissue during sealing and cutting cycles is provided.

RF output may be configured to supply electrosurgical energy to the tissue via at least one electrode configured to apply electrosurgical energy to the tissue, sensing circuitry configured to measure impedance of the tissue, and a controller programmed to determine whether a tissue reaction has occurred as a function of impedance values and a predetermined rise in impedance, where the tissue reaction corresponds to a boiling point of tissue fluid, to generate a target impedance trajectory as a function of measured impedance and a predetermined desired rate of change of impedance based on the tissue reaction determination, where the target impedance trajectory includes a plurality of target impedance values for each of a plurality of time steps, and to drive tissue impedance along the target impedance trajectory by adjusting the output level of the ultrasonic output stage to substantially match tissue impedance to a corresponding target impedance value for at least a predetermined minimum time period.

Figure 31:
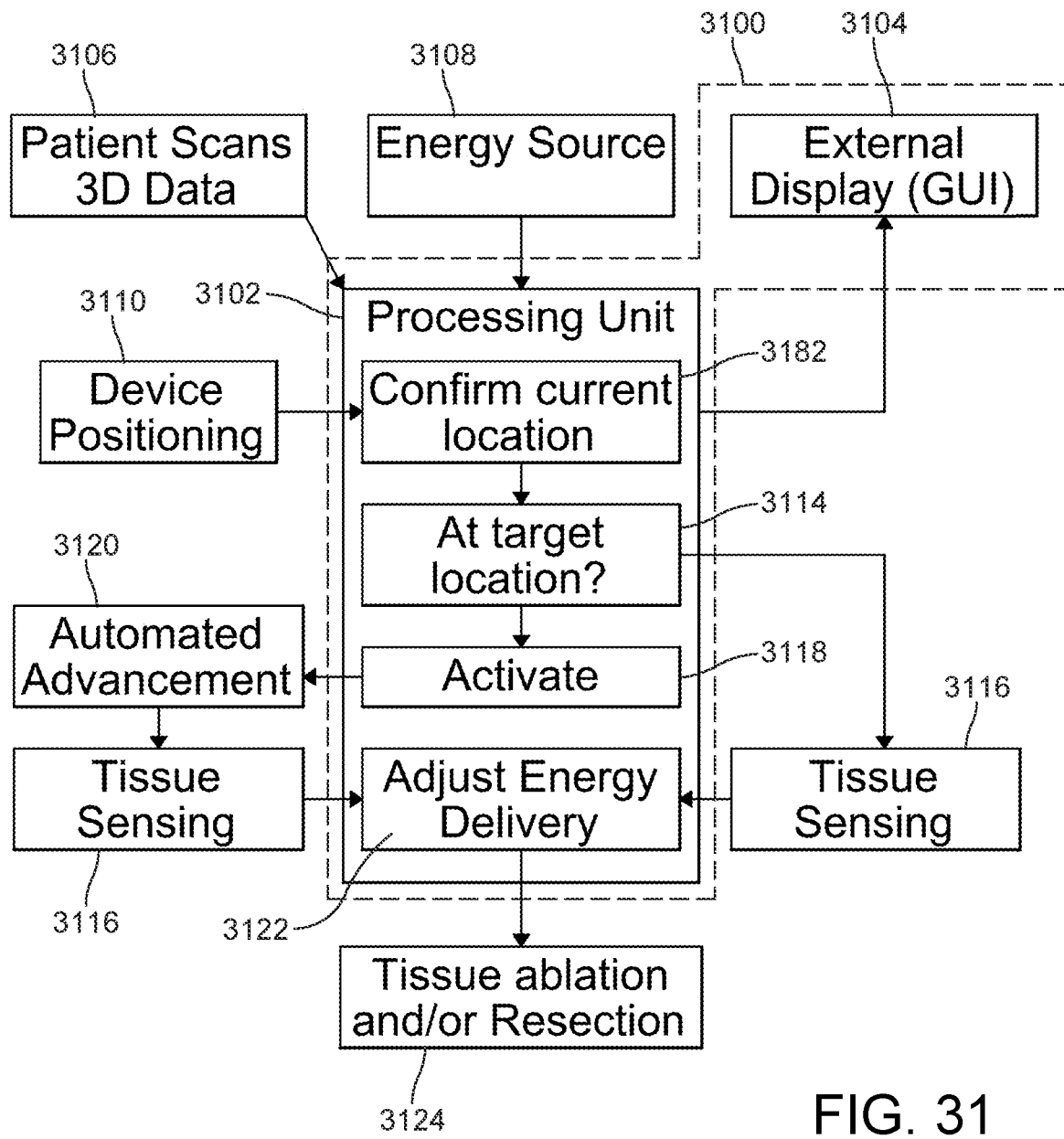
FIG. 31 illustrates a flow diagram of an example method in accordance with the present disclosure.

FIG. 31 shows a schematic diagram and flowchart of a device 3100 that would be able to advance to the target site, identify the tumorous tissue from normal tissue and successfully treat or resect the tumorous tissue. The device 3100 may comprise a processing unit 3102 and an external display 3104—(e.g., a graphical user interface (GUI)). The processing unit 3102 may be configured to receive one or more inputs, including, for example, 3-dimensional (3D) data 3106 from a patient scan and/or energy from an energy source 3108. The processing unit 3102 may be further configured to receive device positioning information 3110 and confirm 3112 a current location of the tissue. The processing unit 3102 may be further configured to confirm 3114 that the device 3100 is at a target location and send such a confirmation to a tissue sensing unit 3116. The processing unit 3102 may further be configured to activate 3118 a delivery of energy to a tissue site. Once energy delivery is activated, the processing unit 3102 may be configured to provide automated advancement 3120 of the device 3100 and provide new location information to the tissue sensing unit 3116. The processing unit 3102 may configured to receive information from the tissue sensing unit 3116 and adjust 3122 energy delivery accordingly. The processing unit 3102 may be further configured to provide instructions 3124 to a device component for ablating and/or resecting the tissue.

In an aspect, a surgical instrument system for coring tissue from a target tissue site may comprise: a tissue resection device configured for coring tissue, wherein the device comprises: a helical coil electrode, and a cutting element configured to cooperate with the helical cold electrode for the transection of tissue; and a handle assembly configured to facilitate interaction between tissue the tissue resection device.

In an aspect, a surgical instrument system for coring tissue from a target tissue site may comprise a tissue resection device configured for coring tissue, wherein the device comprises: a first clamping element comprising a helical coil and a first electrode, a second clamping element comprising a second electrode, the second clamping element being positioned to oppose at least a portion of the first clamping element, and a cutting element configured for the transection of tissue; and a handle assembly configured to facilitate interaction between tissue and at least one of the first clamping element, the second clamping element, or the cutting element.

The handle assembly may facilitate connection of at least one electrode such as at least one of the first electrode and the second electrode to a generator. The handle assembly may facilitate connection of at least one electrode such as at least one of the first electrode and the second electrode to a computing device. The handle assembly may facilitate connection of at least one electrode such as at least one of the first electrode and the second electrode to a robotic system. The handle assembly may be configured to automate advancement of at least one electrode such as at least one of the first electrode and the second electrode. The handle assembly may be configured to automate delivery of energy to at least one electrode such as at least one of the first electrode and the second electrode.

In an aspect, a surgical instrument system for coring tissue from a target tissue site may comprise a tissue resection device configured for coring tissue, wherein the device comprises: a helical coil electrode, and a cutting element configured to cooperate with the helical cold electrode for the transection of tissue; and computing logic configured to automate use one or more functions of the tissue resection device.

In an aspect, a surgical instrument system for coring tissue from a target tissue site may comprise a tissue resection device configured for coring tissue, wherein the device comprises: a first clamping element comprising a helical coil and a first electrode, a second clamping element comprising a second electrode, the second clamping element being positioned to oppose at least a portion of the first clamping element, and a cutting element configured for the transection of tissue; and computing logic configured to automate use one or more functions of the tissue resection device.

The computing logic may be configured to automate advancement of at least one electrode such as at least one of the first electrode and the second electrode. The computing logic may be configured to automate delivery of energy to at least one electrode such as one of the first electrode and the second electrode. The computing logic may be configured to determine an energy distribution provided via the tissue resection device. The computing logic may be configured to receive one or more inputs relating to the resection device such as one or more of the first clamping element, the second clamping element, or the cutting element. The computing logic may be disposed in a handle assembly associated with the tissue resection device. The computing logic may be disposed in a generator in communication with the tissue resection device.

Handle Design Sequence

A tissue coring device with helix coil and anvil electrodes is provided to track along the anchor to remove a target tissue. Once the coring device is placed over the anchor and has made contact with the tissue surface with the distal tip of the helix coil, the following sequence of steps may be performed to core the target tissue while sealing fluid vessels simultaneously. An example method 3700 comprising an operational sequence is shown for illustration in FIGS. 37A-37B. Method may comprise a coring procedure start step 3702. For instance, a coring device may be placed over an anchor. The method 3700 may further comprise one or more of the following steps.

At step 3704, the anchor may be placed at a depth of 3-5 cm (e.g., using an insertion stopper), based on the targeted tissue depth from organ surface.

At step 3706, the anchor may be deployed and the insertion stopper may be removed.

At step 3708, a center aid may be placed over the anchor.

At step 3710, the anchor may be passed through the coring device until a coring device coil is above the pleura and centered around the anchor.

At step 3712, an advancement button may be activated (e.g., pressed).

At step 3714, a coil electrode may be rotated a ⅝ turn through an organ surface (e.g., the pleura of a lung). Initial rotation of the coil electrode may engage coil electrode into tissue. If using a helix coil electrode, fluid vessels that may be caught in the helix section of the helix coil may be moved to a flat portion of the helix coil.

At step 3716, an anvil electrode may be clamped against the coil electrode. In some embodiments, tissue may be clamped between the helix coil and one or more anvil electrodes to a predetermined gap that is suitable for vessel sealing.

At step 3718, a controller may apply RF energy to one or more electrodes to cauterize the tissue and seal any fluid vessels clamped between the electrodes. RF energy may be applied between the helix coil and anvil electrodes to perform vessel sealings between the electrodes.

At step 3720, a hold or wait period of about ten (10) seconds may be initiated.

At step 3722, a determination may be made as to whether a generator warning and/or instruction was received during cauterization.

If yes, steps 3724-3730 may be initiated.

At step 3724, a warning button may be activated (e.g., pressed or selected) to clear the warning.

At step 3726, one or more electrodes may be deactivated.

At step 3728, one or more anvil electrodes may be unclamped from one or more coil electrodes.

At step 3730, a coil electrode may be reversed a 1/36 counterclockwise turn.

After completing steps 3724-3730, the method 3700 may cycle back to step 3716.

If no, the process may advance to step 3716 and proceed as described herein.

At step 3732, an advancement button may be activated (e.g., pressed).

At step 3734, one or more electrodes may be deactivated and disconnected.

At step 3738, a blade tube may be turned a ½ turn to dissect cored tissue from surrounding tissue. For instance, the tissue core may be dissected via a mechanical blade tube.

At step 3740, the blade tube may be retracted and the coil electrode may be disconnected.

Figure 37B:
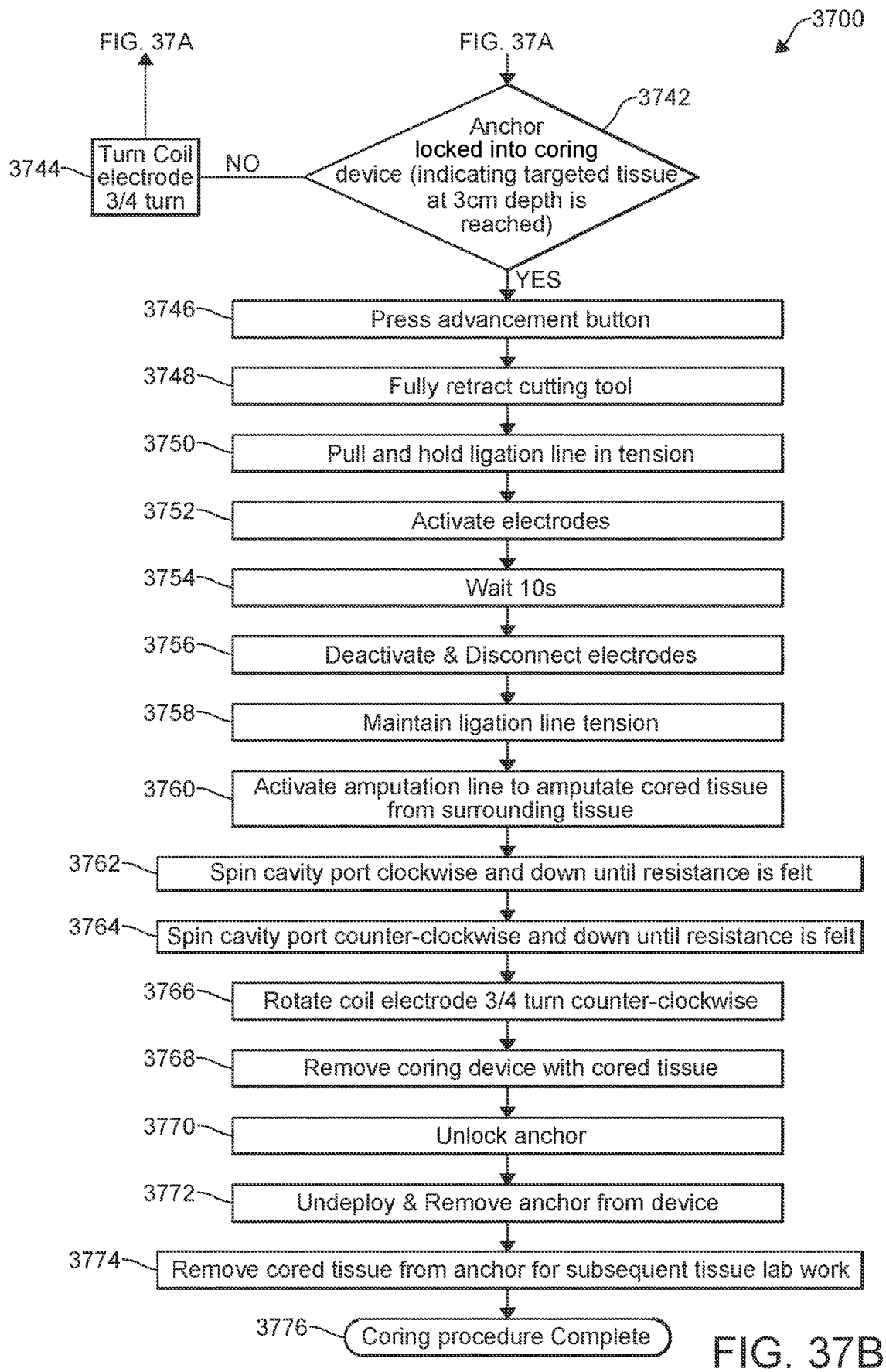

Continuing to FIG. 37B from FIG. 37A as indicated, at step 3742, a determination may be made as to whether the anchor is locked into the coring device (i.e., indicating targeted tissue at at least 3 cm depth has been reached).

If no, at step 3744, the coil electrode may be turned a ¾ turn and the method 3700 may cycle back to step 3716.

If yes, the method 3700 may advance to step 3746, where an advancement button may be activated (e.g., pressed).

At step 3748, a cutting tool may be fully retracted.

At step 3750, a ligation line may be pulled and held in tension.

At step 3752, one or more electrodes may be activated. RF energy may be applied between a second set of electrodes to seal any fluid vessels within the ligation line loop and between the electrodes.

At step 3754, a hold or wait period of about ten (10) seconds may be initiated.

At step 3756, one or more electrodes may be deactivated. The anvil electrode may be separated from the helix electrode.

The cycle of rotating the helix coil, clamping tissue between electrodes, applying RF energy to seal vessel, dissecting the tissue core and separating the anvil and helix electrodes may be repeated as needed. Once the target tissue is cored and is within the blade tube, a ligation line may be deployed to squeeze the distal end of the target tissue between a second set of electrodes.

At step 3758, ligation line tension may be maintained.

At step 3760, an amputation line may be activated to amputate cored tissue from surrounding tissue. For instance, a machinal line may be deployed to amputate the target tissue at a proximal position to the ligation line.

At step 3762, a cavity port may be spun clockwise and down until resistance is felt.

At step 3764, a cavity port may be spun counter-clockwise and down until resistance is felt.

At step 3766, the coil electrode may be turned a ¾ turn counter-clockwise. For instance, a helix coil may be rotated to disengage the helix coil from the surrounding tissue.

At step 3768, the coring device may be removed with the cored tissue (e.g., the target tissue sample).

At step 3770, the anchor may be unlocked.

At step 3772, the anchor may be undeployed and removed from the coring device.

At step 3774, the cored tissue may be removed from the anchor for subsequent tissue lab work.

At step 3776, the coring procedure may be complete.

To reduce the number of manual steps that a user needs to perform the tissue coring device, there is a need to incorporate a handle mechanism to drive the sequence of steps described above. The mechanism is controlled through electrical hardware enclosed in the device handle with the coring device gear mechanism and firmware sequence installed in a generator (also refers a controller). The sequence may have different modes of input, e.g. operator action, advancement, warning, etc. Following is a concept of using said modes of input to automate the post tissue coring procedure.

Following are the design description of handle mechanism and the step sequence to be controlled by the controller. The sequence shows a target tissue to be cored out at 3 cm below the organ surface as an example.

Figure 32:
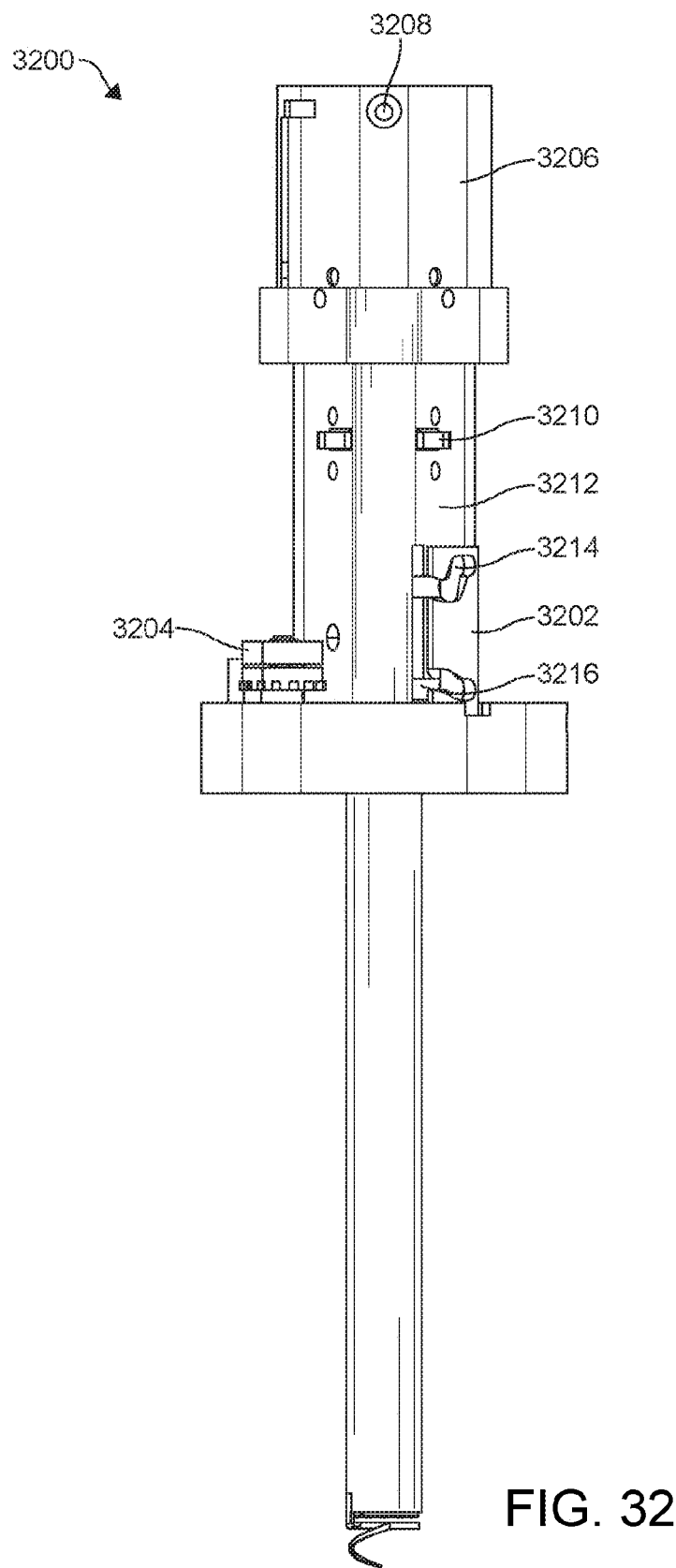
FIG. 32 illustrates an examples handle design in accordance with the present disclosure.

A handle design 3200 is shown, for example, in FIG. 32. As shown, the handle 3200 may be configured for a tissue coring device with the helix coil and anvil electrodes, and may comprise dependent mechanisms (e.g., four) for automated rotation, tissue clamp, device position control relative to the anchor, and ligation/amputation of the target tissue. As described above, once the coring device is placed over the anchor and in contact with the tissue surface with the distal tip of the helix coil, the said sequence of steps is performed with a planetary gear system with three rotational states for coil and mechanical blade rotation, a clamping cam shaft 3202 for vessel sealing, an optic anchor position monitoring mechanism to identify when the cored target tissue is within a mechanical blade tube, and an integrated bi-directional pulley system 3204 for ligation/amputation of the cored target tissue. The handle 3200 may further comprise an automated housing cap 3206, a solenoid 3208, manual clutch wings 3210, an automation handle housing 3212, a coil cam pin 3214, and a mechanical blade cam pin 3216 The following mechanisms are described in greater detail below.

Figure 33:
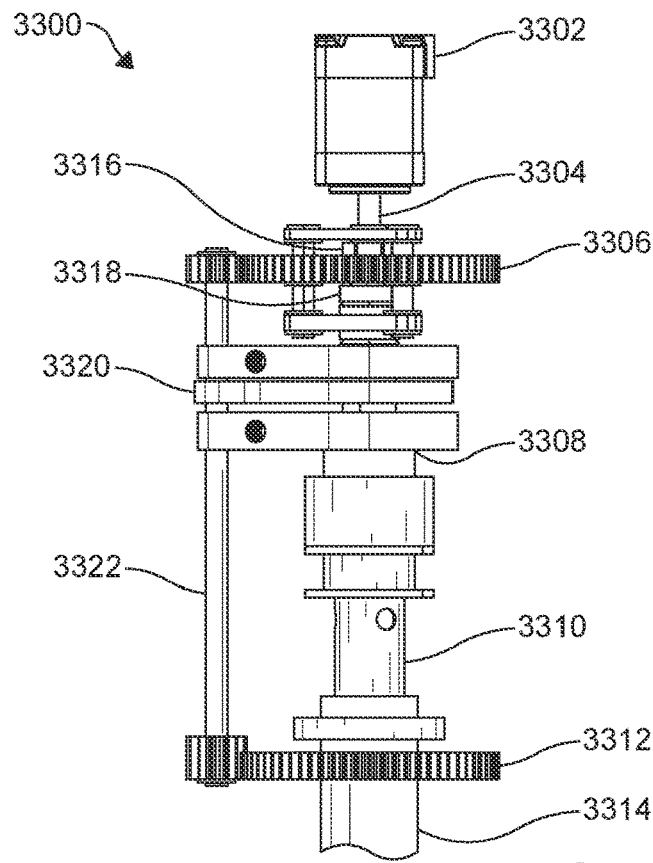
FIG. 33 illustrates an example rotation control assembly (e.g., planetary gear assembly) in accordance with the present disclosure.

FIG. 33 illustrates an example rotation control assembly 3300 (e.g., planetary gear assembly). The rotation control assembly 3300 shown in FIG. 33 may be configured to control bi-directional rotation for the tissue coring coil and single direction rotation for a mechanical blade tube 3310 with one motor control, requiring the system to maintain two degrees of freedom. To initialize the rotation of the coil to engage coil into tissue, a motor 3302 may be rotated counter-clockwise and a coil one-way bearing 3316 in-line with the motor shaft 3304 may be engaged. Subsequently, a planetary gear mechanism may be activated and a ring gear 3306 may be rotated clockwise, engaging a jack shaft 3322. The jack shaft 3322 may then be rotated counter-clockwise and engages a coil tube gear 3312, allowing the coil to rotate a predetermined rotational distance. To initialize the rotation of a mechanical blade tube 3310 to dissect the tissue core, the motor 3302 may be rotated clockwise, a mechanical blade one-way bearing 3308 in-line with a motor shaft 3304 may be engaged, and the planetary gear mechanism may be inactive, allowing the mechanical blade tube 3310 to rotate a predetermined rotational distance. To initialize the counterclockwise rotation of the coil to disengage coil into tissue, a manual clutch 3320 may be shifted to the up position and a cone clutch 3318 may be moved into the contact with the planetary gear system. Subsequently, the motor 3302 may be rotated counter-clockwise and a coil one-way bearing 3316 in-line with the motor shaft 3304 may be engaged. The planetary gear mechanism may be active and a ring gear 3306 may be rotated counter-clockwise, engaging a jack shaft 3322. The jack shaft 3322 may then be rotated clockwise and engages a coil tube gear 3312, allowing the coil to rotate a predetermined rotational distance.

Figure 34:
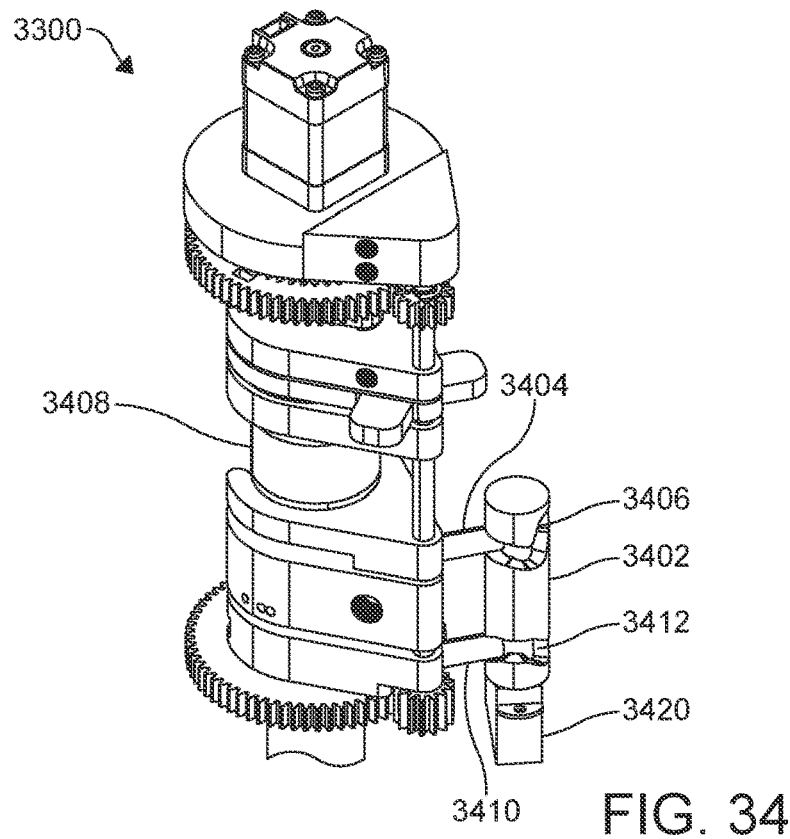
FIG. 34 illustrates a linear translation control assembly in accordance with the present disclosure.

FIG. 34 illustrates a linear translation control assembly 3400 in the form of a clamping cam shaft and pin mechanism. The clamping cam shaft and pin mechanism shown in FIG. 34 controls linear translation of a mechanical blade tube (not shown) and a coil tube 3408 for tissue engagement, vessel sealing, and dissection. After a helix coil is rotated a predetermined distance to engage target tissue, a cam shaft 3402 with machined slots housed on a servo motor 3420 may be rotated clockwise. Subsequently, a coil cam pin 3404 follows a cam path 3406 and a coil tube 3408 may be linearly translated to clamp tissue between the helix coil and anvil electrodes to a predetermined gap that may be suitable for vessel sealing. Following, the servo motor 3420 may be rotated clockwise, a mechanical blade cam pin 3410 may follow the mechanical blade path 3412, and a mechanical blade tube (not shown) may be linearly translated to a dissection position. At the end of the cycle, the servo motor 3420 may be rotated counter-clockwise to separate the anvil electrode from the helix electrode and translate the mechanical blade tube out of the dissection position.

Figure 35:
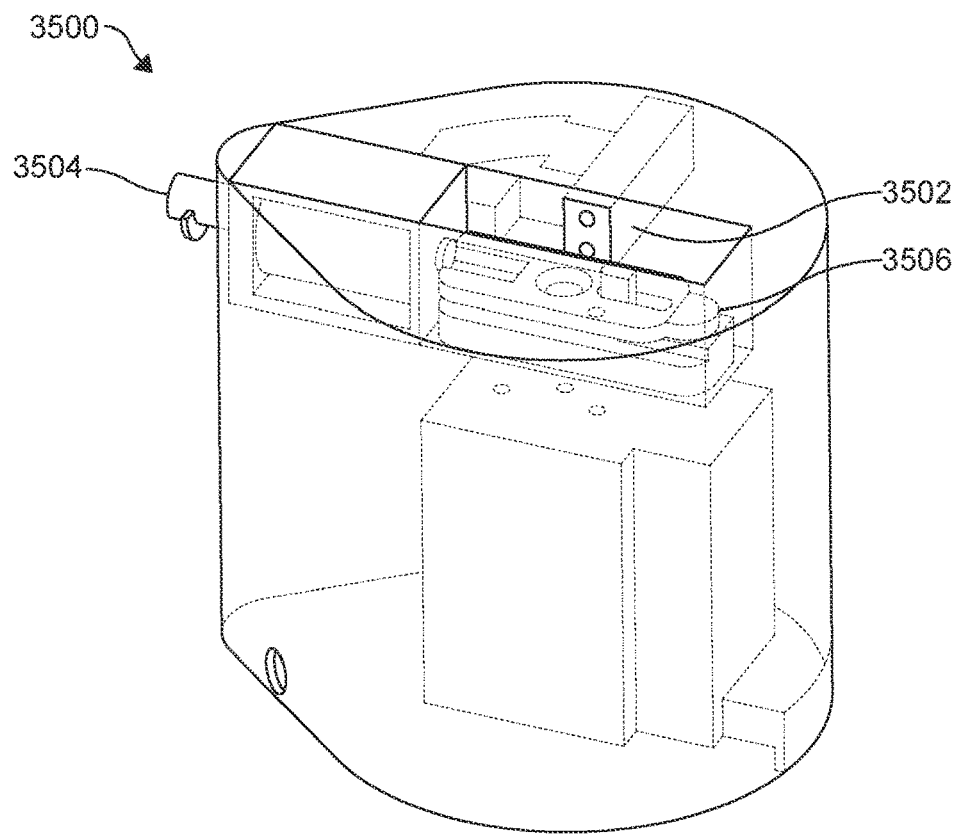
FIG. 35 illustrates an anchor position monitor in accordance with the present disclosure.

FIG. 35 illustrates an anchor position monitor 3500. The anchor position monitor 3500 may be an optic anchor position monitoring mechanism and may actively monitor the target core tissue location, on an anchor, relative to a tissue coring device through an optical sensor 3502 in-line with the anchor. When target tissue is cored and within a mechanical blade tube, a pre-set marking on the anchor will be in-line with the optical sensor 3502 or optical sensing unit, alerting the system that the tissue coring device is in the optimal position. Subsequently, a solenoid 3504 may be fired and engage a spring-loaded anchor lock 3506, and lock the anchor position relative to the tissue coring device.

Figure 36:
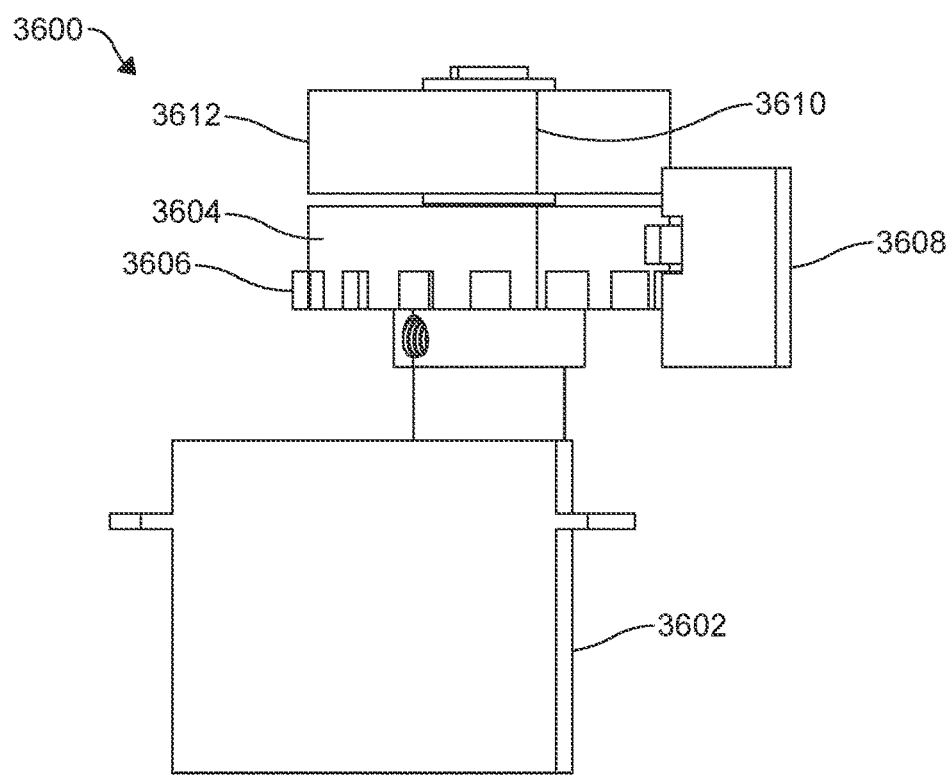
FIG. 36 illustrates an example ligation and amputation system in accordance with the present disclosure.

FIG. 36 illustrates an example ligation and amputation system 3600. The ligation and amputation system 3600 may be a bi-direction pulley system and may control deployment of the ligation and amputation machinal lines. Once a target tissue is within a blade tube as described relative to FIGS. 34-35, a servo motor 3602 may be rotated clockwise. Subsequently, a one-way bearing 3604 housed within the ligation pulley 3606 may be engaged, a ligation machinal line may be deployed, and a ligation pawl 3608 may hold the line in tension to squeeze a distal end of the target tissue between a second set of electrodes. After RF energy between the second set of electrodes to seal fluid vessels within the ligation loop is completed, the servo motor 3602 may be rotated counter-clockwise and a one-way bearing 3610 housed within an amputation pulley 3612 is engaged, deploying an amputation machinal line to amputate the target tissue at a proximal position to the ligation line.

Figure 38:
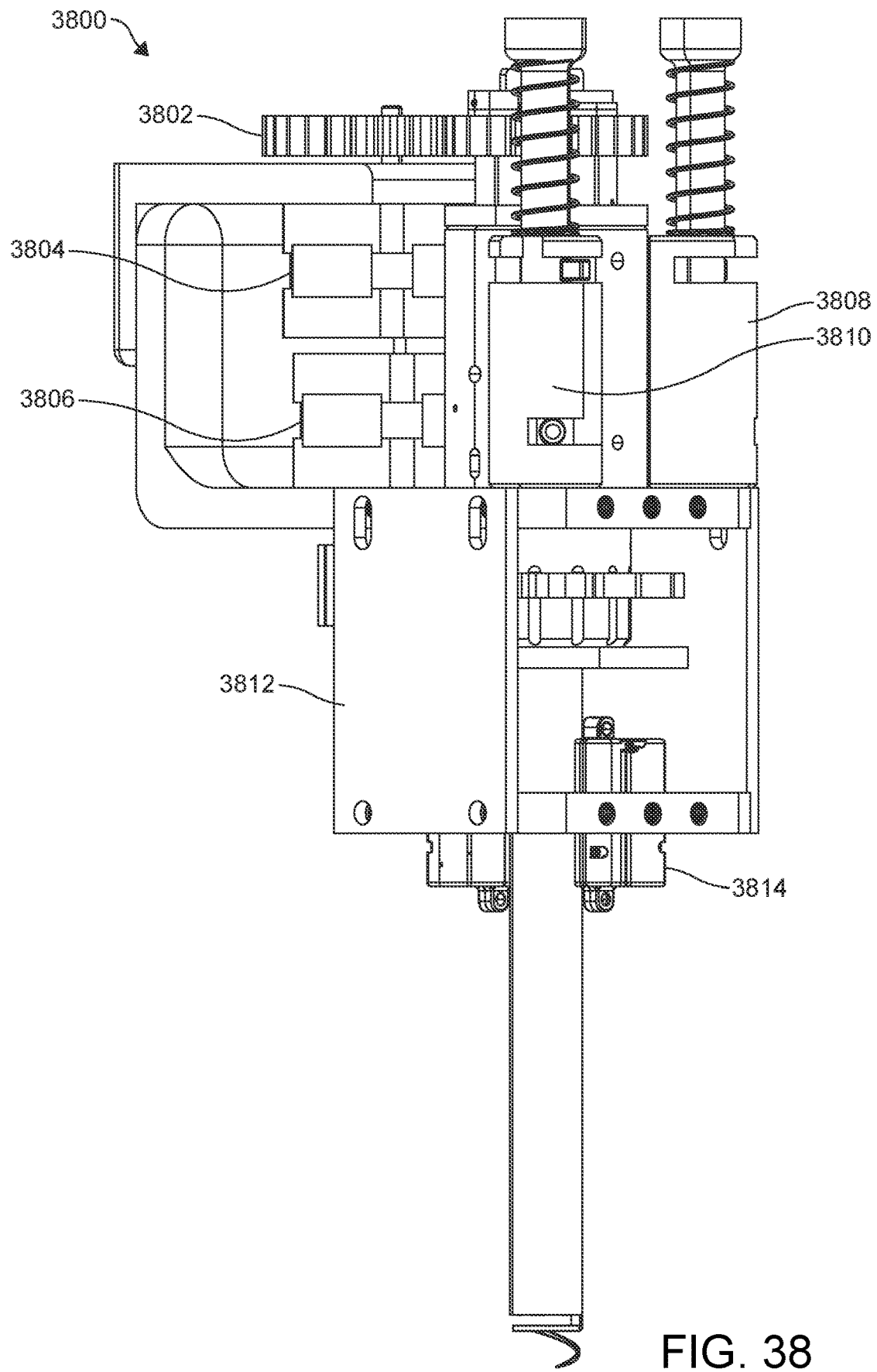
FIG. 38 illustrates an example handle design of the present disclosure.

FIG. 38 illustrates a handle design 3800 for the tissue coring device comprising a helix coil and one or more anvil electrodes and may comprise multiple attachments to a tissue coring device for automated rotation, tissue clamp, and ligation/amputation of the target tissue. As described above, once a coring device is placed over an anchor and in contact with a tissue surface with a distal tip of the helix coil, the above described sequence of steps may be performed with two independent gear systems for coil and mechanical blade rotation, clamping actuator plate, and two independent spring-loaded systems for ligation and amputation. The handle design 3800 may comprise a mechanical blade gear set 3802, a mechanical blade stepper motor 3804, a coil stepper motor 3806, a spring loaded amputation knob 3808, a spring loaded ligation knob 3810, a clamp plate housing 3812 and a clamp linear actuator 3814. The following mechanisms are described in greater detail below.

Figure 39:
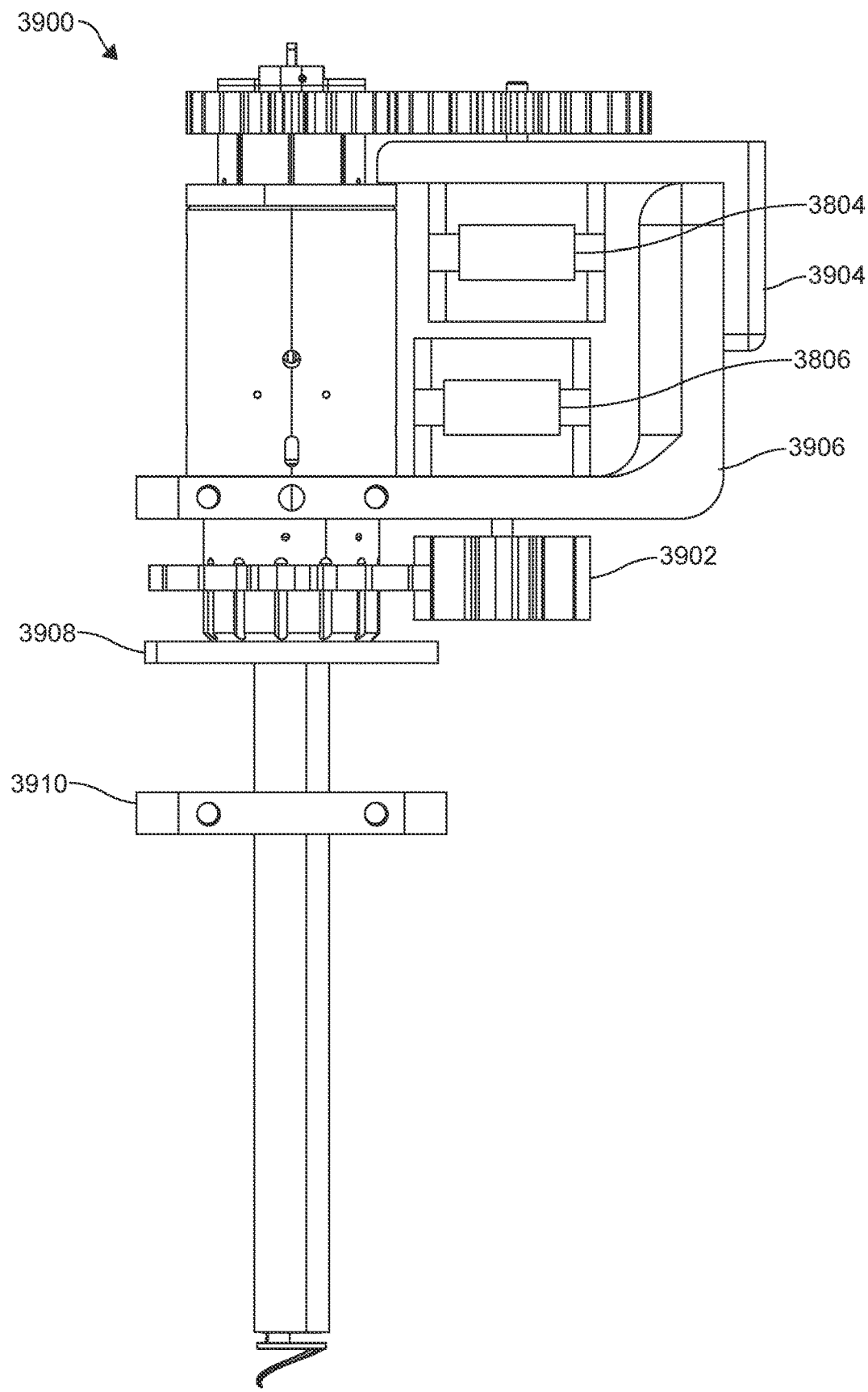
FIG. 39 illustrates a rotation control assembly in accordance with the present disclosure.

FIG. 39 illustrates a rotation control assembly 3900. The rotation control assembly 3900 may be an independent gear system configured to control bi-directional rotation for a tissue coring coil and a mechanical blade tube with two motor control. To initialize clockwise rotation of the coil (i.e., to engage the coil into tissue), a coil stepper motor (e.g., the coil stepper motor 3806 of FIG. 38) may be rotated counter-clockwise and the coil gear system may be active. Subsequently, the coil may be allowed to rotate a predetermined rotational distance and fluid vessels that are caught in the helix section of the helix coil are moved to the flat portion of the helix coil. To initialize the rotation of the mechanical blade tube to dissect the target tissue core, the blade stepper motor (e.g., the mechanical blade stepper motor 3804 of FIG. 38) may be rotated and the blade tube gear system may be active, allowing the mechanical blade tube to rotate a predetermined rotational distance. To initialize the counterclockwise rotation of the coil to disengage coil into tissue, the coil stepper motor may be rotated clockwise, the coil gear system 3902 may be active, and the coil tube may be allowed to rotate a predetermined rotational distance. The rotation control assembly 3900 may further comprise a cutting tool motor bracket 3904, a motor housing/handle 3906, a linear actuator clamp plate 3908, and a linear actuator frame 3910

Figure 40:
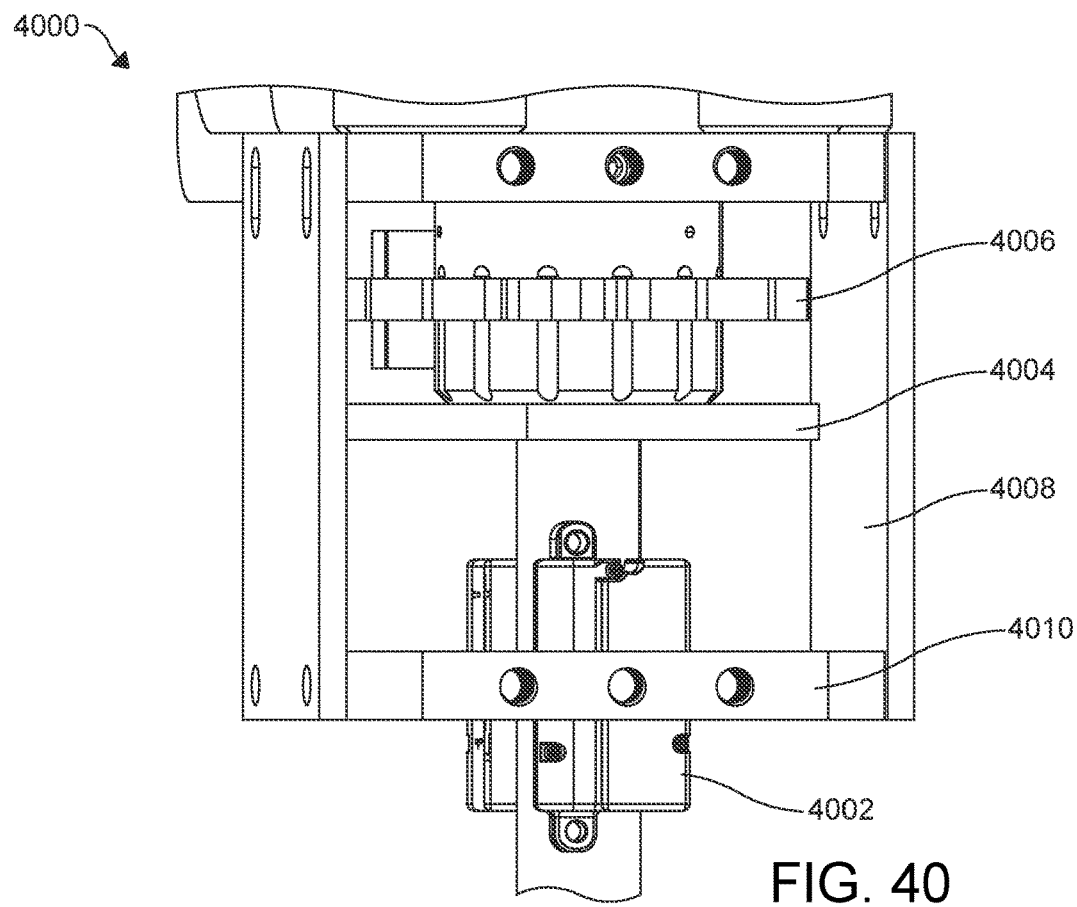
FIG. 40 illustrates an example clamp in accordance with the present disclosure.

FIG. 40 illustrates an example clamp 4000. A clamping solenoid plate controls linear translation of the coil tube for tissue engagement and vessel sealing. After the helix coil may be rotated a predetermined distance clockwise to engage target tissue, the linear actuators 4002 housed on the carrier plate 4004 may be activated. Subsequently, the actuator arms may be linearly translated to clamp tissue between the helix coil and anvil electrodes to a predetermined gap suitable for vessel sealing. At the end of the RF energy cycle, the linear actuators may be deactivated and the coil tube may be allowed to un-clamp under gravity. The clamp 4000 may further comprise a coil gear set 4006, a clamp plate housing 4008, a linear actuator frame 4010.

Figure 41:
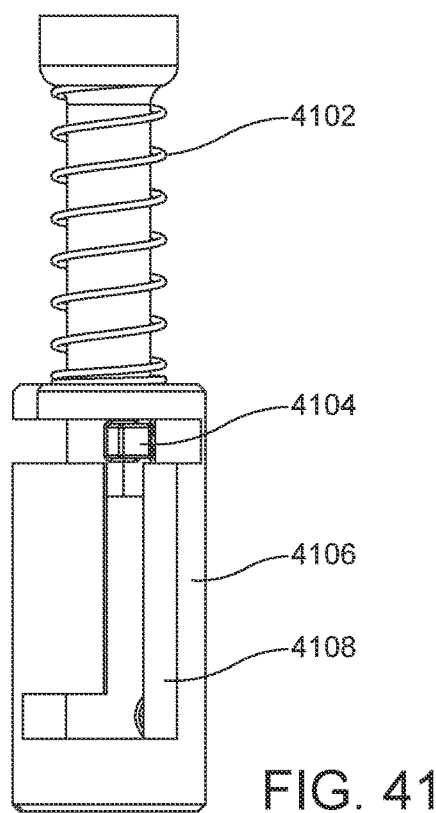
FIG. 41 illustrates an example ligation and amputation system in accordance with the present disclosure.

FIG. 41 illustrates an example ligation and amputation system 4100.

Independent spring-loaded mechanisms for ligation and amputation may control deployment of the ligation and amputation machinal lines. Once the target tissue is within a blade tube, a ligation spring 4102 may be engaged (e.g., pushed down by, for instance, an operator) and a pin may be rotated clockwise. The ligation and amputation system may further comprise a ligation knob 4104, a spring base 4106, and a locking pathway 4108. Subsequently, the spring-loaded pin may be activated and the ligation machinal line may be deployed and held in tension to squeeze the distal end of the target tissue between the second set of electrodes. After the application of RF energy between the second set of electrodes to seal fluid vessels with the ligation loop is completed, the amputation spring may be engaged (e.g., by an operator) and the pin may be rotated clockwise, thereby activating the spring-loaded pin and deploying the amputation machinal line to amputate the target tissues at a proximal position to the ligation line.

The present disclosure comprises at least the following aspects:

Aspect 1. A method for coring tissue from a target tissue site, the method comprising: delivering a first energy modality to an end effector of a surgical instrument interacting with tissue, wherein the end effector is configured for coring tissue and comprises: a first clamping element comprising a helical coil and a first electrode, a second clamping element comprising a second electrode, the second clamping element being positioned to oppose at least a portion of the first clamping element, and a cutting element configured for the transection of tissue.

Aspect 2. The method of aspect 1, further comprising: determining a tissue parameter of the tissue interacting with the end effector; and delivering a second energy modality to the end effector based on the determined tissue parameter, wherein the first energy modality is different from the second energy modality.

Aspect 3. The method of aspect 2, wherein the tissue parameter comprises tissue impedance.

Aspect 4. The method of aspect 3, further comprising calculating the tissue impedance based on electrical parameters associated with the first energy modality.

Aspect 5. The method of any one of aspects 2-4, further comprising: controlling the first energy modality delivered to the end effector based on the tissue parameter as an input; and selecting the second energy modality to deliver to interact with the tissue by the end effector, wherein properties of the first energy modality and the second energy modality correspond to a type of interaction between the end effector and the tissue.

Aspect 6. A method for coring tissue from a target tissue site, the method comprising: delivering a first drive signal to an end effector of a surgical instrument interacting with tissue, wherein the end effector is configured for coring tissue and comprises: a first clamping element comprising a helical coil and a first electrode, a second clamping element comprising a second electrode, the second clamping element being positioned to oppose at least a portion of the first clamping element; and a cutting element configured for the transection of tissue; measuring a tissue parameter of tissue interacting with the end effector; modulating delivery of the first drive signal based on the measured tissue parameter; and ceasing delivery of the first drive signal when a termination parameter is met.

Aspect 7. The method of aspect 6, wherein the first drive signal is a radio frequency (RF) energy signal.

Aspect 8. The method of any one of aspects 6-7, wherein the first drive signal is an ultrasonic energy signal.

Aspect 9. The method of any one of aspects 6-8, further comprising determining that the tissue is sealed based on at least one of initial tissue impedance, initial aperture defined by jaws of an end effector, current tissue impedance, rate of change of tissue impedance, ultrasonic energy driven into the tissue, radio frequency (RF) energy driven into the tissue, or transaction time.

Aspect 10. The method of any one of aspects 6-9, wherein the first drive signal comprises a first energy signal, and wherein modulating delivery of the first energy signal based on a measured tissue impedance comprises modifying an output power of a generator, modifying an output waveform of the generator, selecting a second energy signal to deliver to the surgical instrument, or modifying the termination parameter.

Aspect 11. The method of any one of aspects 6-10, further comprising ceasing delivery of the first drive signal upon the tissue parameter meeting or exceeding a threshold value of the tissue parameter.

Aspect 12. The method of any one of aspects 6-11, wherein the first drive signal comprises a first energy signal, wherein an amplitude of the first energy signal is a first amplitude, the method further comprising delivering a second drive signal to tissue at a second amplitude different from the first amplitude.

Aspect 13. The method of aspect 12, wherein the first drive signal is a radio frequency (RF) energy signal and the second drive signal is an ultrasonic energy signal.

Aspect 14. The method of any one of aspects 6-13, wherein measuring the tissue parameter comprises measuring a rate of change of the tissue parameter.

Aspect 15. The method of any one of aspects 6-14, further comprising determining a state of the tissue based on the measured tissue parameter.

Aspect 16. The method of aspect 15, wherein the state of the tissue comprises coagulated, sealed, or cut.

Aspect 17. The method of any one of aspects 6-16, wherein modulating delivery of the first drive signal to the end effector to cause the tissue parameter to change according to a predetermined technique.

Aspect 18. The method of aspect 17, wherein the predetermined technique comprises adjusting the tissue parameter according to a threshold value of the tissue parameter or a threshold rate of change of the tissue parameter.

Aspect 19. The method of any one of aspects 6-18, wherein the tissue parameter is based on dividing a voltage measurement of radio frequency (RF) energy by a current measurement of the RF energy.

Aspect 20. The method of aspect 19, wherein a threshold value of the tissue parameter corresponds to a termination impedance at which a seal is complete during coagulation of the tissue utilizing RF energy.

Aspect 21. A surgical instrument system for coring tissue from a target tissue site, the system comprising: a tissue resection device configured for coring tissue, wherein the device comprises: a first clamping element comprising a helical coil and a first electrode, a second clamping element comprising a second electrode, the second clamping element being positioned to oppose at least a portion of the first clamping element, and a cutting element configured for the transection of tissue; a handle assembly comprising a trigger system, wherein the trigger system is configured to facilitate interaction between tissue and at least one of the first clamping element, the second clamping element, or the cutting element; and a generator configured to deliver energy to the tissue resection device.

Aspect 22. The system of aspect 21, further comprising a controller in communication with the generator, wherein the controller is configured to control the generator to provide radiofrequency energy sufficient to seal tissue to the first and second electrodes of the tissue resection device, based on at least one sensed operating condition of the tissue resection device.

Aspect 23. The system of aspect 22, wherein the controller is configured to sense an interaction of tissue with the tissue resection device.

Aspect 24. The system of aspect 23, wherein the controller is configured to sense the interaction of tissue with the tissue resection device based on a measured impedance level associated with the first and second electrodes.

Aspect 25. The system of aspects 23-24, wherein the controller is configured to sense an amount of force applied to at least one of the first or second clamping elements to detect the interaction of tissue with the tissue resection device.

Aspect 26. The system of any one of aspects 22-25, wherein the controller is configured to sense the position of the cutting element relative to at least one of the first or second clamping elements of the tissue resection device.

Aspect 27. The system of any one of aspects 22-26, wherein the controller is configured to control the generator to provide a continuous amount of radiofrequency energy.

Aspect 28. The system of any one of aspects 22-27, wherein the controller is configured to control the generator to automatically provide an increase or decrease in an amount of radiofrequency energy.

Aspect 29. The system of any one of aspects 22-28, wherein the controller is configured to control the position of the first clamping element relative to the second clamping element.

Aspect 30. The system of any one of aspects 22-29, wherein the controller is configured to control the position of the cutting element relative to at least one of the first or second clamping elements of the tissue resection device.

Aspect 31. The system of any one of aspects 22-30, wherein the tissue resection device and the generator are at least on of mechanically or electrically connected to the handle assembly.

Aspect 32. A method comprising: disposing a coring device over an anchor, the coring device comprising a helix coil having a coil section and a flat portion; rotating the helix coil of the coring device to engage the helix coil into tissue such that fluid vessels that are caught between the coil section are moved to the flat portion of the helix coil; clamping tissue between the helix coil and at least two anvil electrodes of the coring device; applying radio frequency (RF) energy between the helix coil and anvil electrodes to perform vessel sealing between the electrodes; dissecting a tissue core via a mechanical blade tube of the coring device; separating the electrodes from each other; and repeating a cycle of rotating the helix coil, clamping tissue between electrodes, applying RF to seal vessel, dissecting tissue core, and separating the electrodes.

Aspect 33. The method of aspect 32, further comprising: once a target tissue is cored and is within the blade tube, deploying a ligation line to squeeze a distal end of the target tissue between a second set of electrodes; applying RF energy between a second set of electrodes to seal any fluid vessels within a ligation line loop and between the electrodes; deploying a machinal line to amputate the target tissues at a proximal position to the ligation line; rotating the helix coil to disengage it from surrounding tissue; and remove the coring device with target tissue sample.

Aspect 34. A surgical instrument system for coring tissue from a target tissue site, the system comprising: a tissue resection device configured for coring tissue, wherein the device comprises: a first clamping element comprising a helical coil and a first electrode, a second clamping element comprising a second electrode, the second clamping element being positioned to oppose at least a portion of the first clamping element, and a cutting element configured for the transection of tissue; and a handle assembly configured to facilitate interaction between tissue and at least one of the first clamping element, the second clamping element, or the cutting element.

Aspect 35. The system of aspect 34, wherein the handle assembly facilitates connection of at least one of the first electrode and the second electrode to a generator.

Aspect 36. The system of any one of aspects 34-35, wherein the handle assembly facilitates connection of at least one of the first electrode and the second electrode to a computing device.

Aspect 37. The system of any one of aspects 34-36, wherein the handle assembly facilitates connection of at least one of the first electrode and the second electrode to a robotic system.

Aspect 38. The system of any one of aspects 34-37, wherein the handle assembly is configured to automate advancement of at least one of the first electrode and the second electrode.

Aspect 39. The system of any one of aspects 34-38, wherein the handle assembly is configured to automate delivery of energy to at least one of the first electrode and the second electrode.

Aspect 40. A surgical instrument system for coring tissue from a target tissue site, the system comprising: a tissue resection device configured for coring tissue, wherein the device comprises: a first clamping element comprising a helical coil and a first electrode, a second clamping element comprising a second electrode, the second clamping element being positioned to oppose at least a portion of the first clamping element, and a cutting element configured for the transection of tissue; and computing logic configured to automate use one or more functions of the tissue resection device.

Aspect 41. The system of aspect 40, wherein the computing logic is configured to automate advancement of at least one of the first electrode and the second electrode.

Aspect 42. The system of any one of aspects 40-41, wherein the computing logic is configured to automate delivery of energy to at least one of the first electrode and the second electrode.

Aspect 43. The system of any one of aspects 40-42, wherein the computing logic is configured to determine an energy distribution provided via the tissue resection device.

Aspect 44. The system of any one of aspects 40-43, wherein the computing logic is configured to receive one or more inputs relating to one or more of the first clamping element, the second clamping element, or the cutting element.

Aspect 45. The system of any one of aspects 40-44, wherein the computing logic is disposed in a handle assembly associated with the tissue resection device.

Aspect 46. The system of any one of aspects 40-45, wherein the computing logic is disposed in a generator in communication with the tissue resection device.

Aspect 47. A surgical instrument system for coring tissue from a target tissue site, the system comprising: a tissue resection device configured for coring tissue, wherein the device comprises: a helical coil electrode, and a cutting element configured to cooperate with the helical coil electrode for the transection of tissue; and a handle assembly configured to facilitate interaction between tissue the tissue resection device.

Aspect 48. The system of aspect 47, wherein the handle assembly facilitates connection of the electrode to a generator.

Aspect 49. The system of any one of aspects 47-48, wherein the handle assembly facilitates connection of the electrode to a computing device.

Aspect 50. The system of any one of aspects 47-49, wherein the handle assembly facilitates connection of the electrode to a robotic system.

Aspect 51. The system of any one of aspects 47-50, wherein the handle assembly is configured to automate advancement of the electrode.

Aspect 52. The system of any one of aspects 47-51, wherein the handle assembly is configured to automate delivery of energy to the electrode.

Aspect 53. A surgical instrument system for coring tissue from a target tissue site, the system comprising: a tissue resection device configured for coring tissue, wherein the device comprises: a helical coil electrode, and a cutting element configured to cooperate with the helical coil electrode for the transection of tissue; and computing logic configured to automate use one or more functions of the tissue resection device.

Aspect 54. The system of aspect 53, wherein the computing logic is configured to automate advancement of the electrode.

Aspect 55. The system of any one of aspects 53-54, wherein the computing logic is configured to automate delivery of energy to the electrode.

Aspect 56. The system of any one of aspects 53-55, wherein the computing logic is configured to determine an energy distribution provided via the tissue resection device.

Aspect 57. The system of any one of aspects 53-56, wherein the computing logic is configured to receive one or more inputs relating to the tissue resection device.

Aspect 58. The system of any one of aspects 53-57, wherein the computing logic is disposed in a handle assembly associated with the tissue resection device.

Aspect 59. The system of any one of aspects 53-58, wherein the computing logic is disposed in a generator in communication with the tissue resection device.

Although shown and described is what is believed to be the most practical and preferred embodiments, it is apparent that departures from specific designs and methods described and shown will suggest themselves to those skilled in the art and may be used without departing from the spirit and scope of the invention. For example, the systems, devices and methods described herein for removal of lesions from the lung. It will be appreciated by the skilled artisan that the devices and methods described herein may are not limited to the lung and could be used for tissue resection and lesion removal in other areas of the body. The present invention is not restricted to the particular constructions described and illustrated, but should be constructed to cohere with all modifications that may fall within the scope of the appended claims.

What is claimed is:

1. A surgical instrument system for coring tissue from a target tissue site, the system comprising:
a tissue resection device configured for coring tissue, wherein the device comprises:
a first clamping element comprising a helical coil, the helical coil including first electrode,
a second clamping element comprising a second electrode, the second clamping element being positioned to oppose at least a portion of the first clamping element;
a cutting element configured for the transection of tissue; and
a handle assembly configured to facilitate interaction between tissue and at least one of the first clamping element, the second clamping element, or the cutting element, the handle assembly comprising:
a rotational control assembly configured to rotate to cause rotation of the helical coil into the tissue;
a linear actuator, the linear actuator including actuator arms configured to be translated to cause a portion of the tissue to be clamped between the helical coil and the second electrode, the first electrode and the second electrode configured to deliver energy to seal the portion of the tissue clamped between the helical coil and the second electrode,
the linear actuator configured to be deactivated, after the first electrode and the second electrode deliver the energy, to unclamp the portion of the tissue from between the first clamping element and the second clamping element.

2. The system of claim 1, wherein the handle assembly facilitates connection of at least one of the first electrode and the second electrode to a generator.

3. The system of claim 1, wherein the handle assembly facilitates connection of at least one of the first electrode and the second electrode to a computing device.

4. The system of claim 1, wherein the handle assembly facilitates connection of at least one of the first electrode and the second electrode to a robotic system.

5. The system of claim 1, wherein the handle assembly is configured to automate advancement of at least one of the first electrode and the second electrode.

6. The system of claim 1, wherein the handle assembly is configured to automate delivery of energy to at least one of the first electrode and the second electrode.

7. The system of claim 1, further comprising a ligation and amputation system including a knob and a machinal line, the machinal line configured to lasso a distal end of the target tissue site for amputation of the distal end of the target tissue site.

8. The system of claim 1, wherein the first clamping element includes an outer tube, the helical coil is coupled to a distal end of the outer tube.

9. The system of claim 8, wherein the second clamping element includes a central tube slidably disposed in the outer tube, the second electrode embedded within a surface segment of the central tube.

10. The system of claim 9, wherein the cutting element is configured to be moved through the central tube to cut the sealed portion of the tissue.

11. The system of claim 1, further comprising an anchor configured to anchor to the target tissue site.

12. The system of claim 11, wherein the helical coil is configured to track along the anchor towards the target tissue site.

13. The system of claim 1, wherein the rotational control assembly is configured to allow bi-directional rotation of the helical coil.

14. The system of claim 1, wherein the rotational control assembly is configured to allow the helical coil to rotate a predetermined rotational distance such that fluid vessels are caught in a helix section of the helical coil and moved to a flat portion of the helical coil.

15. The system of claim 14, wherein the linear actuator is configured to be activated after the rotational control assembly rotates the helical coil the predetermined rotational distance.

16. The system of claim 7, wherein the ligation and amputation system is configured to deploy the machinal line to amputate the distal end of the target tissue site when the target tissue site is disposed within the cutting element.

17. The system of claim 7, wherein the ligation and amputation system includes a spring configured to be actuated to expose the machinal line.

18. The system of claim 1, further comprising a controller coupled to at least one of the tissue resection device and the handle assembly.

19. The system of claim 18, wherein the controller is in communication with a generator, wherein the controller is configured to control the generator to provide radiofrequency energy to at least one of the first electrode and the second electrode, the radiofrequency energy sufficient to seal vessels in the portion of the tissue clamped between the first clamping element and the second clamping element.

20. The system of claim 18, wherein the controller is configured to sense an interaction of tissue with the tissue resection device.

21. The system of claim 18, wherein the energy is a first energy modality, wherein the controller is configured to:
deliver a first drive signal to cause the first electrode and the second electrode to deliver the first energy modality;
determine a tissue parameter of tissue interacting with the tissue resection device; and
deliver a second drive signal to cause a second energy modality to be delivered via the tissue resection device based on the tissue parameter determined, wherein the first energy modality is different from the second energy modality.

22. The system of claim 21, wherein the tissue parameter is tissue impedance, the controller is configured to calculate the tissue impedance based on electrical parameters associated with the first energy modality.

23. The system of claim 21, wherein properties of the first energy modality and the second energy modality correspond to a type of interaction between the tissue resection device and the tissue interacting with the tissue resection device.

24. The system of claim 21, wherein the controller is configured to cease delivery of the first drive signal when a termination parameter is met.

25. The system of claim 1, wherein the energy is radiofrequency (RF).

26. The system of claim 1, wherein the energy is ultrasonic energy.

27. The system of claim 21, wherein the controller is further configured to determine a state of the tissue interacting with the tissue resection device based on the tissue parameter, the state of the tissue includes coagulated, sealed, or cut.

28. The system of claim 21, wherein the controller is configured to measure a rate of change of the tissue parameter.

29. The system of claim 18, wherein the controller is configured to determine that the tissue interacting with the tissue resection device is sealed based on at least one of initial tissue impedance, initial aperture defined by the first clamping element and the second clamping element, current tissue impedance, rate of change of tissue impedance, ultrasonic energy driven into the tissue, radio frequency (RF) energy driven into the tissue, or transaction time.

30. The system of claim 21, wherein the first drive signal incudes a first energy signal, the controller is configured to modulate delivery of the first energy signal based on a measured tissue impedance by modifying an output power of a generator configured to deliver energy to at least one of the first electrode and the second electrode, modifying an output waveform of the generator, selecting a second energy signal to deliver to the tissue resection device, or modifying a termination parameter.

31. The system of claim 18, wherein the controller is configured to sense and control a position of the cutting element relative to at least one of the first or second clamping elements of the tissue resection device.

32. The system of claim 19, wherein the controller is configured to control the generator to provide a continuous amount of radiofrequency energy.

33. The system of claim 19, wherein the controller is configured to control the generator to automatically provide an increase or decrease in an amount of radiofrequency energy delivered to at least one of the first electrode or the second electrode.

34. The system of claim 18, wherein the controller is configured to control a position of the first clamping element relative to the second clamping element.

35. The system of claim 19, wherein the tissue resection device and the generator are at least one of mechanically or electrically connected to the handle assembly.

36. The system of claim 18, wherein the controller is configured to sense an amount of force applied to at least one of the first or second clamping elements to detect the interaction of tissue with the tissue resection device.

37. The system of claim 1, further comprising a computing logic configured to automate use of one or more functions of the tissue resection device, the computing logic configured to receive one or more inputs relating to the tissue resection device.

38. The system of claim 37, wherein the computing logic is disposed in the handle assembly associated with the tissue resection device.

39. The system of claim 38, wherein the computing logic is disposed in a generator in communication with the tissue resection device.

40. The system of claim 1, wherein the handle assembly is configured to repeat a cycle of rotating the helical coil, clamping tissue between the first clamping element and the second clamping element, and applying the energy to seal vessels.

41. The system of claim 21, wherein the tissue parameter is based on dividing a voltage measurement of radio frequency (RF) energy by a current measurement of the RF energy.

42. The system of claim 37, wherein the computing logic is configured to determine an energy distribution provided via the tissue resection device.

43. A surgical instrument system for coring tissue from a target tissue site, the system comprising:
- a first clamping element comprising a helical coil and a first electrode;
- a second clamping element comprising a second electrode;
- a cutting element configured for the transection of tissue; and
- a handle assembly configured to facilitate interaction between tissue and at least one of the first clamping element, the second clamping element, or the cutting element, the handle assembly comprising:
- a rotational control assembly configured to rotate to cause rotation of the helical coil into the tissue;
- a linear actuator, the linear actuator including actuator arms configured to be translated to control a position of the first clamping element and the second clamping element relative to one another along a longitudinal axis thereof to clamp a portion of tissue between the first clamping element and the second clamping element, the first electrode and the second electrode configured to deliver energy to seal the portion of the tissue clamped between the first clamping element and the second clamping element, the linear actuator configured to, after the first electrode and the second electrode deliver the energy, unclamp the portion of the tissue from between the first clamping element and the second clamping element.

* * * * *